United States Patent
Ben Nun et al.

(10) Patent No.: US 12,331,956 B2
(45) Date of Patent: Jun. 17, 2025

(54) FLUID FLOW IN THERMAL STORAGE CONTAINERS

(71) Applicant: Nostromo Ltd., Even-Yehuda (IL)

(72) Inventors: Yaron Ben Nun, Even-Yehuda (IL); Eyal Ziv, Tel-Aviv (IL); Nadav Amir, Rehovot (IL)

(73) Assignee: Nostromo Ltd., Even-Yehuda (IL)

( * ) Notice: Subject to any disclaimer, the term of this patent is extended or adjusted under 35 U.S.C. 154(b) by 529 days.

(21) Appl. No.: 17/279,722

(22) PCT Filed: Sep. 25, 2019

(86) PCT No.: PCT/IL2019/051059
§ 371 (c)(1),
(2) Date: Mar. 25, 2021

(87) PCT Pub. No.: WO2020/065649
PCT Pub. Date: Apr. 2, 2020

(65) Prior Publication Data
US 2021/0396406 A1  Dec. 23, 2021

Related U.S. Application Data

(63) Continuation-in-part of application No. PCT/IB2018/001091, filed on Sep. 25, 2018.
(Continued)

(51) Int. Cl.
*F28D 20/02* (2006.01)
*F24F 5/00* (2006.01)
(Continued)

(52) U.S. Cl.
CPC .......... *F24F 5/0021* (2013.01); *F28D 20/021* (2013.01); *F28D 20/026* (2013.01);
(Continued)

(58) Field of Classification Search
CPC .......... F24F 5/00; F28D 20/02; F28D 20/021; F28D 20/023; F28D 20/026;
(Continued)

(56) References Cited

U.S. PATENT DOCUMENTS 3,251,192 A   5/1966  Rich, Jr. et al.
3,858,805 A   1/1975  Shen et al.
(Continued)

FOREIGN PATENT DOCUMENTS

AU   2015203406   7/2015
CA   2638235      2/2010
(Continued)

OTHER PUBLICATIONS

Notification of Office Action Dated Sep. 10, 2021 From the State Intellectual Property Office of the People's Republic of China Re. Application No. 201880075534.7. (11 Pages).
(Continued)

*Primary Examiner* — Harry E Arant
(74) *Attorney, Agent, or Firm* — AlphaPatent Associates Ltd.; Daniel J. Swirsky

(57) ABSTRACT

A thermal-storage container used in thermal systems to exchange heat by fluid flow though phase-changing material disposed inside the thermal-storage container, including a thermal-storage container housing, a fluid inlet and a fluid outlet, and one or more capsules containing the phase-change material, and defining a plurality of passages configured to direct the flow of the fluid at different portions inside the housing, wherein an actual fluid flow length from the fluid inlet to the fluid outlet is longer than a direct length measured between the fluid inlet and the fluid outlet through all sections through which the fluid flows. Related apparatus and methods are also described.

19 Claims, 46 Drawing Sheets

Related U.S. Application Data

(60) Provisional application No. 62/824,541, filed on Mar. 27, 2019, provisional application No. 62/824,914, filed on Mar. 27, 2019, provisional application No. 62/824,575, filed on Mar. 27, 2019, provisional application No. 62/685,147, filed on Jun. 14, 2018, provisional application No. 62/562,562, filed on Sep. 25, 2017.

(51) Int. Cl.
   *F28F 13/12* (2006.01)
   *F28D 20/00* (2006.01)

(52) U.S. Cl.
   CPC ...... *F28F 13/12* (2013.01); *F28D 2020/0069* (2013.01); *F28D 2020/0082* (2013.01)

(58) Field of Classification Search
   CPC ....... F28D 2020/0069; F28D 2020/082; F28D 2020/008; F28D 2020/0021; F28F 13/12; F28F 2240/00; Y02E 60/14
   See application file for complete search history.

(56) References Cited

U.S. PATENT DOCUMENTS

| | | | |
|---|---|---|---|
| 4,203,489 A | 5/1980 | Swiadek | |
| 4,205,656 A | 6/1980 | Scarlata | |
| 4,259,401 A | 3/1981 | Chahroudi et al. | |
| 4,262,653 A | 4/1981 | Holland | |
| 4,344,414 A | 8/1982 | Balch | |
| 4,347,892 A | 9/1982 | Clyne et al. | |
| 4,442,826 A | 4/1984 | Pleasants | |
| 4,462,390 A | 7/1984 | Holdridge et al. | |
| 4,471,834 A | 9/1984 | Schlote | |
| 4,495,937 A | 1/1985 | Fisher | |
| 4,532,917 A | 8/1985 | Taff et al. | |
| 4,612,912 A * | 9/1986 | Lampe | F28D 20/02 |
| | | | 126/669 |
| 4,656,836 A | 4/1987 | Gilbertson | |
| 4,757,690 A | 7/1988 | Hollowczenko et al. | |
| 4,827,735 A | 5/1989 | Foley | |
| 4,924,935 A * | 5/1990 | Van Winckel | F28D 20/02 |
| | | | 165/104.11 |
| 5,059,228 A | 10/1991 | Cheng | |
| 5,072,596 A | 12/1991 | Gilbertson et al. | |
| 5,090,207 A | 2/1992 | Gilbertson et al. | |
| 5,678,626 A | 10/1997 | Gilles | |
| 7,856,843 B2 | 12/2010 | Enis et al. | |
| 7,905,110 B2 | 3/2011 | Reich et al. | |
| 9,568,235 B2 | 2/2017 | Dobbs | |
| 10,591,224 B2 | 3/2020 | Bergan et al. | |
| 2002/0000306 A1 | 1/2002 | Bradley | |
| 2004/0194908 A1 | 10/2004 | Tomohide | |
| 2007/0006586 A1 | 1/2007 | Hoffman et al. | |
| 2008/0219651 A1 | 9/2008 | Nayef | |
| 2009/0090109 A1 | 4/2009 | Mills et al. | |
| 2009/0211726 A1 | 8/2009 | Bank | |
| 2010/0252232 A1 | 10/2010 | Reich et al. | |
| 2010/0276121 A1 * | 11/2010 | Sagie | F28D 7/1607 |
| | | | 165/110 |
| 2011/0049908 A1 | 3/2011 | Chung | |
| 2011/0286724 A1 | 11/2011 | Goodman | |
| 2013/0134780 A1 | 5/2013 | Parsonnet | |
| 2014/0000835 A1 | 1/2014 | Niknafs | |
| 2014/0102662 A1 | 4/2014 | Grama et al. | |
| 2014/0214231 A1 | 7/2014 | Parsonnet et al. | |
| 2014/0284021 A1 | 9/2014 | Laurberg et al. | |
| 2015/0027662 A1 | 1/2015 | Schmitz et al. | |
| 2015/0053367 A1 | 2/2015 | Parkinson et al. | |
| 2015/0060008 A1 | 3/2015 | Wirz et al. | |
| 2015/0121945 A1 | 5/2015 | Kamoshida et al. | |
| 2015/0192370 A1 * | 7/2015 | Suzuki | F28D 20/021 |
| | | | 165/10 |
| 2015/0246484 A1 * | 9/2015 | Hirschberg | F28F 13/06 |
| | | | 428/189 |
| 2016/0076821 A1 | 3/2016 | Kopko | |
| 2016/0123680 A1 | 5/2016 | Lee et al. | |
| 2016/0195320 A1 | 7/2016 | Konovalov | |
| 2017/0045304 A1 | 2/2017 | Booska | |
| 2017/0119028 A1 | 5/2017 | Kobayashi et al. | |
| 2018/0003445 A1 | 1/2018 | Bergan et al. | |
| 2019/0112809 A1 * | 4/2019 | Frantz | F24F 5/0021 |
| 2020/0284527 A1 | 9/2020 | Ben Nun et al. | |
| 2022/0178560 A1 | 6/2022 | Ben Nun et al. | |
| 2022/0187028 A1 | 6/2022 | Ben Nun et al. | |

FOREIGN PATENT DOCUMENTS

| | | | |
|---|---|---|---|
| CN | 101586853 | 11/2009 | |
| CN | 201662262 | 12/2010 | |
| CN | 102257344 | 11/2011 | |
| CN | 202835911 | 3/2013 | |
| CN | 104457020 | 3/2015 | |
| CN | 106588036 A | 4/2017 | |
| CN | 207703058 | 8/2018 | |
| DE | 102016006476 | 11/2017 | |
| EP | 0012757 | 7/1980 | |
| FR | 3038376 | 6/2015 | |
| FR | 3034181 A1 * | 9/2016 | F28D 20/02 |
| FR | 3074280 | 5/2019 | |
| GB | 2489811 | 10/2012 | |
| JP | S59-124877 | 8/1984 | |
| JP | 61-265493 | 11/1986 | |
| JP | 63-273787 | 11/1988 | |
| JP | H4-227478 | 8/1992 | |
| JP | 2000-18864 | 1/2000 | |
| JP | 2013-181692 | 9/2013 | |
| JP | 2013-228186 | 11/2013 | |
| JP | 2016-029333 | 3/2016 | |
| WO | WO 2006/136860 | 12/2006 | |
| WO | WO 2009/105643 | 8/2009 | |
| WO | WO 2014/091216 | 6/2014 | |
| WO | WO 2016/099289 | 6/2016 | |
| WO | WO 2016/195485 | 12/2016 | |
| WO | WO 2017/001558 | 1/2017 | |
| WO | WO 2017/151606 | 9/2017 | |
| WO | WO 2017/151612 | 9/2017 | |
| WO | WO 2019/058170 | 3/2019 | |
| WO | WO 2020/065649 | 4/2020 | |
| WO | WO 2020/194315 | 10/2020 | |
| WO | WO 2020/194316 | 10/2020 | |

OTHER PUBLICATIONS

Notice of Allowance Dated Mar. 1, 2022 from US Patent and Trademark Office Re. U.S. Appl. No. 16/650,509. (24 pages).
Notification of Office Action and Search Report Dated Aug. 3, 2022 From the State Intellectual Property Office of the People's Republic of China Re. Application No. 201980076420.9 with its Summary in English. (16 Pages).
Restriction Official Action Dated Nov. 30, 2021 from US Patent and Trademark Office Re. U.S. Appl. No. 16/650,509. (9 pages).
Communication Pursuant to Article 94(3) EPC Dated Mar. 7, 2023 From the European Patent Office Re. Application No. 19865303.2. (3 Pages).
Notification of Office Action Dated Apr. 22, 2023 From the State Intellectual Property Office of the People's Republic of China Re. Application No. 201980076420.9. (14 Pages).
Office Action Dated May 3, 2023 From the Israel Patent Office Re. Application No. 281797. (6 Pages).
Official Action Dated Jun. 20, 2023 from the US Patent and Trademark Office Re. U.S. Appl. No. 17/890,295. (9 pages).
Relatório de Busca e Parecer [Search Report and Opinion] Dated Mar. 7, 2023 From the Serviço Público Federal, Ministério da Economia, Instituto Nacional da Propriedade Industrial do Brasil Re. Application No. BR 11 2021 005516 9 and Its Summary Into English. (7 Pages).
Summons to Attend Oral Proceedings Pursuant to Rule 115(1) EPC Dated May 4, 2023 From the European Patent Office Re. Application No. 18783085.6. (4 Pages).

(56) References Cited

OTHER PUBLICATIONS

Decision of Rejection Dated Aug. 31, 2022 From the China National Intellectual Property Administration Re. Application No. 201880075534.7 and Its Summary in English. (15 Pages).
Communication Pursuant to Article 94(3) EPC Dated Mar. 7, 2022 From the European Patent Office Re. Application No. 18783085.6. (3 Pages).
Notification of Office Action Dated Mar. 24, 2022 From the State Intellectual Property Office of the People's Republic of China Re. Application No. 201880075534.7. (11 Pages).
International Preliminary Report on Patentability Dated Oct. 7, 2021 From the International Bureau of WIPO Re. Application No. PCT/IL2020/050374. (8 Pages).
Communication Pursuant to Article 94(3) EPC Dated Jan. 29, 2021 From the European Patent Office Re. Application No. 18783085.6. (4 Pages).
International Preliminary Report on Patentability Dated Apr. 8, 2021 From the International Bureau of WIPO Re. Application No. PCT/IL2019/051059. (9 Pages).
International Preliminary Report on Patentability Dated Apr. 9, 2020 From the International Bureau of WIPO Re. Application No. PCT/IB2018/001091. (9 Pages).
International Search Report and the Written Opinion Dated Jan. 15, 2020 From the International Searching Authority Re. Application No. PCT/IL2019/051059. (13 Pages).
International Search Report and the Written Opinion Dated Jul. 15, 2020 From the International Searching Authority Re. Application No. PCT/IL2020/050374. (11 Pages).
International Search Report and the Written Opinion Dated Jun. 30, 2020 From the International Searching Authority Re. Application No. PCT/IL2020/050373. (11 Pages).
International Search Report and the Written Opinion Dated Nov. 30, 2018 From the International Searching Authority Re. Application No. PCT/IB2018/001091. (16 Pages).
Notification of Office Action Dated Mar. 5, 2021 From the State Intellectual Property Office of the People's Republic of China Re. Application No. 201880075534.7. (10 Pages).
Translation Dated Mar. 29, 2021 of Notification of Office Action Dated Mar. 5, 2021 From the State Intellectual Property Office of the People's Republic of China Re. Application No. 201880075534.7. (11 Pages).
Soares et al. "Review of Passive PCM Latent Heat Thermal Energy Storage Systems Towards Buildings' Energy Efficiency", Energy and Buildings, 59: 82-103, Apr. 2013.

English Translation Dated Apr. 24, 2022 of Notification of Office Action Dated Mar. 24, 2022 From the State Intellectual Property Office of the People's Republic of China Re. Application No. 201880075534.7. (10 Pages).
Translation Dated Oct. 13, 2021 of Notification of Office Action Dated Sep. 10, 2021 From the State Intellectual Property Office of the People's Republic of China Re. Application No. 201880075534.7. (11 Pages).
Notification of Office Action and Search Report Dated Aug. 3, 2022 From the State Intellectual Property Office of the People's Republic of China Re. Application No. 201980076420.9. (13 Pages).
Office Action Dated Aug. 11, 2022 From the Israel Patent Office Re. Application No. 273611. (7 Pages).
Supplementary European Search Report and the European Search Opinion Dated Jun. 17, 2022 From the European Patent Office Re. Application No. 19865303.2. (8 Pages).
Notice of Reason(s) for Rejection Dated Sep. 19, 2023 From the Japan Patent Office Re. Application No. 2021-541336 and Its Translation Into English. (17 Pages).
International Preliminary Report on Patentability Dated Oct. 7, 2021 From the International Bureau of WIPO Re. Application No. PCT/IL2020/050373. (7 Pages).
English Summary Dated Dec. 7, 2023 of Notification of Office Action Dated Nov. 23, 2023 From the National Intellectual Property Administration of the People's Republic of China Re. Application No. 201980076420.9.(5 Pages).
Notification of Office Action Dated Nov. 23, 2023 From the National Intellectual Property Administration of the People's Republic of China Re. Application No. 201980076420.9 and Its Machine Translation Into English. (39 Pages).
Communication Pursuant to Article 94(3) EPC Dated Apr. 25, 2024 From the European Patent Office Re. Application No. 19865303.2 (4 Pages).
Office Action Dated Apr. 8, 2024 From the Israel Patent Office Re. Application No. 281797. (4 Pages).
Decision on Rejection Dated Jan. 31, 2024 From the State Intellectual Property Office of the People's Republic of China Re. Application No. 201980076420.9 and Its Machine Translation Into English. (30 Pages).
English Summary Dated Feb. 19, 2024 of Decision on Rejection Dated Jan. 31, 2024 From the State Intellectual Property Office of the People's Republic of China Re. Application No. 201980076420.9 (5 Pages).
Hearing Notice Dated Dec. 21, 2023 From the Government of India, Intellectual Property India, The Patent Office Re. Application No. 202127018425. (2 Pages).

* cited by examiner

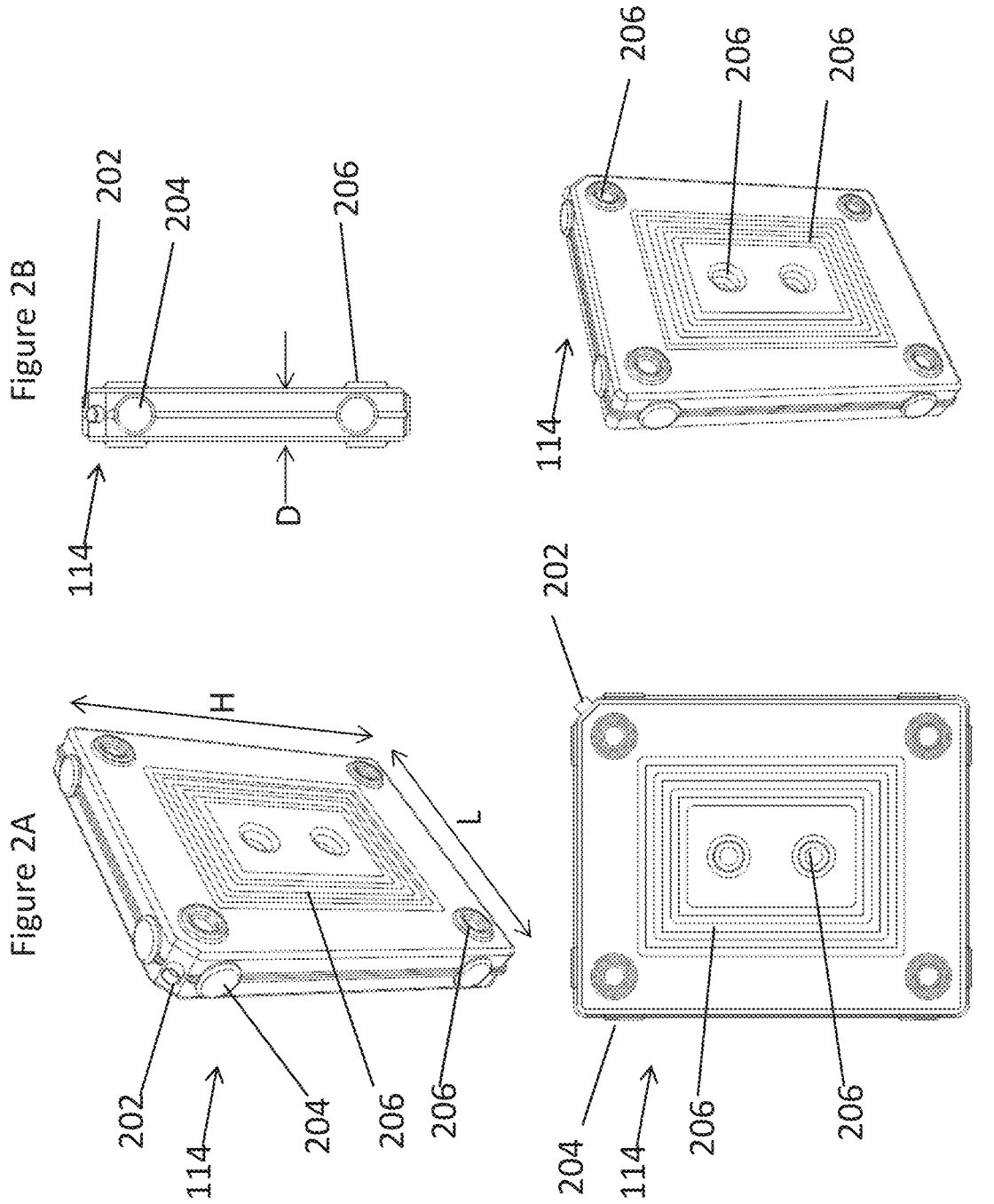

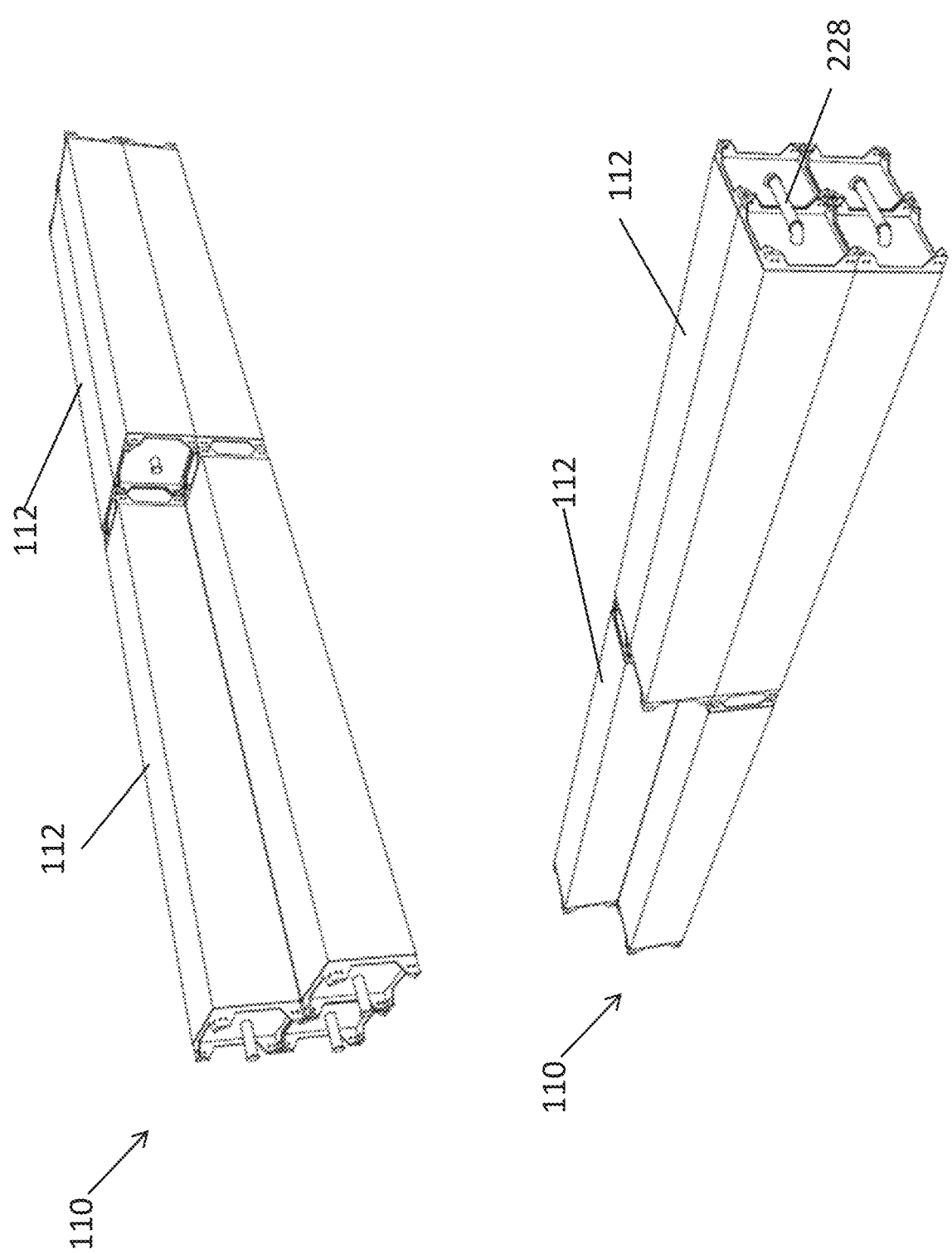

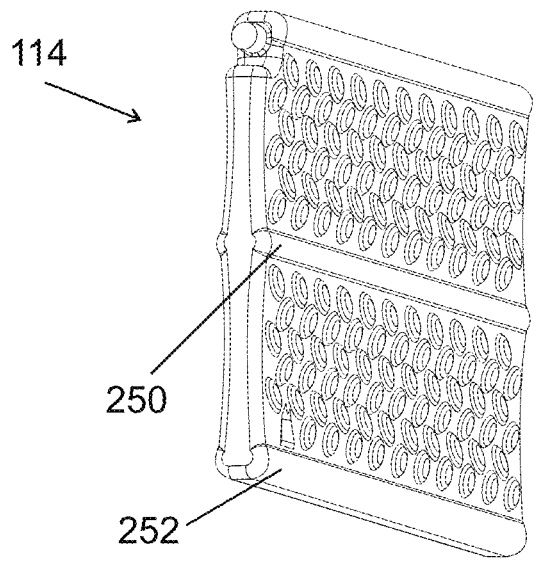
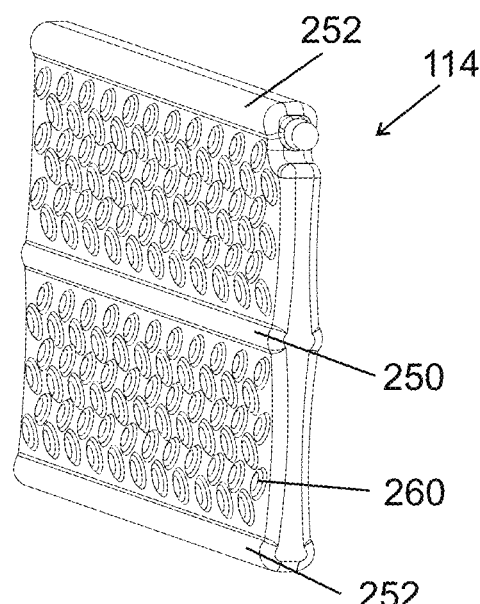
Figure 2S  Figure 2T
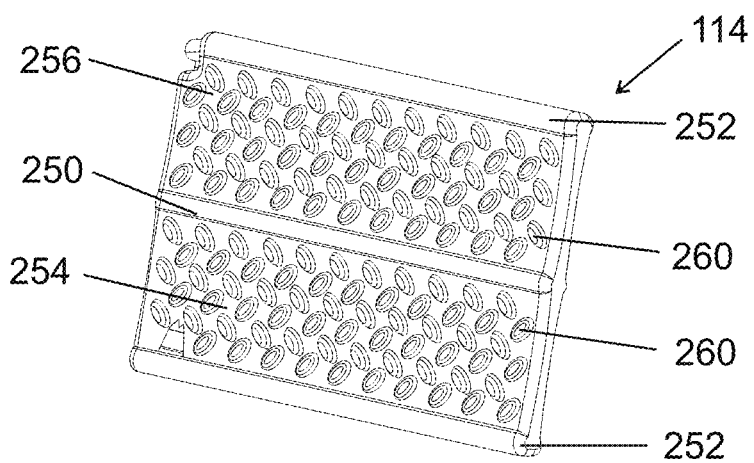
Figure 2U

114Cy

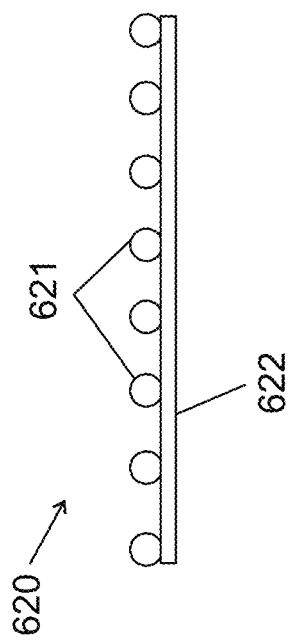
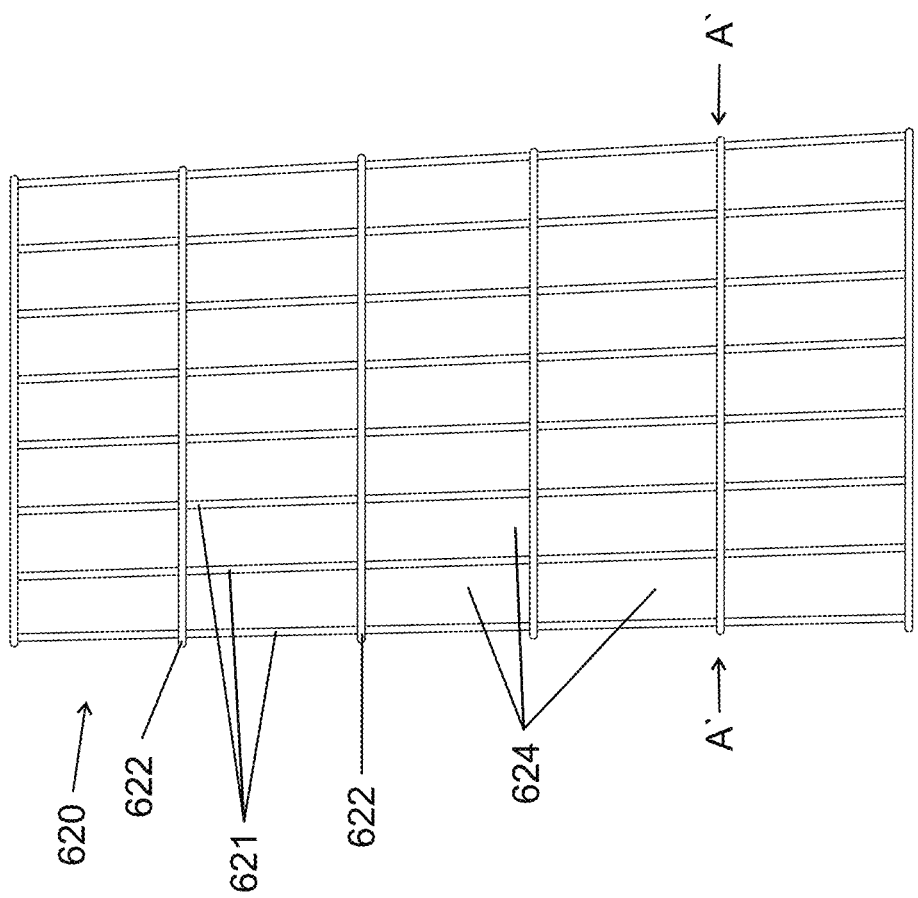
Figure 6C
Figure 6B

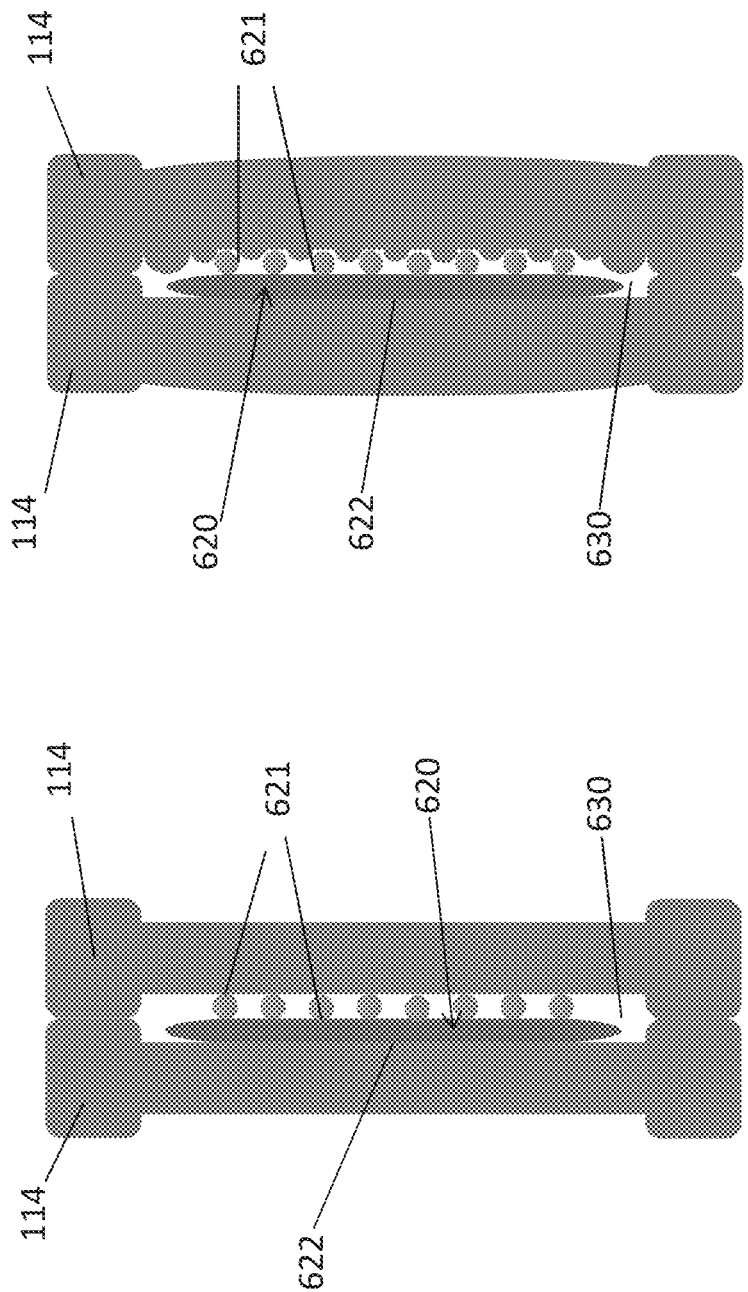

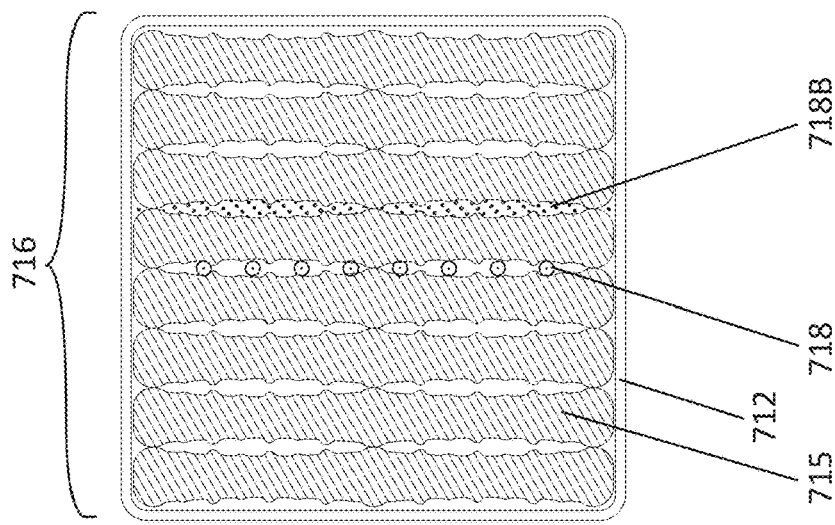
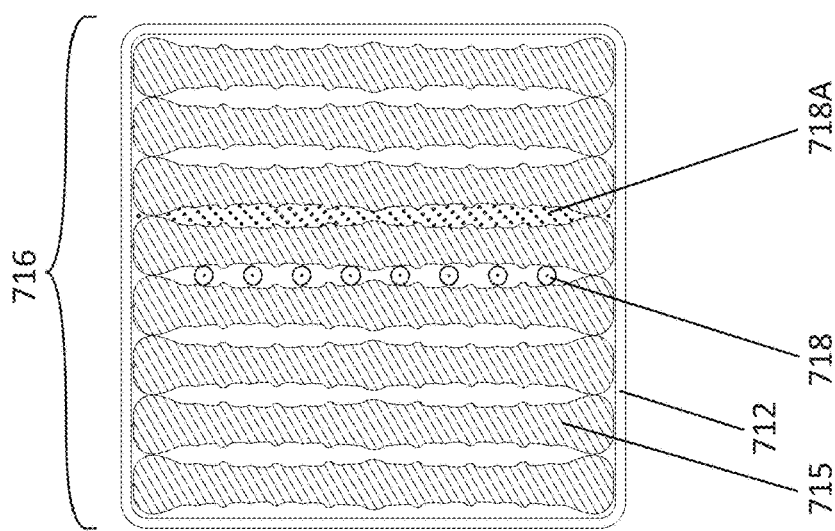
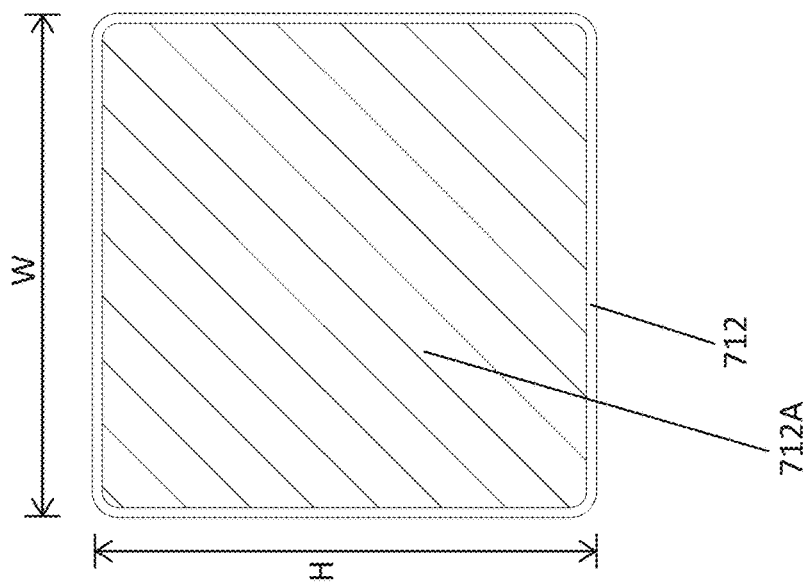

- Dimensions
  50x25x400cm (19.68 X 9.84 X 196.8 in.)
- At 10°C inlet and 5°C max outlet
  Stable cooling power rate as discharged
  3-4 Ton
- Shipping Weight
  700 kg (1540 lb)
- Weight, Filled
  750 kg (1650 lb)
- Floor Loading
  350kg/m², (70 lb/sq.ft.)
- Volume Of Water/Ice
  336 kg
- Inlet/Outlet Connecting tubes diameter
  1.5. in.
- Solution
  25% Ethylene/Propylene Glycol | 75% water
- Total Capacity
  ~10.15 Ton-Hrs.
- Net-Usable Capacity for a single cell
  85%
- Net-Usable Capacity for a chained cell
  95%
- Solution Operating Discharge Temp.
  ~0-5°C (32-41°F)
- Nominal solution flow rate
  2500 l/hr
- Pressure drop
  7 psi (0.5 bar)

Figure 22

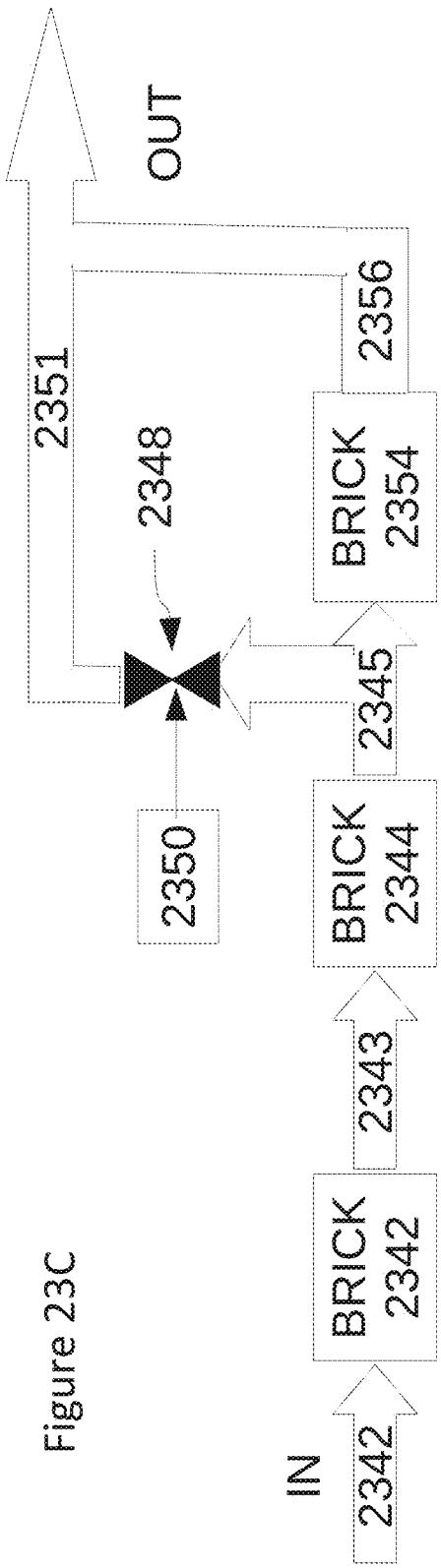

FLUID FLOW IN THERMAL STORAGE CONTAINERS

RELATED APPLICATIONS

This application is a National Phase of PCT Patent Application No. PCT/IL2019/051059 having International filing date of Sep. 25, 2019, which claims the benefit of priority under 35 USC § 119 (e) of U.S. Provisional Patent Application Nos. 62/824,914, 62/824,575 and 62/824,541, all filed on Mar. 27, 2019, and which is also a Continuation-in-Part (CIP) of PCT Patent Application No. PCT/IB2018/001091 filed on Sep. 25, 2018, which claims the benefit of priority under 35 USC § 119 (e) of U.S. Provisional Patent Application Nos. 62/685,147 filed on Jun. 14, 2018, and 62/562,562 filed on Sep. 25, 2017.

The contents of all of the above applications are incorporated by reference as if fully set forth herein.

FIELD AND BACKGROUND

The present invention, in some embodiments thereof, relates to thermal-containers and, more particularly, but not exclusively, to exchanging heat by fluid flow adjacent phase-changing material in thermal-storage containers of thermal storage systems.

Many studies of energy consumption in the developed world have pointed to peak energy (electricity) consumption occurring during less than 400-300 hours annually (5% of the time). A substantial amount of this peak energy demand may be attributed to structural cooling systems such as chillers, air conditioning or space heating systems relying on heat pumps. There is therefore a growing need to provide efficient and cost effective cooling systems that can counterbalance the grid's fluctuation.

One response to this need has been the development of thermal energy storage systems, especially ice storage systems that store cold or hot energy by running grid electricity consuming chillers or heat pumps during off-peak hours and then discharging the stored energy during peak or other hours. Some disadvantages of some current systems are their incompatibility with a commercial building, lack of modularity, and their significant footprint—often requiring the usage of expensive real estate assets of a building in order to provide sufficient thermal energy storage; as a result, this method of storing energy is almost totally absent from the commercial sector (office buildings, shopping malls, hotels, hospitals and so on), which is a great contributor to the peak demand phenomena.

The most common type of such a conventional system for storing thermal energy is known as an "ice-on-coil" storage system. These systems comprise a tank filled with water/ice as a phase change medium (PCM) for storing heat, especially by utilizing the phase change of liquid water into ice. These systems further comprise a coil that is placed inside the tank in the water in order to exchange heat with the water/ice. While charging this type of system, ice is built up around the coil in order to form a massive block. These systems suffer from a significant loss of efficiency, since the freezing of the water starts regularly at or on the coil, and frozen water is quite a good thermal insulator. Hence, a layer of ice on the coil increases its thickness when the tank is cooled to below around zero degrees Celsius with the coil in order to store latent heat energy. Consequently, an increasing insulation layer makes it increasingly difficult to freeze the whole volume of the storage tank. This is known as the "ice-build-up" problem. Conventional systems thus have to use very low temperatures for cooling the coil, which is inefficient. Furthermore, working at too low temperatures hurts the chiller's COP (coefficient of performance).

Furthermore, a different type of conventional thermal energy storage systems is known as "encapsulated ice" storage systems, wherein a plurality of containers that contain water as PCM for storing energy is placed inside a tank. A further medium, for example a water-glycol mixture, for exchanging heat with the water/ice inside the containers is pumped through the tank on demand. However, until now this type of a thermal energy storage system also lacks efficiency and reliability.

One of the inefficiencies of some current systems, especially of "encapsulated ice" and "ice on coil" systems that use water/ice, is slow or inconsistent ice nucleation that results in inefficient thermal energy storage and discharge. The inconsistent ice nucleation and generation is generally caused by super-cooled water that is not freezing at the desired temperature.

A still further limitation of some current systems is a limited ratio between storage fluid (water) volume and total system volume and/or the limited contact between the storage fluid (water) and the heat transfer fluid (such as glycol) either due to the growing water barrier between the two inside the capsules as the discharge cycle advances, to a low packing factor of the storage fluid containers, or poor design of the storage fluid containers such that they do not expose a great enough surface area to the heat transfer fluid or block the flow of the heat transfer fluid, thus greatly reducing the efficiency of the thermal storage. A further limitation in some systems is the inefficient discharge process that does not result in melting of all of the ice stored in the system. Furthermore, conventional systems provide an insufficient and especially dropping discharge rate, which is not sufficient to support load demands. In other words, conventional ice storage systems have usually the problem of an unstable and a degrading discharge behavior/discharge curve.

A further problem of some thermal energy storage systems that use water/ice as energy storage medium is that they suffer from a degradation of system performance over their lifetime, for example due to material fatigue or changes of the flow properties of the system. Especially with current "encapsulated ice systems", the repeated expansion and contraction of the volume of water while freezing can create such problems. One further problem with some conventional thermal energy storage systems that use water as PCM is a power rate drop in the second half of the discharge cycle. This phenomenon is caused by the melted water within capsules that act as barrier to the thermal heat exchange/conduction, wherein this thermal barrier gets constantly larger as the ice melts.

The disclosures of all references mentioned above and throughout the present specification, as well as the disclosures of all references mentioned in those references, are hereby incorporated herein by reference.

SUMMARY

According to some embodiments of the present invention there is a thermal-storage container used in thermal systems to exchange heat by fluid flow though phase-changing material disposed inside the thermal-storage container, comprising: a thermal-storage container housing; a fluid inlet and a fluid outlet; and one or more capsules containing the phase-change material, and defining a plurality of passages configured to direct the flow of the fluid at different portions inside the housing.

Optionally, one or more upstream capsules are positioned within the housing transversely to one or more downstream capsules positioned downstream the housing.

Optionally, a longitudinal axis is defined through the thermal-storage container, and one or more capsules have an orientation, angular in at least 30° about longitudinal axis to one or more downstream capsules.

Optionally, one or more capsules are horizontal, and one or more immediate downstream capsules are vertical.

Optionally, the actual fluid flow length from the fluid inlet to the fluid outlet through the capsules is longer than a length measured between the fluid inlet and the fluid outlet in general flow direction.

According to some embodiments of the present invention there is a method for exchanging heat by fluid flowing through thermal-storage container, comprising:

inserting the fluid into the thermal-storage container, via a fluid inlet;
exchanging heat between the fluid and frozen phase-changing material inside a section of the thermal-storage container;
modifying the flow direction of the fluid by at least 30° to a longitudinal direction of the thermal-storage container;
repeating exchanging and modifying at least one more time in other portions of the thermal-storage container; and
outputting the fluid from the thermal-storage container, via a fluid outlet.

Optionally, the actual fluid flow length from the fluid inlet to the fluid outlet through the sections is longer than a direct length measured between the fluid inlet and the fluid outlet through all the sections which the fluid flows therethrough.

Optionally, exchanging is with one or more capsules disposed at the section.

Optionally, modifying is by changing the orientation of one or more capsules disposed at the section.

According to some embodiments of the present invention a thermal energy storage array comprises a plurality of ice bricks wherein each of said ice bricks comprises a plurality of capsules; wherein said ice bricks are interconnected for fluid communication of a first fluid flowing through said ice bricks and wherein said ice bricks are configured in a modular structural arrangement comprising one or more of: said bricks are stacked on top of one another; said bricks are laid end to end; or said bricks are laid next to one another.

Optionally, the array further comprises insulation panels surrounding the outer surface of said modular structural arrangement of said bricks. On one hand, these insulation panels are provided for surrounding the outside surfaces of the module. On the other hand, insulation panels are avoided for non-external surfaces. The insulation panels are designed to be attached over one or more bricks according to a planned modular arrangement of bricks. This results in a homogenous ice-brick structure, an easy installation, which is also easy to disassemble. This configuration saves on the total insulation needed as only the outer surface of the complete array needs to be insulated and not every surface of every brick.

Optionally, said capsules comprise a second fluid. Optionally, said second fluid comprises water. Optionally, the array further comprises a fluid distribution system. Optionally, said first fluid has a lower freezing point than said second fluid. Optionally, said second fluid comprises an ice nucleation agent. Optionally, said ice nucleation agent is quartz. Optionally, said brick comprises between 65% and 85% of said second fluid contained inside said capsules. Optionally, the array further comprises a TES chiller for cooling said first fluid.

Optionally, the condensation part of said TES chiller is cooled by a third fluid which also cools the load in the structure serviced by said array. Optionally, the array further comprises an air compressor. Optionally, said capsule comprises a filling nozzle placed on an upper corner of said capsule to enable filling of said capsule to a maximum with said second fluid. Optionally, said capsule comprise one or more of narrow-side spacers and broad-side spacers and wherein said spacers create a gap between said capsules when these are packed together inside said brick. Optionally, said capsule surface comprises protrusions adapted to increase the turbulent flow of said first fluid around said capsules. Optionally, said brick is rectangular. Optionally, said brick has a size of 50×50×400 cm. Optionally, said brick has a size of 25×25×400 cm. Optionally, said brick has a volume of 750-1200 L. Optionally, said brick has an energy storage capacity of 15-23 TRH. Optionally, said capsule comprises a cyclohexane shape. Optionally, said cyclohexane shaped capsules are placed inside said brick to freely settle inside brick.

Optionally, said brick is adapted to be positioned underground. Optionally, said brick is cylindrical and comprises a pipe comprising a spiral metal reinforcement than runs along the outside of said brick to enable placement of said brick underground. Optionally, said capsules are arranged in a fixed position inside said brick. Optionally, said bricks further comprise a plurality of spacers inserted between said capsules, wherein said spacers ensure fluid flow of said first fluid through said brick and said spacers maximize turbulent flow when the gap between said capsules increases due to said second fluid melting.

According to some embodiments of the present invention a method for discharging a thermal energy storage (TES) system for cooling of a load comprises: providing a TES system wherein said TES system comprises an array of ice bricks, a controller, and a fluid distribution system and wherein said array is divided by said fluid distribution system into a plurality of subsets of ice bricks; wherein said controller is a computing device; activating by said controller of a first subset of said plurality of subsets such that a first fluid flows through said first subset for cooling of said load; monitoring by said controller of the temperature of said first fluid; when the temperature of said first fluid exceeds a threshold, activating by said controller of a further subset of said plurality of subsets such that a first fluid flows through said further subset for cooling of said load, wherein said further subset is a subset that has not been activated during the active discharging process; and repeating the previous two steps.

Optionally, said further subsets are activated in addition to said first subset such that said first fluid flows through all activated subsets. Optionally, the method further comprises: determining by said controller whether all of said plurality of said subsets have been activated and when all of said plurality of subsets have been activated, terminating by said controller of said discharging. Optionally, said fluid distribution system comprises at least one pump and at least one flow control mechanism and wherein said activating a subset comprises activating said at least one pump and said at least one flow control mechanism such that said first fluid flows through said subset. Optionally, said ice bricks each comprise a container comprising capsules and comprising inlet and outlet piping for enabling fluid communication of said first fluid within said array. Optionally, said capsules comprise a second fluid that has a temperature lower than that of said first fluid prior to discharging and wherein said capsules cool said first fluid as said first fluid flows through said ice brick.

According to some embodiments of the present invention a thermal energy storage unit is provided comprising: a tube having at least one inlet and at least one outlet for a first fluid; a plurality of capsules having a second fluid therein, wherein the plurality of capsules is arranged inside the tube; wherein the first fluid is a heat transfer fluid for exchanging heat with the second fluid; the second fluid is a phase-change medium; wherein the average length of an actual flow path of the first fluid from inlet to outlet is larger than a length of the tube.

According to some embodiments of the present invention a thermal energy storage unit is provided comprising: a tube having at least one inlet and at least one outlet for a first fluid; a plurality of plate-shaped capsules having a second fluid therein, wherein the plurality of capsules is stacked inside the tube or wherein the plurality of capsules is arranged inside the tube to form a plurality of stacks of capsules; wherein the first fluid is a heat transfer fluid for exchanging heat with the second fluid; the second fluid is a phase-change medium; wherein a plurality of defined narrow or shallow flow paths for the first fluid is provided between the capsules.

Optionally, said thermal energy storage unit has capsules that are adapted such that the flow path is provided in a meander pattern in at least a part of the flow path.

Optionally, said thermal energy storage unit is configured such that the tube is rectangular; and a ratio of the length of the tube to its width is in a range of about 4 to 50; and/or a ratio of a width of the tube to its height is in a range of about 0.5 to 2.

Optionally, said thermal energy storage unit is configured such that the shape of the tube is rectangular; and a ratio of the length of the tube to its width is in a range from 12 to 20, optionally, about 16; and/or a ratio of a width of the tube to its height is about 1.

Optionally, said thermal energy storage unit is configured such that a total volume of the second fluid of the plurality of capsules is 50% to 90%, optionally, 65% to 85%, of the total volume of the tube. This has proven to be an optimal or near optimal ratio of the volumes of second fluid to the total volume of the tube. On one hand, there has to be sufficient space for the first fluid in order to be able to exchange heat with the fluid, and on the other hand there should be as much available capacity for storing heat as possible.

Optionally, said thermal energy storage unit is configured such that the thermal energy storage is provided such that: a) the inlet and the outlet are provided at the same end of the tube; and that b) a flow of the first fluid from the inlet to the outlet over each capsule is essentially bi-directional. For example, a rubber sealing element which is placed approximately at the middle of the capsule can act as a flow divider for the flow of the first fluid inside the tube. Hence, two generally bi-directional flows of the first fluid can pass by the capsule which can have different temperatures. Consequently, the capsule is affected by two different flows of the first fluid and heated or cooled with two different temperatures such that a temperature gradient is provided inside the capsule. This temperature gradient results in an advantageous circulation of the second fluid (water) inside the capsule, which provides a heat transport effect in the interior of the capsule and which additional acts against the buildup of an isolative barrier of melted water inside the capsule.

Optionally, said thermal energy storage unit is configured such that he broad-sides of the box or plate shaped capsules are concave (shaped). Such capsules having concave walls provide a certain flexibility of the walls at least at the center. Hence, the wall of the capsule can flex in order to allow an increase of the volume of the second fluid in its phase change without getting damaged. Moreover, the concave shape of the broad-sides provides narrow-shaped and defined flow paths between capsules that are stacked side by side. Due to the concave shape of the broad-sides of the walls of the capsules, a flow channel for the first fluid is created between neighboring capsules of a stack that is narrow (or shallow). Consequently, the surface-to-volume ratio of this channel as compared to a cylindrical channel is improved, and the surface of the first fluid touching the broad-side of the capsule is increased. Hence, by providing corresponding (narrow) shapes of the flow channel (and the flow path) for the first fluid and the capsules, the heat exchange through the contact surface between capsule and first fluid is improved, wherein this is additionally a space-saving solution. In other words, by providing flat capsules with corresponding flat flow channels between, the heat exchange rate between the capsule and the first fluid can be significantly improved.

Optionally, said thermal energy storage unit is configured such that at least one surface of the capsules comprises protrusions adapted to create or increase a turbulence of the flow of the first fluid through the tube. This potentially increases the efficiency of the system.

Optionally, said thermal energy storage unit is configured such that each capsule of the plurality of capsules is of the same type, or each capsule of the plurality of capsules has the same volume for the second fluid. This potentially lowers manufacturing costs and makes it easier to create stacks of capsules with defined flow paths.

Optionally, said thermal energy storage unit further comprises rigid spacers placed between the capsules. Accordingly, rigid, e.g. grid-type, spacers made from metal or plastic are placed between the capsules' flat walls, wherein the grid may have many shapes: rectangular, rhombus or square holes grid-welded or chain-lock type. The spacers are optionally sized in such a manner that there is sufficient free space for the capsule wall to expand into, the free space should be greater than 15% of capsule volume but less than 30% of the hypothetical free flow area between the capsules without the spacers. A metal grid could be made of stainless steel rods with a diameter of approximately 2.8 mm, which are welded in square mash configuration sized 310×140 mm with 8 longitudinal rods and 6 transversal rods.

Optionally, said thermal energy storage unit further comprises flexible spacers placed between the capsules, wherein the flexible spacers comprise flaps. These flexible flaps potentially provide a flexible flow control that adjusts itself according to the charging status of the capsules.

Optionally, said thermal energy storage unit is configured such that the capsules are generally box or plate shaped; and the spacers are sized such that a free flow area between the broad-sides of two capsules is in a range of 15% to 30% of the free flow area between the capsules without the spacers.

Optionally, said thermal energy storage unit is configured such that at least one capsule comprises a nucleating agent, optionally, quartz. Consequently, the cooling temperature for the capsule can potentially be higher as compared to conventional ice storage systems.

Optionally, said thermal energy storage unit is configured such that the capsules comprise heat transfer strips, which are optionally, arranged such that they conduct heat to the interior of the capsule. A problem with some conventional capsules containing water is that the heat transfer coefficient of water is very low. Hence, the heat transfer from the very interior of the capsule to its outside is blocked by the water/ice located closer to the wall. Using heat transfer strips potentially solves this problem since they provide an efficient heat transfer also to the interior of the capsule.

Optionally, said thermal energy storage unit is configured such that the heat transfer strips are made of aluminum. This material provides a good heat conductivity factor. Alternatively, the heat transfer strips can be made of another material with a good thermal conductivity, for example stainless steel. Optionally, said thermal energy storage unit is configured such that the heat transfer strips are made of a material that has a thermal conductivity k of more than 10 W/(m*K) under standard conditions. Optionally, the thermal conductivity k of the strips is larger than 75 W/(m*K) under standard conditions. This potentially further improves the ice generation process inside the capsule.

Optionally, said thermal energy storage unit is configured such that the heat transfer strips have a thickness of 0.4 to 4 mm, a length of 35 to 350 mm and a width of 5 to 10 mm. These dimensions potentially provide a good heat transfer rate to the interior of the capsule. Furthermore, these strips can be easily placed inside a capsule through a small opening.

Optionally, said thermal energy storage unit is configured such that the capsules are generally box or plate-shaped; and the capsules comprise a single filling port at a corner of the capsule. This shape has a high surface-to-volume ratio. This potentially improves the heat exchange rate between first and second fluid.

Optionally, said thermal energy storage unit is configured such that the capsules are generally box or plate shaped; and the capsules comprise ridges such that the capsules are arranged to be spaced to each other. The ridges enable the creation of free spaces for a defined flow path of the first fluid between the capsules.

Since the capsules have flat or not in generally flat broad-sides, narrow (or shallow) spaces between two stacked capsules are created. Consequently an improved and defined flow path for the first fluid is created that enables a high heat exchange rate.

Optionally, said thermal energy storage unit is configured such that the outer shape of the tube is prismatic; and a length of the prismatic tube is four times greater that its maximum diameter.

Optionally, said thermal energy storage unit is configured such that the capsules have a base body and protrusions, the protrusions protruding from the base body; the base body is generally a sphere with a first radius; the protrusions have generally the shape of semi-spheres with a second radius; the second radius is at least 50% smaller than the first radius. This preferred embodiment relates to the cyclohexane-shaped capsules, which are discussed later.

Optionally, said thermal energy storage unit is configured such that the protrusions are evenly distributed on the surface of the base body.

Optionally, said thermal energy storage unit is configured such that the capsule has 12 protrusions, and hence is cyclohexane shaped.

According to some embodiments of the present invention, a thermal energy storage system is provided, the system comprising a plurality of thermal energy storage units as mentioned above, the system characterized in that the thermal energy storage units are part of a structural arrangement of a building; wherein the structural arrangement is a wall, a floor or a roof, or a combination of a wall, a floor or a roof.

According to some embodiments of the present invention, a thermal energy storage system is provided, the system comprising a plurality of thermal energy storage units as mentioned above, the system characterized in that a ratio of a combined length of the plurality of tubes to a flow-cut-area is in a range of about 40 to 400 ($cm/cm^2$), optionally, of about 60 and 150 ($cm/cm^2$) wherein the flow-cut-area is defined as cross sectional free flow area for the first fluid in the tube per capsule.

Optionally, said thermal energy storage system is configured such that the number of tubes is 3 to 5, optionally, 4.

Optionally, said thermal energy storage system is configured such that the combined length of the plurality of tubes is from 10 to 30 meters, optionally, 16 meters. This did prove to create an optimal or near optimal heat exchange rate for the system.

According to some embodiments of the present invention, a capsule for a thermal energy storage system or thermal energy storage unit as explained above is provided, wherein the capsule contains an ice nucleation agent, which optionally, comprises quartz.

According to some embodiments of the present invention, a capsule for a thermal energy storage system or thermal energy storage unit as explained above is provided, wherein the capsule contains at least one heat conducting element, Optionally, a metal stripe.

According to an aspect of some embodiments of the present invention there is provided a thermal-storage container used in thermal systems to exchange heat by fluid flow though phase-changing material disposed inside the thermal-storage container, including a thermal-storage container housing, a fluid inlet and a fluid outlet, and one or more capsules containing the phase-change material, and defining a plurality of passages configured to direct the flow of the fluid at different portions inside the housing, wherein an actual fluid flow length from the fluid inlet to the fluid outlet is longer than a direct length measured between the fluid inlet and the fluid outlet through all sections through which the fluid flows.

According to some embodiments of the invention, the actual fluid flow length from the fluid inlet to the fluid outlet is more than 2 times longer than a direct length measured between the fluid inlet and the fluid outlet through all sections through which the fluid flows.

According to some embodiments of the invention, having a ratio between an average flow cross section area along the flow path in the container and the total heat exchange area of all the capsules in the container between 4.5×10-5-45×10-5.

According to some embodiments of the invention, having a ratio between an average flow cross section area along the flow path in the container and the total heat exchange area of all the capsules in the container between 1×10-5-100×10-5.

According to some embodiments of the invention, having a gamma ratio greater than 150 cm/cm2, wherein the gamma ratio is defined as a ratio between a linear length in centimeters (cm) of the heat transfer fluid flow path and a free flow cross area per capsule in cm2.

According to some embodiments of the invention, wherein the plurality of passages is configured to cause meandering flow of the fluid inside the housing.

According to some embodiments of the invention, one or more upstream capsules are positioned within the housing transversely to one or more downstream capsules positioned downstream the housing.

According to some embodiments of the invention, a longitudinal axis is defined through the thermal-storage container, and one or more capsules have an orientation, angular in at least 30° about longitudinal axis to one or more downstream capsules.

According to some embodiments of the invention, one or more capsules are horizontal, and one or more immediate downstream capsules are vertical.

According to some embodiments of the invention, the actual fluid flow length from the fluid inlet to the fluid outlet through the capsules is longer than a length measured between the fluid inlet and the fluid outlet in general flow direction.

According to some embodiments of the invention, the capsules arranged within the thermal-storage container have a combination of concave and convex outlines, defining gaps between the contours of the capsules.

According to some embodiments of the invention, the capsules contain metal strips, and wherein a length of the metal strips is longer than a width of the capsule.

According to some embodiments of the invention, the thermal-storage container includes one or more turbulators.

According to an aspect of some embodiments of the present invention there is provided a method for exchanging heat by fluid flowing through thermal-storage container, including
 inserting the fluid into the thermal-storage container, via a fluid inlet, exchanging heat between the fluid and frozen phase-changing material inside a section of the thermal-storage container, modifying the flow direction of the fluid by at least 30° to a longitudinal direction of the thermal-storage container, repeating exchanging and modifying at least one more time in other portions of the thermal-storage container, and outputting the fluid from the thermal-storage container, via a fluid outlet.

According to some embodiments of the invention, modifying is by causing meandering flow of the fluid inside the thermal-storage container.

According to some embodiments of the invention, the actual fluid flow length from the fluid inlet to the fluid outlet through the sections is longer than a direct length measured between the fluid inlet and the fluid outlet through all the sections which the fluid flows therethrough.

According to some embodiments of the invention, exchanging is with one or more capsules disposed at the section.

According to some embodiments of the invention, modifying is by changing the orientation of one or more capsules disposed at the section.

According to some embodiments of the invention, further including generating a turbulent flow on a heat-exchanging surface of a capsule.

According to some embodiments of the invention, further including generating a meandering flow on a heat-exchanging surface of a capsule.

According to some embodiments of the invention, modifying is by alternating flow between turbulent flow and meandering flow within the thermal-storage container.

According to some embodiments of the invention, fluid flow produces is highly turbulent in a range of 100-300 W/(m²*K) in at least 35% of the fluid flow path within the thermal-storage container.

According to some embodiments of the invention, fluid flow produces a heat transfer coefficient above 100 W/(m²*K) in at least 35% of the fluid flow path within the thermal-storage container.

According to an aspect of some embodiments of the present invention there is provided a thermal-storage system including a plurality of thermal-storage containers used in thermal systems to exchange heat by flow of heat transfer fluid though phase-changing material disposed inside the thermal-storage containers, a heat transfer fluid input, piping connecting at least some of the thermal-storage containers in series, a flow control mechanism, and a heat transfer fluid output, wherein the flow control mechanism is configured to enable heat transfer fluid to bypass a thermal-storage container and reach the transfer fluid output without passing through the thermal-storage container.

According to some embodiments of the invention, the flow control mechanism is an electrically operated valve, and further including a controller for controlling the electrically operated valve.

According to some embodiments of the invention, the controller is configured to receive control commands over a communication line.

According to some embodiments of the invention, the flow control mechanism is a pressure relief valve.

According to an aspect of some embodiments of the present invention there is provided a method for exchanging heat by heat transfer fluid flowing through thermal-storage containers, including providing a thermal-storage system including a plurality of thermal-storage containers used in thermal systems to exchange heat by flow of heat transfer fluid though phase-changing material disposed inside the thermal-storage containers, a heat transfer fluid input, piping connecting at least some of the thermal-storage containers in series, a flow control mechanism, and a heat transfer fluid output, wherein the flow control mechanism is configured to enable heat transfer fluid to bypass a thermal-storage container and reach the transfer fluid output without passing through the thermal-storage container, and providing a control signal to the flow control mechanism to open a flow path for the heat transfer fluid to bypass the more downstream thermal storage container.

The technical effects of the above mentioned embodiments are explained below in more detail. One of the key performance criteria of thermal storage systems is the average discharge rate relative to the stored capacity which can be maintained through the whole discharge effective period within the required temperature limits. A typical system holding a certain capacity should be able to discharge as much as possible of its stored capacity during, for example, a 4 hour period and maintain a final exit temperature of the first fluid lower than or equal to 5 degrees Celsius.

As a result of the requirements described above the effective heat transfer rate of a given capsule should be as high as possible. In detail, the heat transfer rate of a capsule is governed by:
 1. Areas of transfer of the heat, comprising:
  i. active transfer areas of the ice material (e.g., chunk) inside the capsule 715 (the heat transfer starts with the entire internal surface area of the capsule envelope and decreases while the ice material starts to melt and vice versa during ice formation)
  ii. internal areas of the capsule envelope (i.e., the ice/water heat transfer area to the material of the capsule)
  iii. external areas of the capsule's envelope (i.e., the outer heat transfer area to the first fluid)

2. Heat transfer coefficients (HTC), comprising:
i. the second fluid, i.e., ice to water (melting) or water to ice (freezing).
ii. further effects of water inside the capsule (i.e., the heat conduction from the inside of the capsule through the water itself)
iii. the second fluid to the capsule material (the so-called film HTC; i.e., border effects that are e.g. dependent the circulation of the second fluid inside the capsule)
iv. the capsule material itself, e.g., a polymer (i.e., the heat conduction of the capsule's material itself)
v. capsule material to first fluid (i.e., border effects that are e.g. dependent on the velocity and turbulence of the first fluid flowing outside the capsule)
3. Temperature differential, comprising:
i. total temperature differential between the interior of the capsule and the first fluid
ii. individual differentials per stages 2i to 2v.

Several variables can be considered to be approximately constant: 1ii, 1iii, 2i, 2ii, 2iii, 2iv, 3i. The rest of the variables change during the process of discharging. In detail:

1i The ice material (chunk) surface area significantly decreases during the discharging process. The rate of decreasing is not necessarily in a linear relationship with the percentage of melted ice.

2v The heat transfer coefficient of the capsule material to the second fluid 120 is highly dependent on the flow characteristic of the second fluid 120. The fact that the space of the flow path keeps on growing due to the melting of ice (the capsules contract to their "as filled by water size") results in a decline of the HTF velocity and the plastic to HTF surface HTC declines with it (not necessarily in linear proportion to the percentage of melted ice, depending on the flow Reynolds number)

The above mentioned embodiments consider several of the above mentioned items 1 to 3. For example, plate or box-shaped capsules provide an increased capsule surface area relative to its volume. By reducing thickness of the capsules' material by using a rigid polymer, the HTC through the capsules envelope is improved. Providing metal transfer strips inside the capsule improves the ice to water HTC and water HTC. Causing internal circulation of the second fluid inside the capsule by exposing each capsule to bi-directional passes of the first fluid at different temperatures results in an advantageous exchange of volume of the second fluid inside the capsule, which improves the internal HTC of the capsule, since the conduction of heat is facilitated by the circulation. Providing a turbulent flow profile for the flow paths of the first fluid by adding protrusions on the capsule's surface results in a more efficient heat transfer between the capsule's envelope and the first fluid, since again the heat conduction is facilitated by the transport of the first fluid itself. In contrast, a purely laminar flow profile would negatively influence the heat transfer rate, since the velocity of the first fluid at the border of the capsule tends to zero (this is due to a border phenomenon) and hence in the case of a purely laminar flow no or just a small heat transport is provided by the movement of the first fluid itself. Using metal or other materials for spacers or a grid between the capsules results in a turbulent flow profile and defined flow paths. Using variable/flexible spacers which maintain tight flow paths between the spacer and the capsule also increases the heat transfer rate.

To summarize the above, some of the presented embodiments and aspects of the invention potentially stabilizes the discharge rate through a second half of the discharge and potentially positions the cells as compatible with commercial buildings and therefore enable water to become a usable capacitor for energy in a safe, clean, efficient and affordable fashion.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

The term "ice brick" can be understood as a thermal energy storage unit that is especially adapted to enclosing a heat transfer fluid (i.e., the first fluid) and a plurality of capsules containing the PCM (i.e. the second fluid).

The term "tube" can be understood as an elongated hollow body that has a length that is at least two times, preferable 6 times, larger than its diameter. The cross-section of said tube can be circular-, oval-, square-, rectangular- or polygonal-shaped. Optionally, the cross-section of said tube is rectangular-shaped and essentially constant over its entire length.

The term "capsule" can be understood as an enclosed volume for permanently storing a PCM, such as water or a mixture of water. Additionally, several further components or ingredients can be stored inside this enclosed volume.

The term "heat" refers to thermal energy that can be stored and exchanged.

The efficiency or effectiveness of a heat exchanger is the ratio of the rate of the actual heat transfer in the heat exchanger to the maximum possible heat transfer rate.

A cross-section shows a sectional view in a width direction of the tube.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "controller", "computing device", a "computer", or "mobile device", it should be noted that optionally any device featuring a data processor and the ability to execute one or more instructions may be described as a computer, including but not limited to any type of personal computer (PC), PLC (programmable logic controller), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such as controlling thermal energy storage, might be expected to use completely different methods, e.g., making use of expert knowledge and/or the pattern recognition capabilities of the human brain, which would be vastly more efficient than manually going through the steps of the methods described herein.

The term ton of refrigeration (TR), also called a refrigeration ton (RT), is a unit of power used in some countries (especially in North America) to describe heat-extraction capacity of refrigeration and air conditioning equipment. The TR is defined as a rate of heat transfer that results in freezing or melting of 1 short ton, 2,000 lb or 907 kg, of pure ice at 0° C. in 24 hours.

A refrigeration ton is approximately equivalent to 12,000 BTU/h or 3.5 kW.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 6A-6G show spacers for use in an ice brick according to at least some embodiments of the present invention;

FIGS. 7A to 7D show a thermal energy storage unit and cross-sectional views of a thermal energy storage unit including the tube and capsules;

FIG. 22 is an example of a data-sheet of a thermal-storage container, according to some embodiments of the invention;

FIG. 23C is a simplified illustration of three bricks and a valve according to an example embodiment of the invention;

DESCRIPTION OF SPECIFIC EMBODIMENTS OF THE INVENTION

Figure 1A:
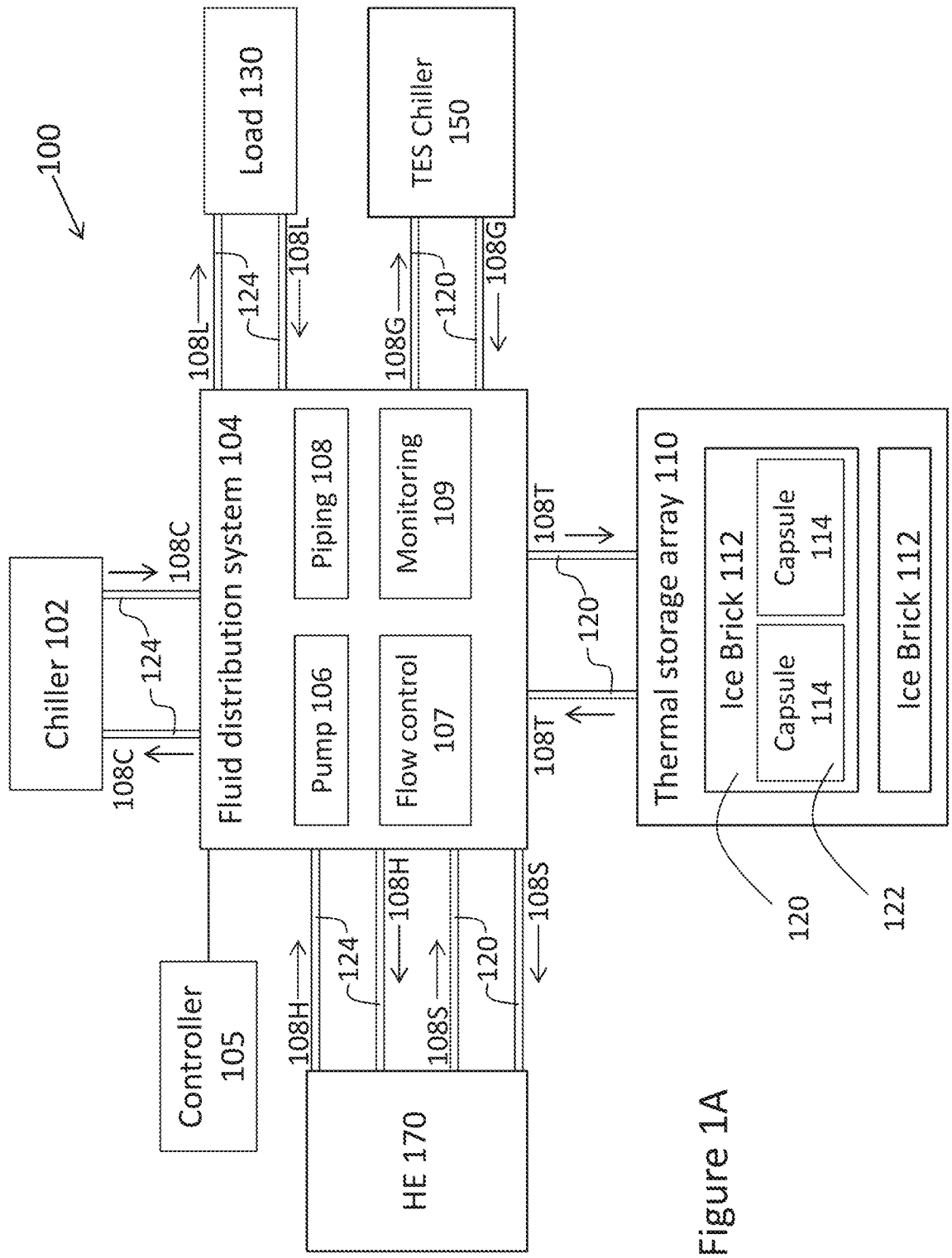
FIGS. 1A-1E are schematic diagrams of a thermal energy storage system according to at least some embodiments of the present invention.

The present invention, in some embodiments thereof, relates to thermal-containers and, more particularly, but not exclusively, to exchanging heat by fluid flow adjacent phase-changing material in thermal-storage containers of thermal storage systems.

Overview

An aspect of some embodiments of the present invention relates to thermal-storage containers in thermal systems, exchanging heat by heat-exchanging fluid having a long flow path adjacent heat-exchanging surfaces inside the thermal-storage container.

According to some embodiments, a long path is defined as a length of flow in which, at a known velocity, the fluid will spend a longer time in proximity to heat-exchanging surfaces than the time required for a fluid to flow in the known velocity through the length of the container if travels directly from a fluid entry port to a fluid exit port.

According to some embodiments, the heat-exchanging fluid flows in one or more paths, from an inlet to an outlet, in channels defined along heat-exchanging surfaces. In some embodiments, the length of flow path is the defined as the median length of flow in which 80% of fluid travels, ignoring turbulence with a radius smaller than 1 cm.

According to some embodiments, the length of flow within the thermal-storage container is extended by having a meandering flow along the flow path, between the entry port and the exit port of the fluid.

According to some embodiments, the length of flow within the container is extracted by numerical simulations.

According to some embodiments, the shape of the flow is wide and shallow. In some embodiments, the flow is bounded to be shallow within narrow channels within the container and the flow-cut area at these channels is small. In some embodiments, the flow path defines one or more turns, and the flow turns about its narrow side. According to some embodiments, the container defines a high ratio between the length of the fluid flow path and the flow-cut area. In some embodiments, the container having a small flow-cut area, has a small cross-section area along its length, and the ratio between the cross-section area and the length is small. In some embodiments, the ratio between the length of the flow and the flow-cut area should be in the range of 10-800 cm/cm2. In some embodiments, the ratio between the length of the flow and the flow-cut area should be in the range of 20-600 cm/cm2. In some embodiments, the ratio between the length of the flow and the flow-cut area should be in the range of 40-400 cm/cm2.

According to some embodiments, a long flow path in the thermal-storage container is defined by having two or more fluidly connected chambers, each for fluid flow in different general flow direction.

An aspect of some embodiments of the present invention relates to thermal-storage containers, having capsules for accommodating phase-changing material, and exchanging heat by heat-exchanging fluid having a flow path adjacent heat-exchanging surfaces, which are side surfaces of the capsules.

According to some embodiments, most of the heat-exchanging fluid is adjacent the phase-changing material. In some embodiments, at least 60% of the volume of the heat-exchanging fluid is within 5 mm of phase-changing material. In some embodiments, at least 75% of the volume of the heat-exchanging fluid is within 5 mm of phase-changing material. In some embodiments, at least 90% of the volume of the heat-exchanging fluid is within 5 mm of phase-changing material.

According to some embodiments, when phase-changing material in a capsule includes ice, most of the heat-exchanging fluid that flows next to the capsule is adjacent ice. In some embodiments, the design of the flow path allows ice to be mostly near coolant. In some embodiments, at least 70% of ice in capsule is within 5 mm of heat-exchanging fluid. In some embodiments, at least 80% of ice in capsule is within 5 mm of heat-exchanging fluid. In some embodiments, at least 90% of ice in capsule is within 5 mm of heat-exchanging fluid. In some embodiments, most of the ice is within 5 mm from the heat-exchanging surfaces. In some embodiments, most of the ice is within 3 mm from the heat-exchanging surfaces. In some embodiments, most of the ice is within 2 mm from the heat-exchanging surfaces.

According to some embodiments, most of the phase-changing material is adjacent the heat-exchanging fluid. In some embodiments, at least 30% of the volume of the phase-changing material is within 5 mm of the heat-exchanging fluid. In some embodiments, at least 70% of the volume of the phase-changing material is within 5 mm of the heat-exchanging fluid. In some embodiments, at least 80% of the volume of the phase-changing material is within 5 mm of the heat-exchanging fluid. In some embodiments, at least 40% of the volume of the phase-changing material is within 7 mm of the heat-exchanging fluid.

According to some embodiments, the capsules are flat, and the flow along channels is turbulent and allows a wider flow channel to act as narrower flow channel with respect to avoiding boundary effects, due to mixing of fluid.

According to some embodiments, capsules are configured to meander the flow in a longer path to increase that the total time the fluid is in contact with heat exchange surfaces.

An aspect of some embodiments of the present invention relates to thermal-storage container in thermal systems, exchanging heat by a flow of fluid through the thermal-storage container between a fluid inlet and a fluid outlet, and the time spent by the fluid on the heat-exchanging surfaces is at least 90% of the flow time between the fluid inlet and the fluid outlet.

An aspect of some embodiments of the present invention relates to thermal-storage container in thermal systems, exchanging heat by a flow of fluid through the thermal-storage container, dividing the flow into a plurality of sub-flows, and mixing the sub-flows to reduce the temperature stratification in the sub-flows.

An aspect of some embodiments of the present invention relates to thermal-storage container in thermal systems, the thermal-storage container includes capsules, each having two or more heat-exchanging surfaces, for exchanging heat with a flow of fluid through the thermal-storage container and over two or more of the surfaces.

An aspect of some embodiments of the present invention relates to thermal-storage container in thermal systems, exchanging heat by a turbulent fluid flow on heat-exchanging surfaces which are in contact with phase-changing material inside the thermal-storage container.

According to some embodiments, the thermal-storage container comprises one or more portions, structured to set a desired fluid flow profile within at least the portion. In some embodiments, setting a fluid flow profile, affects the flow profile in downstream portions.

According to some embodiments, setting a profile includes generating a turbulent fluid flow profile. In some embodiments, the desired fluid flow profile includes turbulence intensity. In some embodiments, setting the fluid flow profile includes increasing the turbulence intensity.

According to some embodiments, the thermal-storage containers have a plurality of capsules, and setting the flow parameters is by orientating the capsules to control the flow path or size. In some embodiments, the flow parameters are modified by positioning the capsules in varying orientations along the length of the container.

According to some embodiments, the capsules in an upstream portion are positioned in different orientation of capsules in downstream portions. In some embodiments, the orientation of capsules is modified by having capsules orientated transversely to other capsules.

According to some embodiments, the thermal-storage container is longitudinal extending along a longitudinal axis. In some embodiments, the orientation of the capsules is defined in respect to the longitudinal axis. In some embodiments, the orientation of a capsule is defined as the angle of rotation about the longitudinal axis. In some embodiments, the orientation of capsules in some portions of the container is perpendicular to the orientation of capsules in other portions. In some embodiments, the orientation of capsules in one portion is perpendicular to the orientation of capsules in the downstream or the upstream portions.

According to some embodiments, at least some of the capsules are oriented vertically, so that their heat-exchanging surfaces are in a vertical position. In some embodiments, a vertical position is defined as heat-exchanging surfaces oriented in a vertical position and parallel to the longitudinal axis of the thermal-storage container. In some embodiments, the orientation of capsules in some portions of the container is horizontal so that their heat-exchanging surfaces are horizontal. In some embodiments, adjacent portions have alternating capsules orientation, some in a vertical orientation and some are in a horizontal orientation.

An aspect of some embodiments, of the present invention relates to thermal-storage container in thermal systems, exchanging heat by a fluid flow through a labyrinth, adjacent phase-changing material inside the thermal-storage container.

According to some embodiments, the labyrinth is defined by capsules containing the phase-changing material, so it does not mix with coolant. In some embodiments labyrinth is configured to maintain fluid passages when capsules expand due to freezing of the phase-changing material. In some embodiments, labyrinth has spacers which prevent blocking of fluid passages.

An aspect of some embodiments, of the present invention relates to connecting thermal storage containers, or bricks, in series, and configuring heat transfer fluid to optionally bypass a brick when desired.

In order to increase discharge percentage of stored capacity for a given configuration of capsules (shape and material) a possible configuration is to connect bricks in series.

Some potential benefits of connecting bricks in series include:

downstream capsules, which may still be fully charged or only have a small portion of their capacity discharged, potentially continue to cool heat transfer fluid to desired temperature (for example lower than 5 deg. Celsius) and the arrangement of the bricks in series potentially continues to extract cooling capacity from the highly discharged capsules located up-stream;

having less connections to main headers.

A potential disadvantage may be that a higher pressure drop may develop than when not connecting the bricks in series, or connecting the bricks in a shorter series.

In some embodiments, a flow control mechanism configured to act as an optional bypass device is optionally installed, such as an on/off valve or a pressure relief valve connected to a discharge header. In such a case a more-downstream frozen brick can optionally be bypassed in order to reduce pressure drop.

In some embodiments a combination connecting bricks in series and also enabling bypass upon command potentially enable a discharge rate as required while keeping pressure drop below a required limit.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Thermal-containers, and exchanging heat by fluid flow adjacent phase-changing material in thermal-storage containers of thermal storage systems are described herein. In addition, it is pointed out that additional descriptions can be found in International Patent Application Number PCT/IB2018/001091.

Fluid Flow Paradigms

Figure 10A:
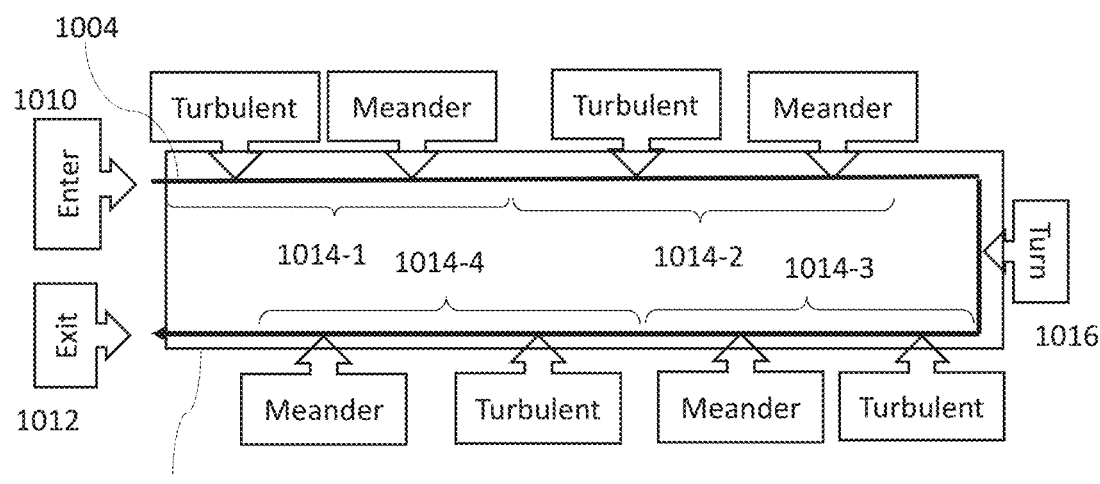
FIGS. 10A-10B are simplified schematic illustrations of a heat-exchanging fluid flow inside thermal-storage containers, according to some embodiments of the invention.
Figure 10B:
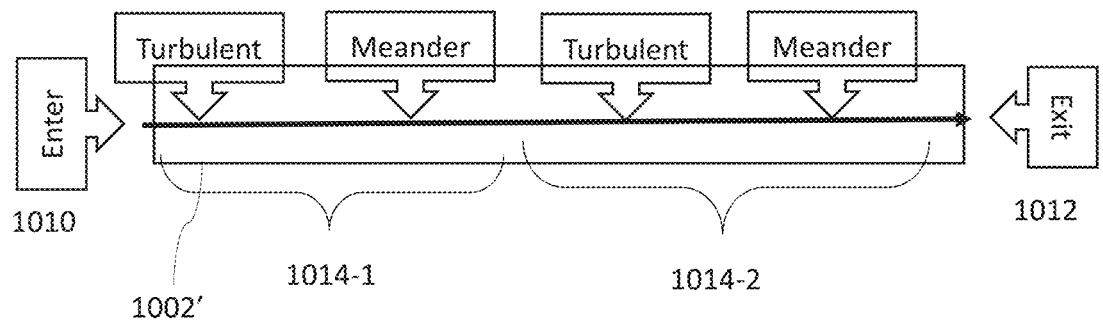

Turning to FIGS. 10A-10B, which are simplified schematic illustrations of a heat-exchanging fluid flow inside thermal-storage containers, according to some embodiments of the invention.

According to some embodiments, the thermal-storage containers are configured to receive a heat-exchanging fluid, transfer the fluid inside the thermal-storage container to flow the fluid on heat-exchanging surfaces, and output the fluid. According to some embodiments, heat-exchanging is for reducing the temperature of the fluid between entry and exit of the thermal-storage container. In some embodiments, the heat-exchanging surfaces are cold surfaces, cooled by using phase-changing material.

As shown in FIGS. 10A and 10B, the heat-exchanging fluid 1004 has the following flow stations within a thermal-storage container 1002.

Entry 1010—In some embodiments, the fluid enters thermal-storage container 1002 via a fluid inlet.

Exit 1012—In some embodiments, the fluid exits thermal-storage container 1002 via a fluid outlet.

In some embodiments, for example, as shown in FIG. 10A, the entry 1010 and exit 1012 are on the same side of thermal-storage container 1002. In some embodiments, for example, as shown in FIG. 10B, the entry 1010 and exit 1012 are on opposite sides of thermal-storage container 1002'. In some embodiments, entry 1010 and exit 1012 are on different sides of thermal-storage container 1002', which are not opposite to each other, for example, perpendicular to each other.

According to some embodiments, in between entry 1010 and exit 1012, the fluid flows through a plurality of stations 1014, having a desired fluid flow profile.

According to some embodiments, one or more of the stations 1014 set the fluid path as meandering. A potential advantage of having a meandering flow is increasing the flow length within container 1002 on heat-exchanging surfaces and extending the thermal convection per the length of the thermal-storage container.

According to some embodiments, one or more of stations 1014 set the fluid flow to be turbulent. In some embodiments, meandering the flow increases the turbulence intensity.

A potential advantage of a turbulent flow, is mixing of the fluid and preventing the forming of layers of fluid. Mixing of the fluid potentially increases the amount of fluid exchanging heat with heat-exchanging surfaces per length of the thermal-storage container. In some embodiments, increasing the turbulent flow, reduces the temperature of the fluid faster. According to some embodiments, the Reynolds number of the fluid flow inside container 1002/2' is controlled by flow paradigms defined by flow stations 1014. In some embodiments, the Reynolds number is increased in one or more of stations 1014, potentially causing higher heat transfer coefficient. Increasing the Reynolds number potentially make the temperatures of the fluid more uniform.

In some embodiments, fluid flow 1004 is high turbulent (e.g. in the range of 100-300 W/(m$^2$*K)) in at least 35% of the fluid flow path (between entry 1010 and exit 1012) within thermal-storage container 1002. In some embodiments, fluid flow 1004 is high turbulent in at least 50% of the fluid flow path (between entry 1010 and exit 1012) within thermal-storage container 1002. In some embodiments, fluid flow 1004 is high turbulent in at least 70% of the fluid flow path (between entry 1010 and exit 1012) within thermal-storage container 1002. In some embodiments, flow is low turbulent at the rest of the flow path. In some embodiments, flow is laminar at the rest of the flow path.

According to some embodiments, the increase of pressure drop of the fluid is less than 15% when transitioning flow to be high turbulent.

According to some embodiments, the fluid flow is divided into a plurality of sub-flows, and meandering of the sub-flows mixes the sub-flows. A potential advantage of dividing to sub-flows is an increase of flow contact with heat-exchanging surfaces. A potential advantage of mixing the sub-flows is reducing temperature gradients within the flow along the flow path.

As shown in FIG. 10A, in some embodiments, one or more of the flow stations is a turn 1016 in the direction of flow 1004, for example a U turn towards a fluid outlet. In some embodiments, flow 1004 has multiple turns 1016 between entry 1010 and exit 1012. In some embodiments, a turn is in the range of 5 to 90°. In some embodiments, a turn is in the range of 15 to 75°. In some embodiments, a turn is in the range of 30 to 60°. In some embodiments, a turn is in respect to a horizontal plan. In some embodiments, a turn is in respect to a vertical plan.

Exemplary Method of Flowing Heat-Exchanging Fluid

Figure 11:
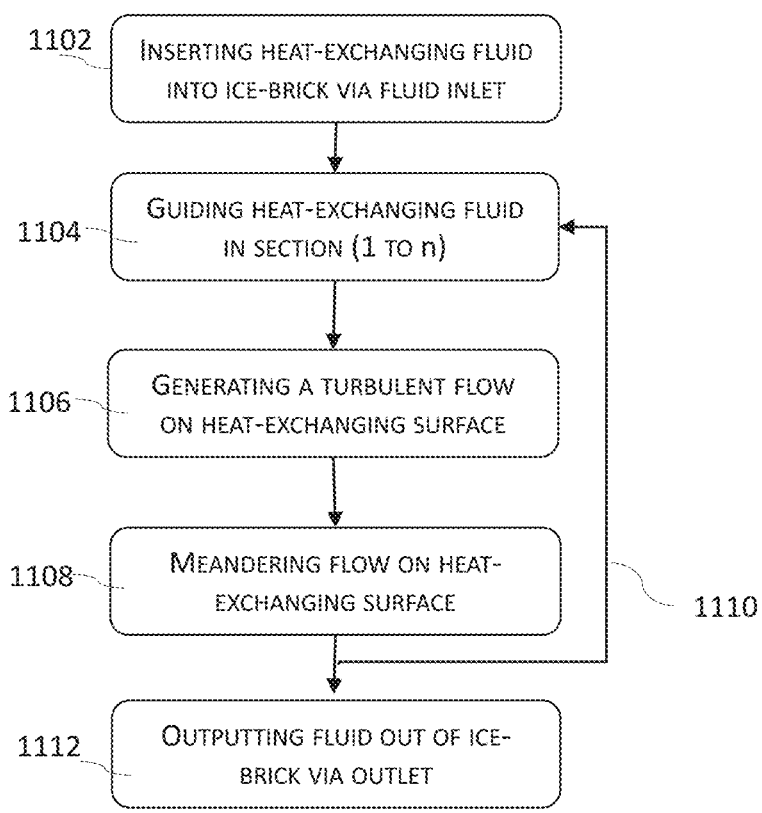
FIG. 11 is a simplified flow chart of a method of flowing heat-exchanging fluid inside thermal-storage containers, according to some embodiments of the invention.

Turning to FIG. 11, which is a simplified flow chart of a method of flowing heat-exchanging fluid inside thermal-storage containers, according to some embodiments of the invention.

FIG. 11 is an example of an embodiment for flowing heat-exchanging fluid that has one or more of the flow paradigms described in FIGS. 10A-10B. Flowing the fluid can have the following steps. Generating the flow paradigms Inserting 1102 of heat-exchanging fluid into the thermal-storage container, via a fluid inlet.

According to some embodiments, fluid is pumped into the thermal-storage container with flow rate of 0.2 to 1.5 m³/Hr per RT (wherein RT is cooling rate measured in Refrigeration Ton). In some embodiments, pumping fluid is in a rate of 0.3 to 1.0 m³/Hr. In some embodiments, pumping fluid is in a rate of 0.5 to 0.7 m³/Hr.

According to some embodiments, thermal-storage containers are defined as pressure-vessels. In some embodiments, the fluid is pumped into container, which is defined as pressure-vessel, in a pressure of 1 to 4 Bar (g). In some embodiments, the fluid is pumped into container, which is defined as pressure vessel, in a pressure of 1.5 to 3.5 Bar (g). In some embodiments, the fluid is pumped into container, which is defined as pressure vessel, in a pressure of 2 to 3 Bar (g). In some embodiments, thermal-storage containers are not defined as pressure-vessels. In some embodiments, the fluid is pumped into container, which is not defined as pressure-vessel, in a pressure of 0.1 to 2 Bar (g). In some embodiments, the fluid is pumped into container, which is not defined as pressure-vessel, in a pressure of a pressure of 0.3 to 1.5 Bar (g). In some embodiments, the fluid is pumped into container, which is not defined as pressure-vessel, in a pressure of a pressure of 0.7 to 1 Bar (g).

Guiding 1104 heat-exchanging fluid in a thermal-storage container section.

According to some embodiments, guiding 1104 is for exchanging thermal energy with phase-changing material inside the section. In some embodiments, guiding 1104 includes changing the flow direction towards one or more flow paths within the section.

According to some embodiments, containers have uniform capsules, installed in a continuous orientation, and having continuous even cross section between them, thereby not having a plurality of sections inside the container.

Generating 1106 a turbulent flow on heat-exchanging surface inside the section.

According to some embodiments, generating 1106 includes increasing the intensity of the turbulent flow.

Meandering 1108 flow on heat-exchanging surface.

Repeating one or more of steps guiding 1104, generating 1106, and meandering 1108. According to some embodiments, thermal-storage container includes a plurality (n) of sections, and repeating 1110 is for one or more times for other sections of the thermal-storage container. In some embodiments, the number of sections (n) is between 3 to 30. In some embodiments, the number of sections (n) is between 5 to 20. In some embodiments, the number of sections (n) is between 6 to 10. In some embodiments, repeating 1110 is terminated when flow is at a section having the fluid outlet.

Outputting 1112 the fluid from the thermal-storage container via a fluid outlet.

According to some embodiments, the order of steps 1104 to 1110 is different than shown in FIG. 11. For example: meandering 1108 can be prior to generating 1106, and meandering 1108 can be simultaneous or partially overlapping generating 1106.

According to some embodiments, the thermal system includes a plurality of fluidly connected thermal-storage containers, and steps 1102 to 1112 is repeated for the thermal-storage containers.

Thermal-Storage Container Structures

Turning to FIGS. 12A-12E, which are simplified schematic illustrations of side views and cross-sectional views of a thermal-storage container, according to some embodiments of the invention.

According to some embodiments, for example as shown in FIGS. 12A-12E, thermal-storage container 1200 comprises housing 1202, fluid inlet 1204, and fluid outlet 1206. In some embodiments, thermal-storage container 1200 has more than one fluid inlet 1204. In some embodiments, thermal-storage container 1200 has more than one fluid outlet 1206, for example, to fluidly connect container 1200 to multiple downstream containers.

Figure 12A:
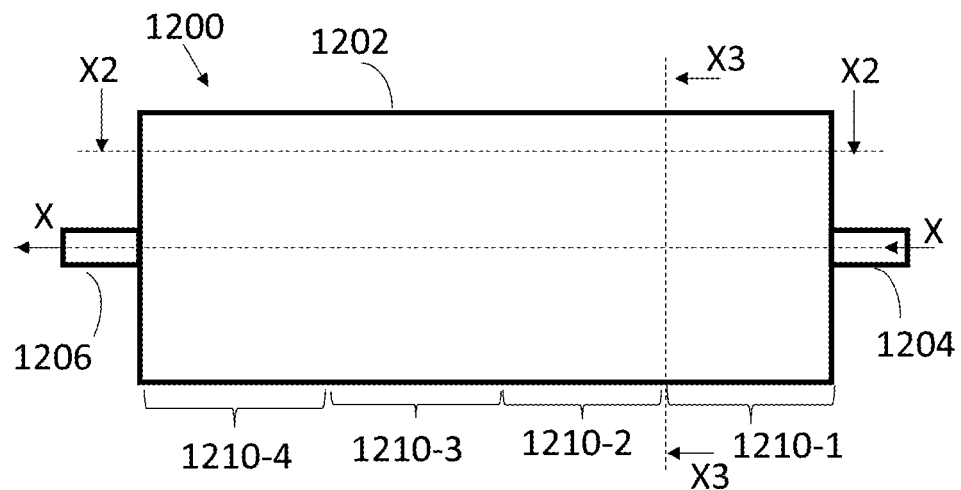
FIGS. 12A-12E are simplified schematic illustrations of side views and cross-sectional views of a thermal-storage container, according to some embodiments of the invention.
Figure 12B:
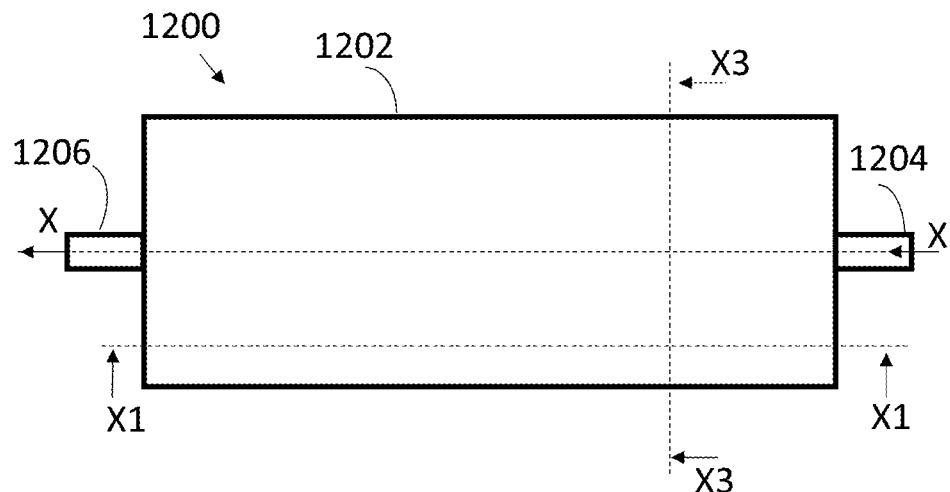
Figure 12C:
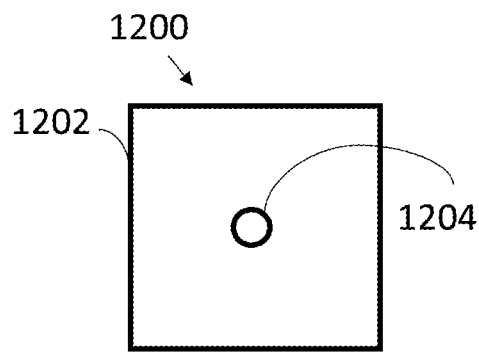
Figure 12D:
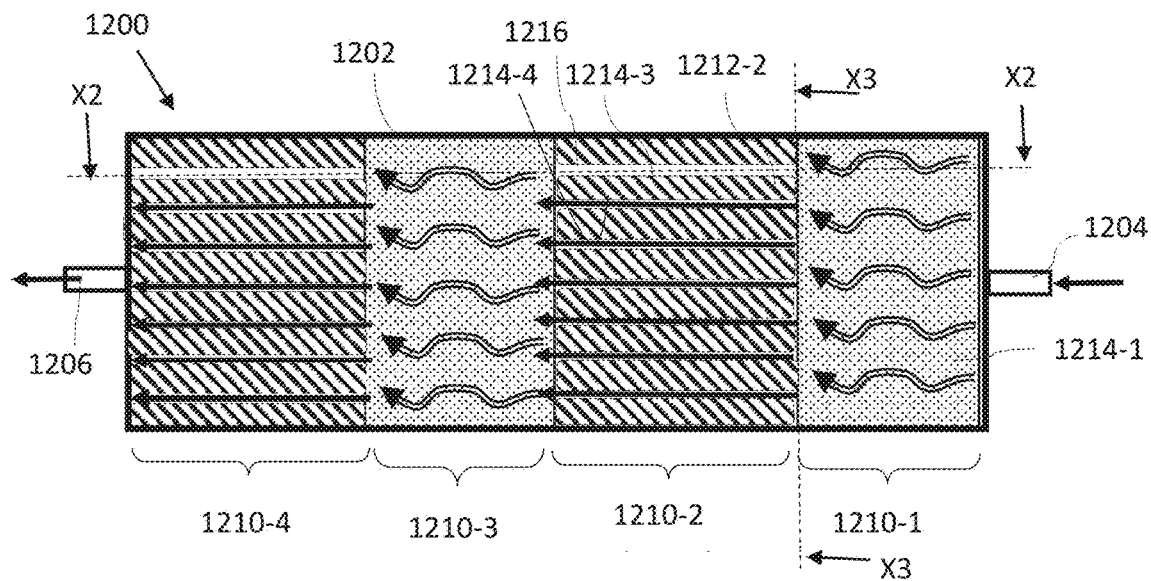
Figure 12E:
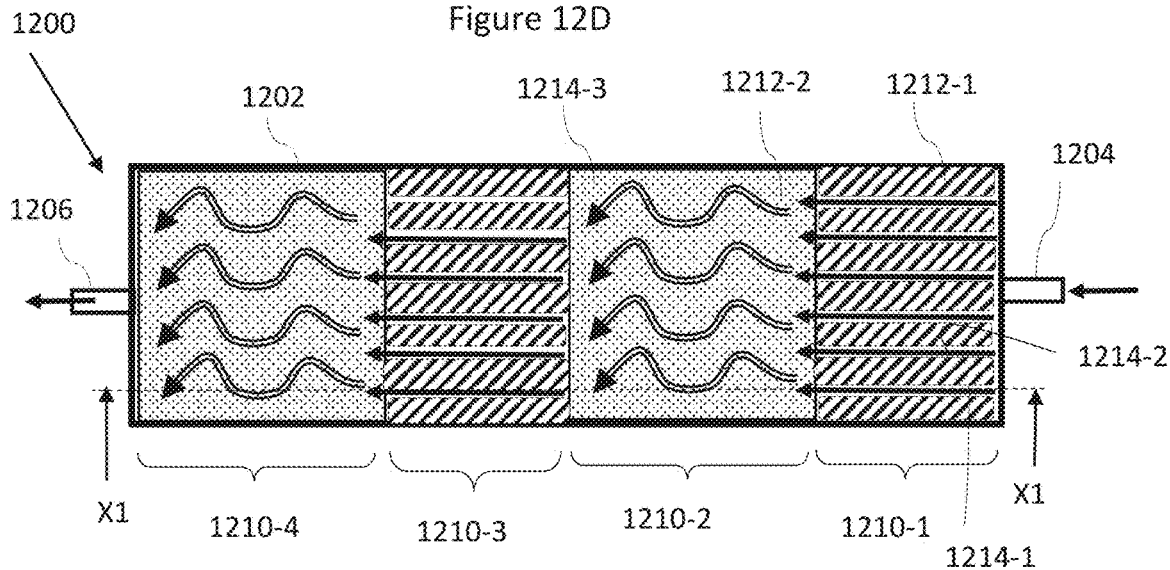

Thermal-storage container 1200 illustrated in FIGS. 12D-12E comprises a plurality of sections 1210 (e.g. sections 1210-1 to 1210-4). Each of sections 1210 accommodates one or more capsules 1212 containing phase-change material and having heat-exchanging surfaces. In some embodiments, the number of sections in thermal-storage container 1200 is higher than 20. In some embodiments, the number of sections of thermal-storage container 1200 is between 3 to 30. In some embodiments, the number of sections thermal-storage container 1200 is between 5 to 20. In some embodiments, the number of sections of thermal-storage container 1200 is between 6 to 10. In some embodiments, the number of capsules in a section is more than 3. In some embodiments, the number of capsules in a section is more than 5. In some embodiments, the number of capsules in a section is more than 10.

As shown in FIGS. 12A-12C, container 1200 is longitudinal, having a general longitudinal axis X. As shown in FIGS. 12A-12C, the cross sections of housing 1202 is optionally uniform along longitudinal axis X. In some embodiment, the cross section of housing 1202, taken perpendicular to longitudinal axis X, has a uniform shape with varying dimensions along the length of thermal-storage container 1200. According to some embodiments, the cross section of thermal-storage container 1200 taken perpendicular to longitudinal axis X is polygonal. In some embodiments, the cross section includes one or more curved edges. In some embodiments, the cross section has two or more straight edges. As shown in FIG. 12C, the cross-section of thermal-storage container 1200 is rectangular. In some embodiments, the height of thermal-storage container 1200 is shorter than its width, thereby thermal-storage container 1200 has a lower profile. In some embodiments, the width of thermal-storage container 1200 is shorter than its height, thereby thermal-storage container 1200 has a narrow profile. In some embodiments, the cross-section of thermal-storage container 1200 is square.

Turning to FIGS. 12D and 12E, which are simplified schematic illustrations of cross-sectional views of thermal-storage container 1200, at sections X1-X1 and X2-X2, according to some embodiments of the invention.

Figure 12F:
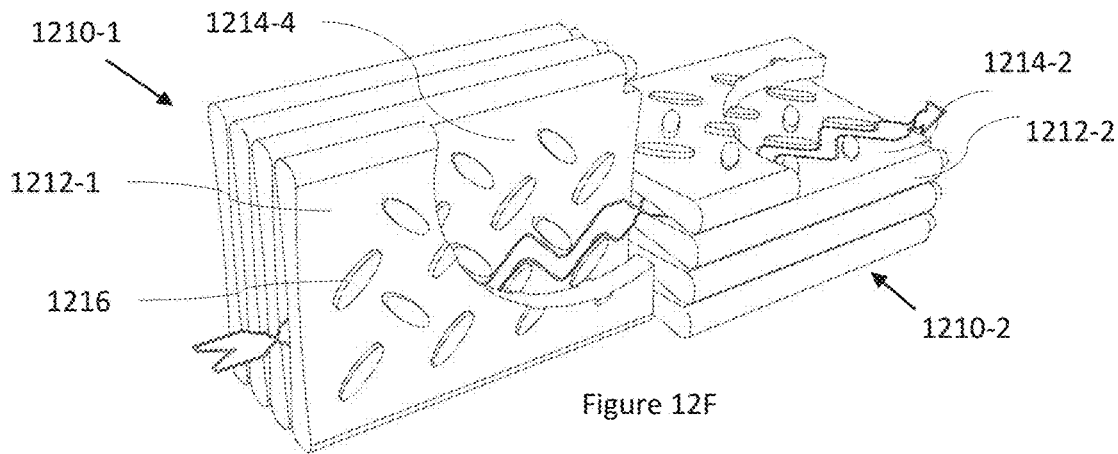
FIG. 12F is simplified schematic illustration of a perspective view of capsules used in a thermal-storage container, according to some embodiments of the invention.

According to the embodiments, for example as shown in FIGS. 12D-12F, each of sections 1210 accommodate one or more capsules 1212 containing phase-change material and having heat-exchanging surfaces (e.g. 1214-½ for capsule 1212-1, and 1214-¾ for capsule 1212-2).

According to some embodiments, capsules 1212 are positioned to have a plurality of fluid flow passages 1216 between heat-exchanging surfaces 1214. In some embodiments, fluid flow passage 1214 is defined between adjacent heat-exchanging surfaces 1214. In some embodiments, as described elsewhere herein, at least some of the capsules are arranged in pairs of connected capsules, each has a heat-exchanging surface facing a heat-exchanging surface of the other with a gap between the surfaces, which is a fluid passage. In some embodiments, as described elsewhere herein (, spacers prevent blocking of passages, e.g. when capsules expand due to freezing of inside phase-changing material.

According to some embodiments, passages 1216 define a flow labyrinth, in which flow is directed in changing directions. In some embodiments, the flow labyrinth is adjacent the heat-exchanging surfaces. In some embodiments, when fluid inlet and fluid outlet are positioned in opposite sides of the thermal-storage container, the length of the labyrinth is longer than the length of the thermal-storage container. In some embodiments, when fluid inlet and fluid outlet are positioned at the same side of the thermal-storage container, the length of the labyrinth is longer than twice the length of the thermal-storage container.

Figure 13:
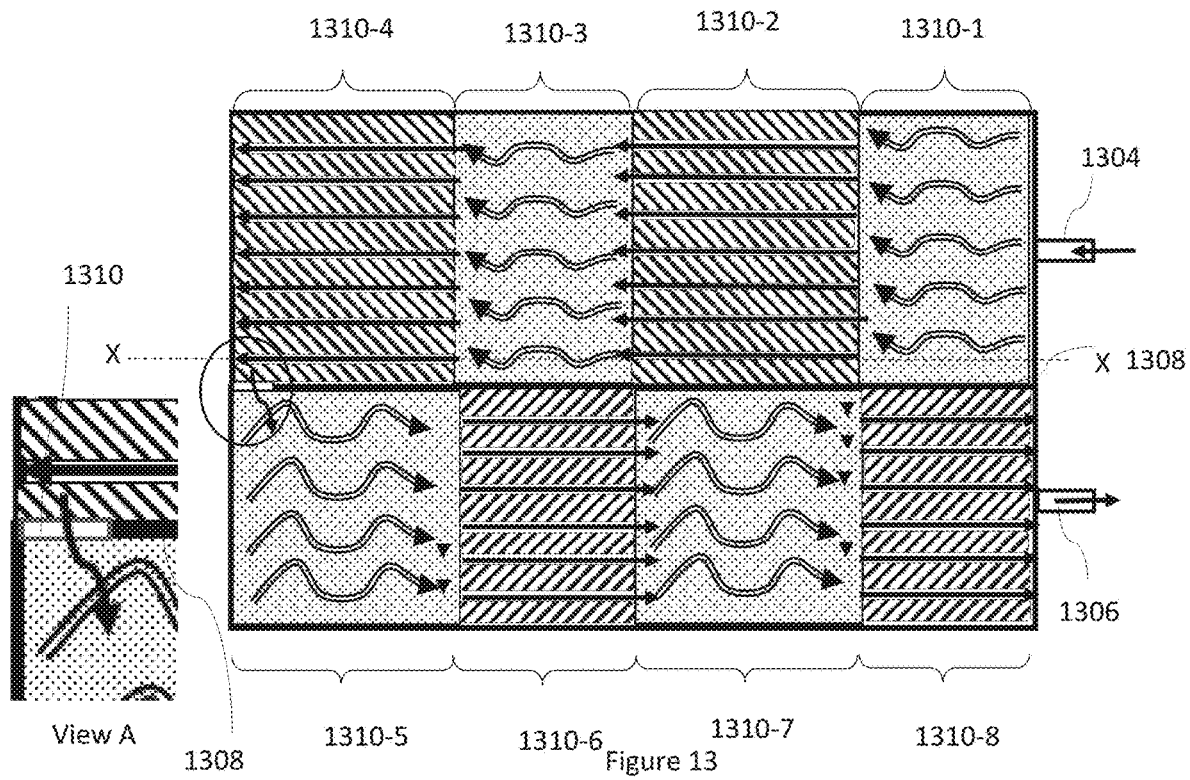
FIG. 13 is simplified schematic illustration of a cross-sectional view of a thermal-storage container, according to some embodiments of the invention.
Figure 14:
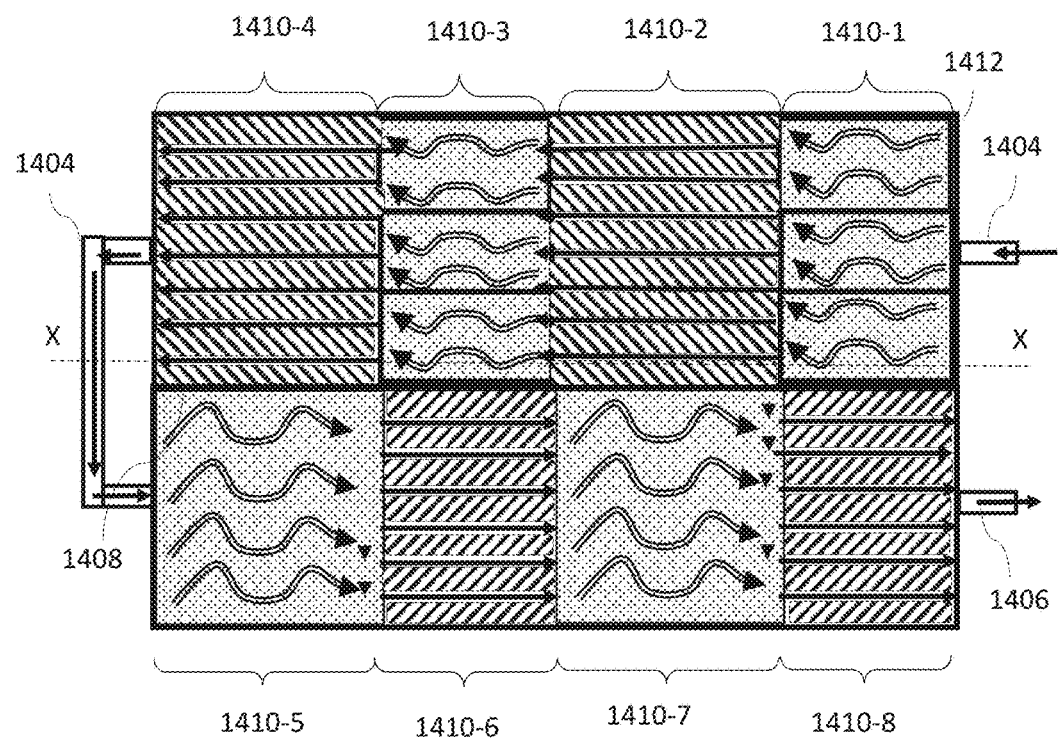
FIG. 14 is simplified schematic illustration of a cross-sectional view of a thermal-storage container, according to some embodiments of the invention.

Turning to FIGS. 13 and 14, which are simplified schematic illustrations of cross-sectional views of thermal-storage containers, according to some embodiments of the invention.

Thermal-storage containers 1300 and 1400, are similar to thermal-storage container 1200, different in having fluid inlet 1304/1404 and fluid outlet 1306/1406 at the same side of housing 1302/1402. As shown in FIGS. 13 and 14, the fluid flow inside containers 1300/1400 is in two directions along longitudinal axis X. First direction is defined according to inlet 1304/1404, and second direction is defined according to outlet 1306/1406.

According to some embodiments, containers 1300/1400 has a dividing wall 1308/1408, which separates the fluid flowing in two directions. In some embodiments, wall 1308/1408 adds stiffness to the structure of containers 1300/1400. According to some embodiments, dividing between sections having different main flow direction is by abutting walls of adjacent capsules located at sections having different flow direction (e.g. section 1410-4 and 1410-5) so that there is no flow path defined in between the abutting capsules. In some embodiments abutting is by coupling adjacent capsules at the narrow faces of the capsules. In some embodiments, abutting is by urging the narrow faces of the adjacent capsules against each other, while their opposite faces are urged against the housing of the container.

According to some embodiment, for example as shown in enlarged view A of FIG. 13, dividing wall 1308, has at least one opening 1310. In some embodiments, opening 1310 fluidly connecting between sections. In some embodiments, opening 1310 enables fluid flow to change direction, e.g. from an inside direction defined by inlet 1304 to an outside direction defined by outlet 1306.

According to some embodiment, for example as shown in FIG. 14, dividing wall 1308, has one or more pipes 1410, fluidly connecting sections. In some embodiments, pipe 1410 enables fluid flow to change direction, e.g. from an inside direction defined by inlet 1404 to an outside direction defined by outlet 1406. In some embodiments, pipe 1410 is disposed at a side surface of housing 1402 opposite to inlet 1404.

In some embodiments, there are one or more spacers next to inlet turning point and/or the outlet, configured to keep a space between the capsules and the container wall that allows fluid flow to spread between the inlet port and the first capsules raw, turning and between the last raw and the exit port.

Some Exemplary Layouts of Capsules Inside a Thermal-Storage Container

According to some embodiments, the internal layout of the thermal-storage container is defined to control the fluid flow path inside the thermal-storage container. In some embodiments, the internal layout changes the flow orientation, resulting in meandering flow patterns along the length of the thermal-storage container.

As shown in FIGS. 7A-7D and FIGS. 12D-14, the capsules fill the thermal-storage containers and engage the walls of the housing of the thermal-storage container. This internal layout of capsules, directs the fluid to flow on heat-exchanging surfaces of the capsules, where gaps are defined. In some embodiments, there is a flush contact between a capsule and the wall of the container, when there are not heat-exchanging surfaces facing the wall.

A potential advantage of directing the flow to the heat-exchanging surface is higher efficiency of thermal discharge of thermal capacity stored in the capsules. Another potential advantage is a faster charging, especially when the container is partially charged.

As shown in FIGS. 12D-12E, according to some embodiments, capsules 1212 are grouped to fit one or more sections 1210 within housing 1202. In some embodiments, a group of capsules 1212, fills the majority of the internal volume of a section, leaving only gaps between heat-exchanging surfaces of the capsules to define flow pathways/labyrinth.

According to some embodiments, the gap between heat-exchanging surfaces of the capsules, when capsules have a frozen phase-changing material, is between 0.5 cm and 10 cm. In some embodiments, the gap between heat-exchanging surfaces of the capsules, when capsules have a frozen phase-changing material, is between 2 cm to 7 cm. In some embodiments, the gap between heat-exchanging surfaces of the capsules, when capsules have a frozen phase-changing material, is between 4 cm to 5 cm.

Figure 2F:
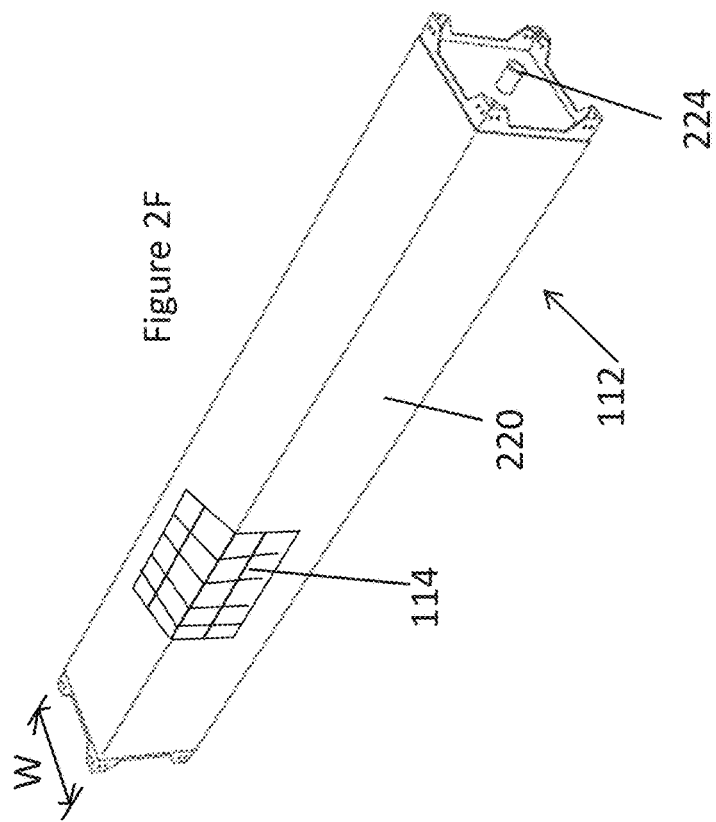
FIGS. 2A-2Y are illustrations of ice bricks, ice capsules and thermal storage arrays according to at least some embodiments of the present invention.
Figure 2E:
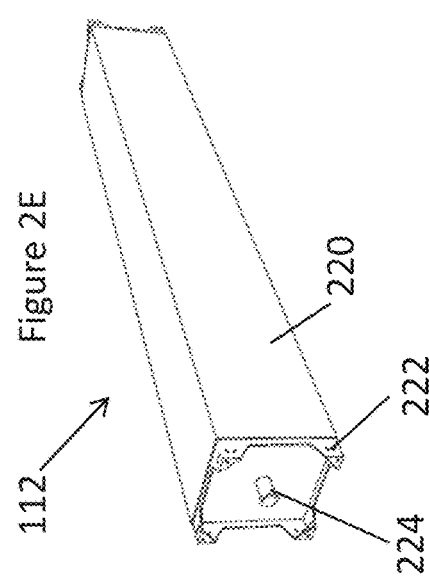
Figure 2G:
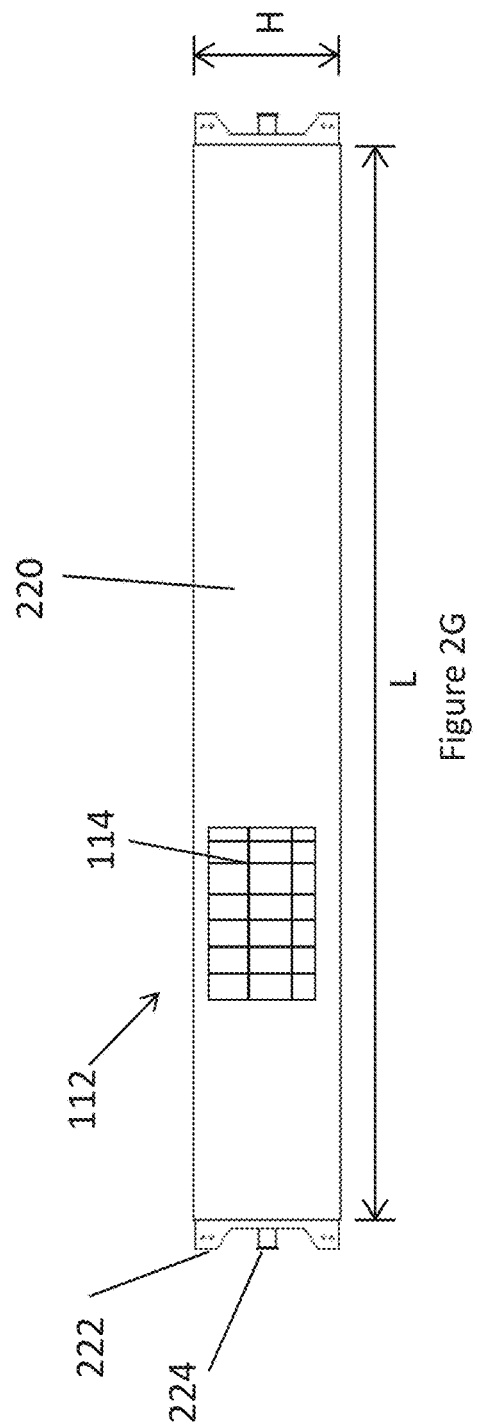
Figure 2H:
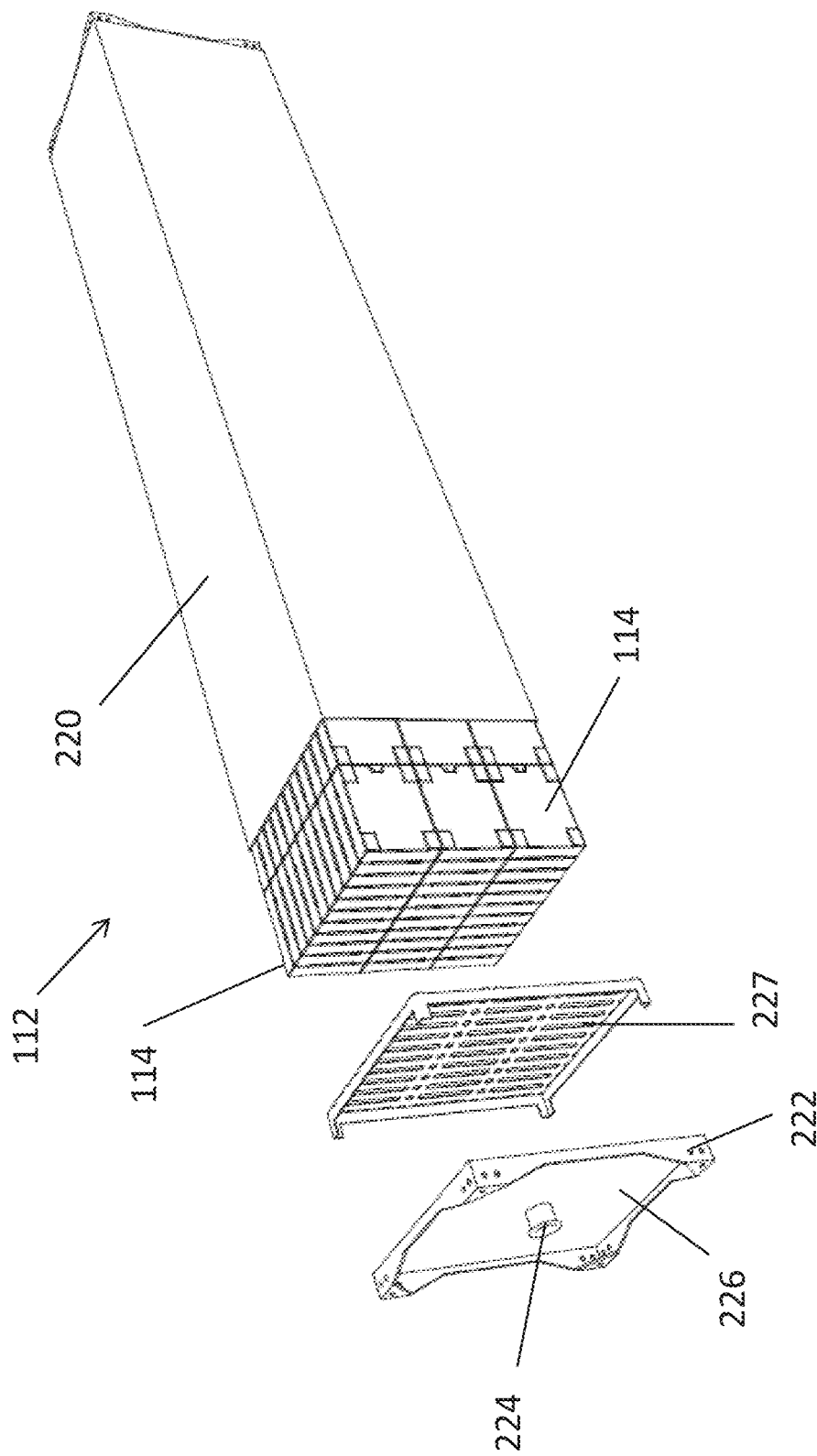
Figure 2K:
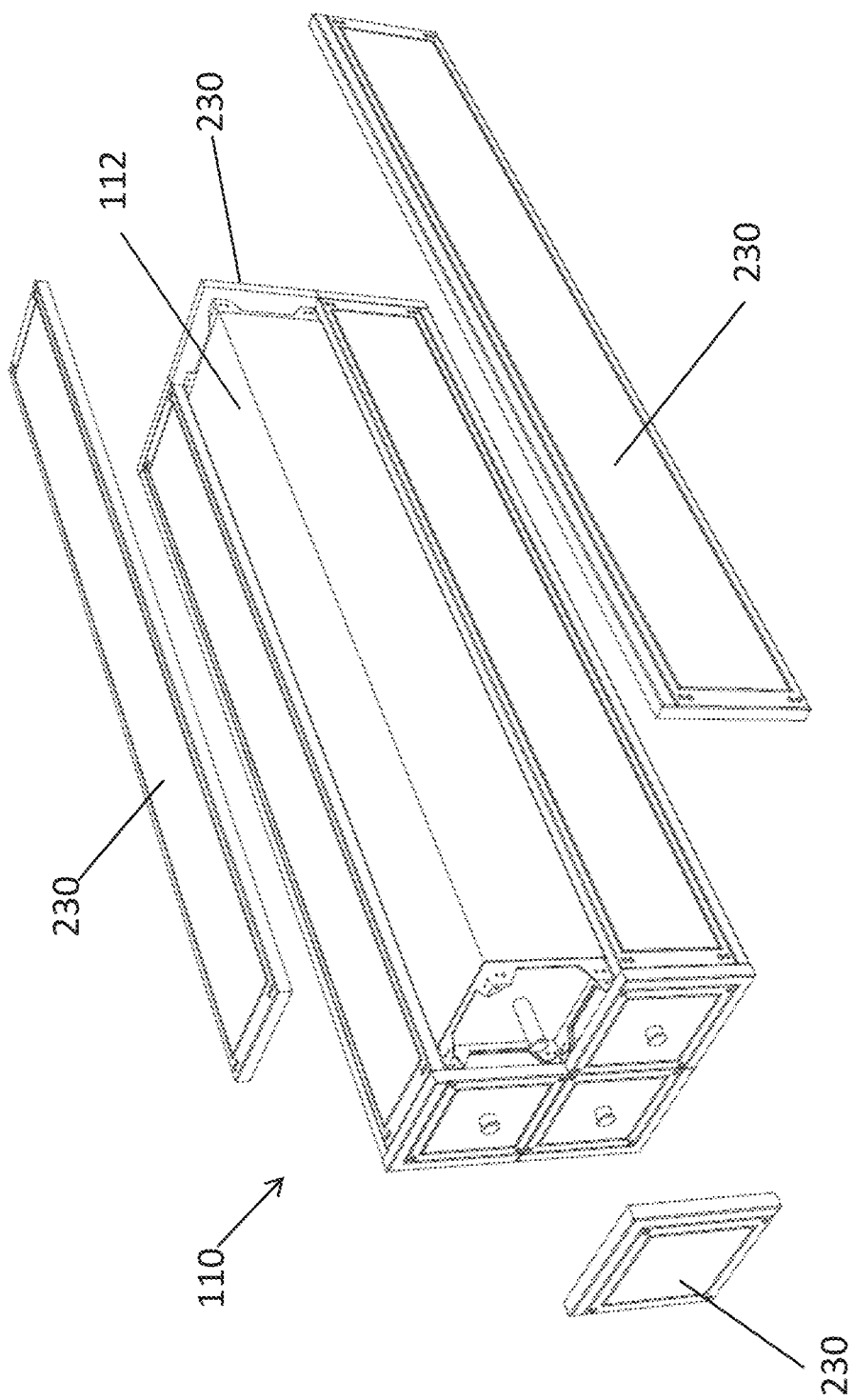
Figure 2L:
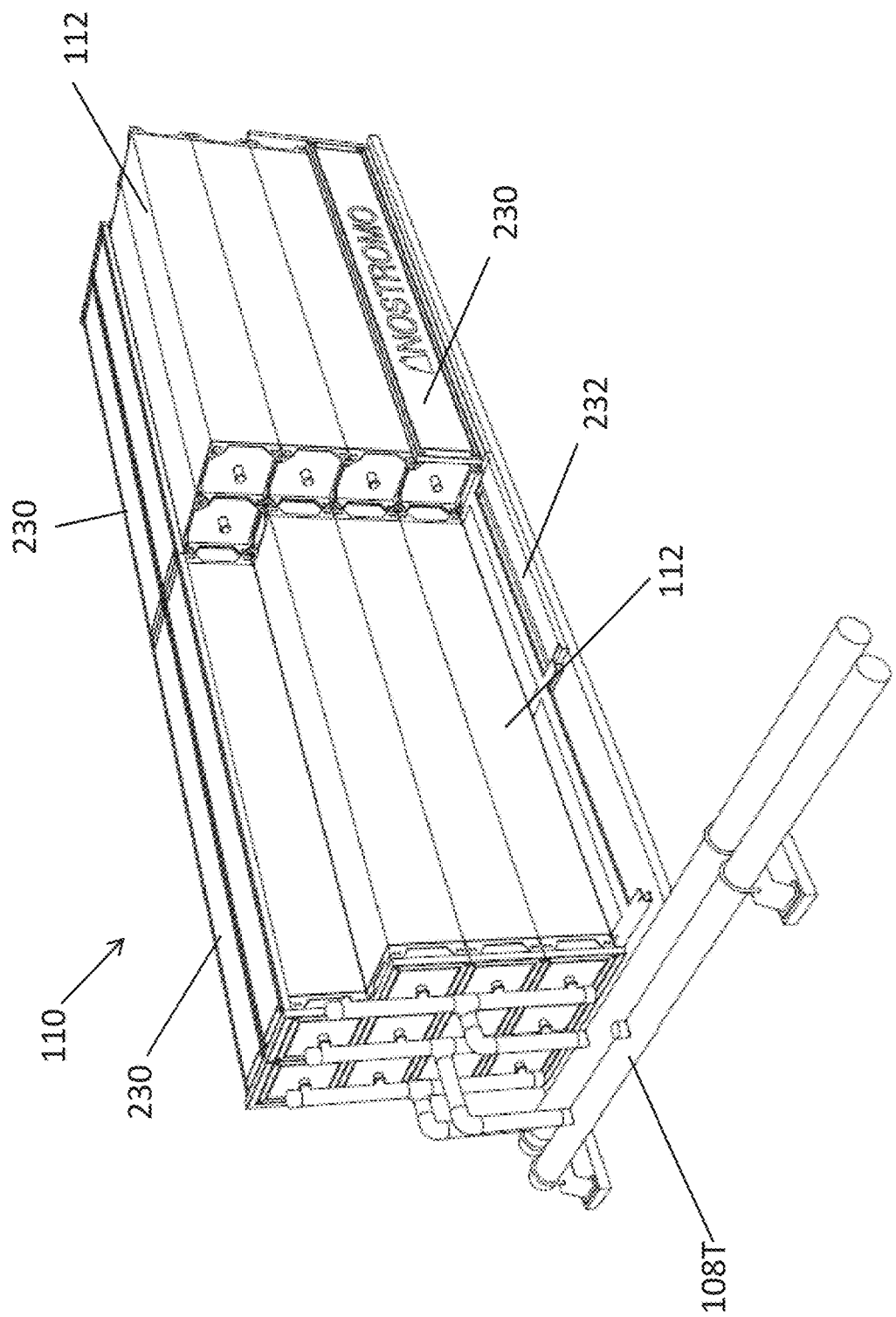
Figure 7A:
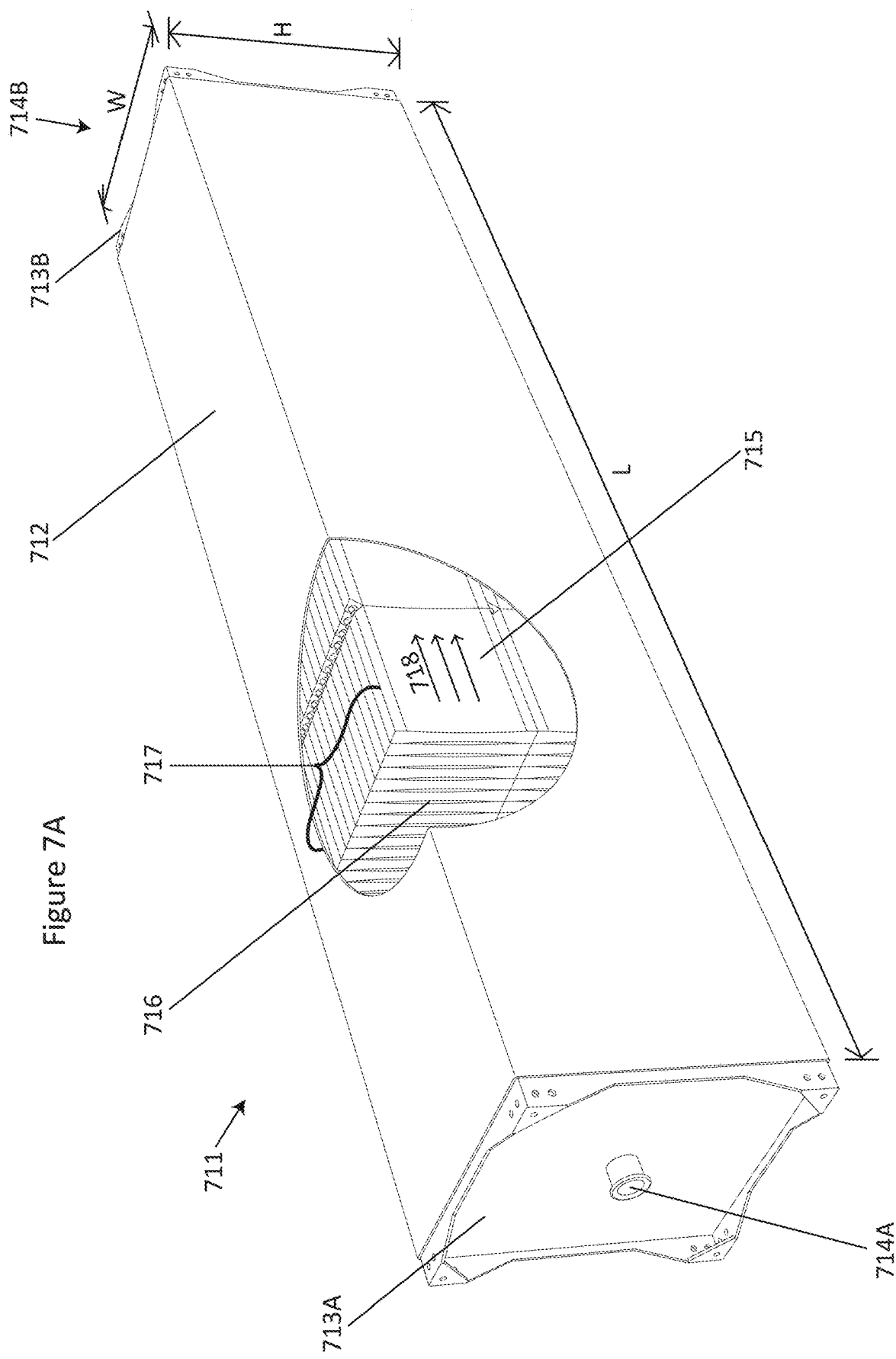

As shown in FIGS. 2H, 7A, and 14, one or more of sections 1410 include a plurality of capsules 114, 715, 1412 laid adjacent to each other at their narrow faces (which are not the heat-exchanging surfaces).

As shown in FIGS. 12D-12E, the orientation of the ice-capsules 1212 is different between sections 1210. In some embodiments, the orientation of capsules 1212 in one section 1210 is different than the orientating of capsules 1212 in the downstream or the upstream section. In some embodiments, the orientation of capsules 1212 is modified by having capsules 1212 in some sections 1210 orientated transversely to capsules 1212 in other sections 1212.

In some embodiments, section 1212 is defined as a portion of the thermal-storage container 1200, having a set/group of capsules 1212 having a uniform orientation. In some embodiments, section 1212 is defined as a portion of the thermal-storage container 1200, having a set/group of capsules 1212 of a uniform type. In some embodiments, a type of capsule is defined by the shape of the capsule. In some embodiments, a type of capsule is defined by the phase-changing material within the capsule.

According to some embodiments, the orientation of capsules 1212 is defined in respect to the longitudinal axis X of thermal-storage container 1200. In some embodiments, the orientation of capsule 1212 includes a rotation angle about longitudinal axis X. As shown in FIGS. 12A-14, in some embodiments, the orientation of capsules 1212 in some sections 1210 is perpendicular to the orientation of capsules 1212 in other sections 1210. In some embodiments, the orientation of capsules 1212 in one section 1210 (e.g. 1210-2) is perpendicular to the orientation of capsules 1212 in the downstream or the upstream section 1210 (e.g. 1210-3).

As shown for example in FIGS. 12A-14 and FIGS. 2H, 7A, according to some embodiments, the orientation of capsules 1212 in some sections 1210 is vertical. In some embodiments, a vertical orientation is defined as capsules 1212 (e.g. 114/715/1212-1) oriented in a vertical position and parallel to longitudinal axis X of the thermal-storage container. As in FIGS. 12A-14, in some embodiments, the orientation of capsules 1212 in some sections 1210 is horizontal.

In some embodiments, adjacent sections (e.g. 1210-1 and 1210-2) have alternating orientation of capsules 1212, some sections 1210 have vertical capsules 1212, and some section 1210 have horizontal capsules 1212.

A potential advantage of placing the capsules in alternating orientation (e.g. horizontal/vertical) is alternating the fluid flow within the container from being is a horizontal orientation to being vertical (and vice versa) every set of capsules. Alternating the fluid flow potentially changes the velocity, turbulence, length, and the direction of fluid while flowing through the gap between the heat-exchanging surfaces of the capsules. These changes potentially create high turbulence (e.g., vortex type) over the heat-exchanging surfaces in downstream sections.

According to some embodiments, the orientation of capsules within a section is not uniform. In some embodiments, the capsules are orientated transversely to others within a single section. In some embodiments, some capsules are vertical and some capsules are horizontal within a single section.

Figure 15A:
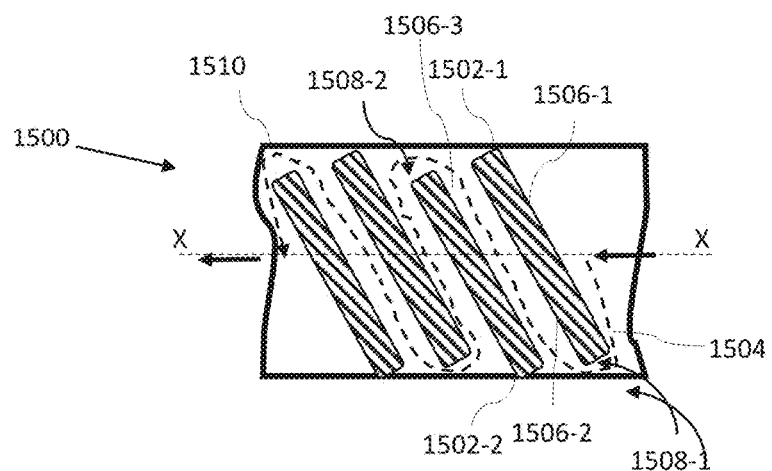
FIGS. 15A and 15B are simplified schematic illustrations of a cross-sectional view of thermal-storage containers, according to some embodiments of the invention.
Figure 15B:
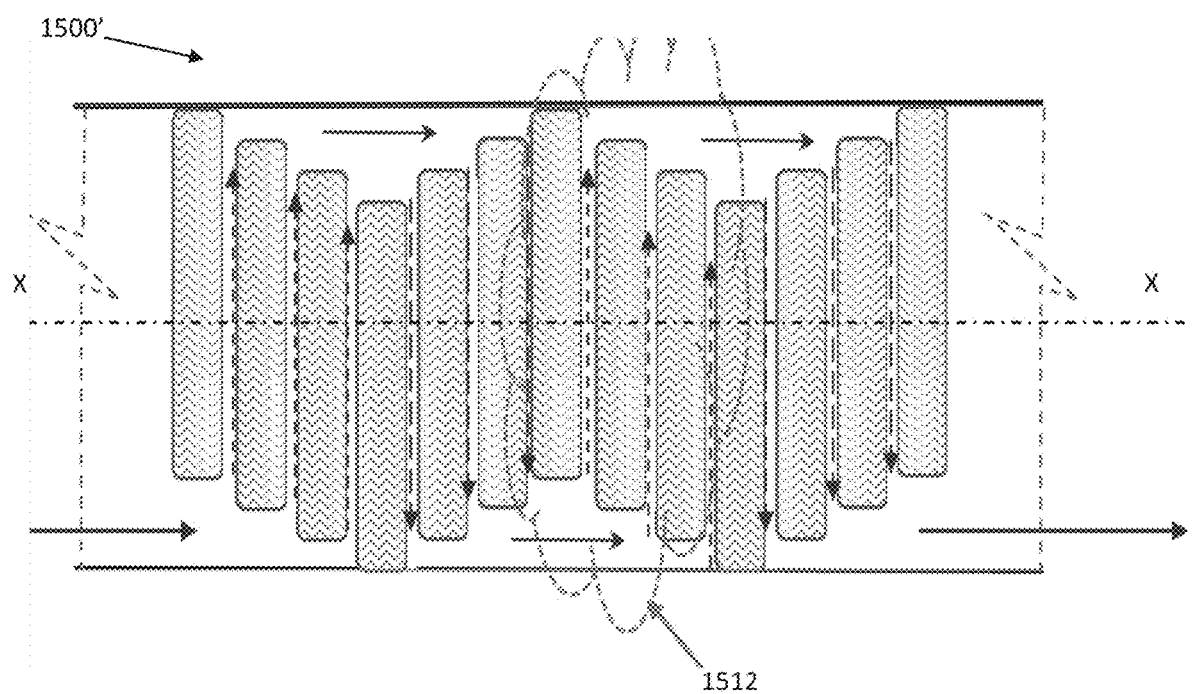

Turning to FIGS. 15A and 15B, which are cross sectional views of a thermal-storage containers, according to some embodiments, of the invention.

As shown in FIGS. 15A and 15B thermal-storage container 1500/1500' optionally include a plurality of capsules 1502, having heat-exchanging surfaces 1506, and disposed within housing 1510 to have heat-exchanging surfaces 1506 orientated transversely to the general flow direction (in longitudinal axis X). The internal layout of capsules 1502 inside housing 1510 defines a meandering flow path 1504 along longitudinal axis X. Capsules 1502 are oriented to direct flow 1504 between heat-exchanging surfaces 1506 via gaps 1508 defined between capsules 1502 and housing 1510. In some embodiments, as shown for example in FIG. 15A, the angle between heat-exchanging surfaces 1506 and the general flow direction is <90°. FIG. 15B shows an example of capsules oriented to have an angle of 90° between heat-exchanging surfaces 1506 and the general flow direction.

According to some embodiments, the cross-section views in FIGS. 15A and 15B are of thermal-storage container 1500/1500' in a top view, so that flow 1504 is turning at least partially in a horizontal direction. In some embodiments, the cross-section views in FIGS. 15A and 15B are of thermal-storage container 1500/1500' in a side view, so that that flow 1504 is turning at least partially in a vertical direction.

FIG. 15A shows an example of a meandering flow path 1504, defined by individual capsules 1502. In some embodiments, as shown for example in FIG. 15B, a meandering flow path 1504, is defined by a group of capsules 1512. In some embodiments, path 1504 is directed to change direction when blocked by one of capsules 1502 in group 1512, which engages a wall of housing 1510. In some embodiments, one or more capsules in group 1510 does not engage the wall of housing 1510, allowing a parallel fluid flow through heat-exchanging surfaces of multiple capsules.

Figure 16:
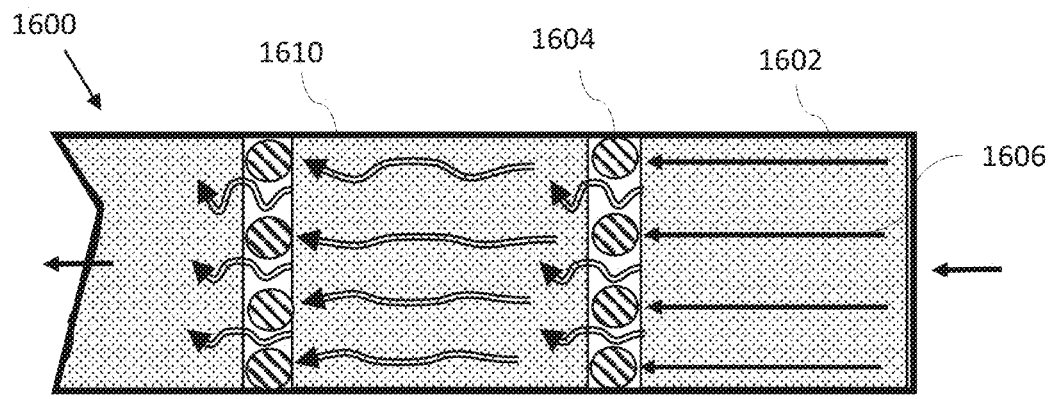
FIG. 16 is simplified schematic illustration of a cross-sectional view of a thermal-storage container, according to some embodiments of the invention.

Turing to FIG. 16, which is a cross sectional view of a thermal-storage container, according to some embodiments of the invention.

As shown for example in FIG. 16, thermal-storage container 1600 includes a plurality of capsules 1602 disposed within housing 1610 and a plurality of flow blockers 1604, disposed between capsules 1602. In operation, when flow 1606, flowing in a general flow direction of axis X, hits blocker 1604, the flow 1606 profile changes. In some embodiments, the direction of flow 1606 will change when hitting blocker 1604. In some embodiments, hitting blocker 1604 intensifies the turbulence of flow 1606.

According to some embodiments, the cross-section view of thermal-storage container 1600 is a top view, so that capsules are vertical. In some embodiments, the cross-section view of thermal-storage container 1600 is a side view, so that capsules are horizontal.

Figure 17:
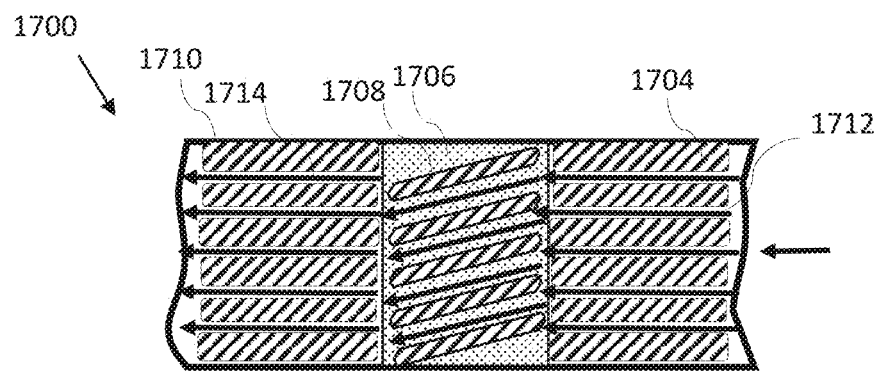
FIG. 17 is simplified schematic illustration of a cross-sectional view of a thermal-storage container, according to some embodiments of the invention.

Turning to FIG. 17, which is a cross sectional view of a thermal-storage container, according to some embodiments, of the invention.

As shown for example in FIG. 17, thermal-storage container 1700 can include a plurality of capsules 1704 and 1706 disposed within housing 1710 and which are oriented perpendicular to each other about longitudinal axis X.

According to some embodiments, changing the direction of the flow 1712 is by coupling one or more flow guider 1708 between the heat-exchanging surfaces of capsules 1706. In some embodiments, one or more flow guiders 1708 are coupled to capsules 1706. In some embodiments, guiders 1708 are ribs defined at heat-exchanging surfaces of capsules 1706. In some embodiments, guiders 1708 direct flow 1712 received from an upstream capsule 1704, to flow between guiders 1708 downstream the thermal-storage container. In some embodiments guiders 1708 direct flow 1712 received from an upstream capsule 1704 towards downstream 1714 capsule.

According to some embodiments guiding flow 1712 between upstream 1704 and downstream 1714 capsules mixes flow 1712.

The cross-section view in FIG. 17 can represent a top view of thermal-storage container 1700, and capsules 1704 are vertical. The cross-section view in FIG. 17 can also represent a side view of thermal-storage container 1700 is, and capsules 1704 are horizontal.

Bi-Directional Flow on Capsules

According to some embodiments, extending the flow length on heat-exchanging surfaces within the thermal-storage container is by guiding the flow to be a bi-directional flow on one or more capsules disposed within the thermal-storage container.

Figure 18A:
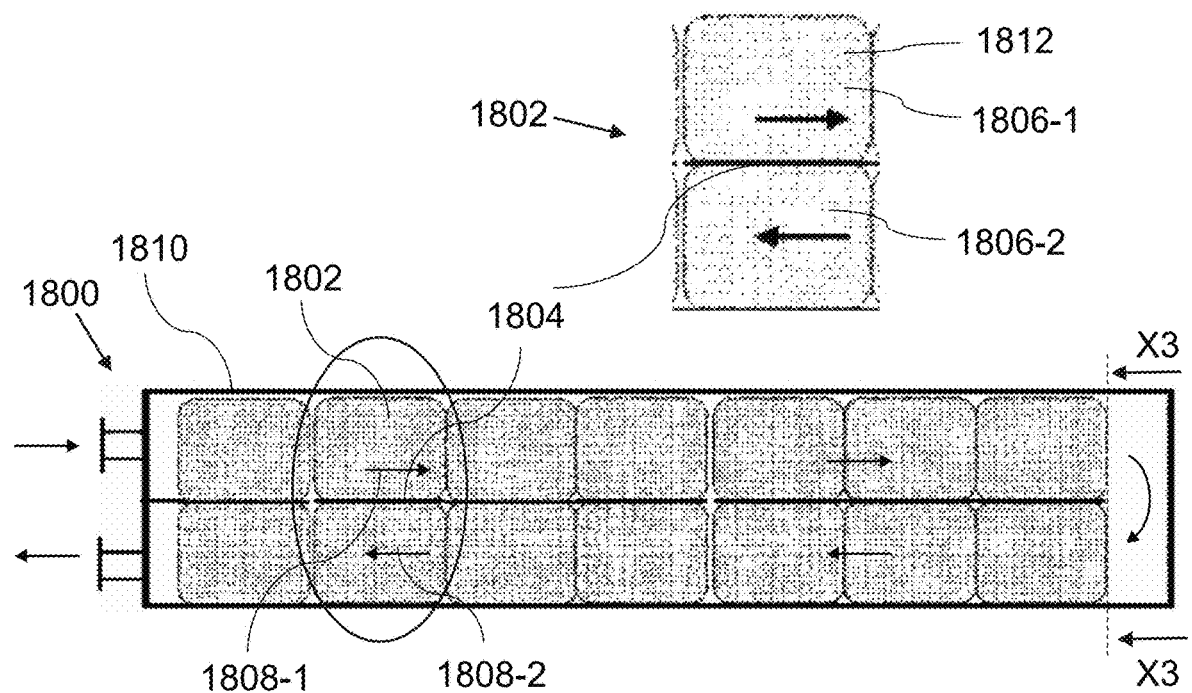
FIGS. 18A and 18B are simplified illustrations of cross-sectional views of thermal-storage containers, according to some embodiments of the invention.
Figure 18B:
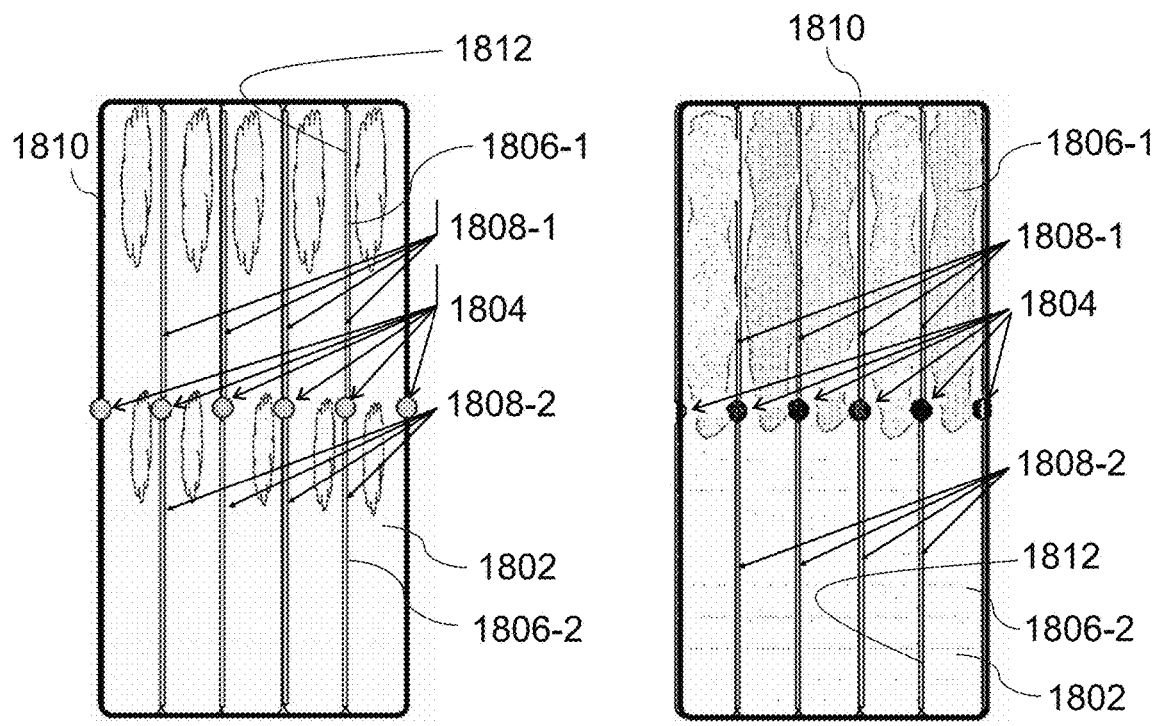

Turning to FIGS. 18A and 18B, which are simplified illustrations of cross-sectional views of thermal-storage containers, according to some embodiments of the invention.

As shown for example in FIGS. 18A and 18B, thermal-storage container 1800 has a plurality of capsules 1802, disposed within housing 1810. Capsules 1802 are box shaped and have two faces having an area larger than the other faces. The two larger faces act as heat-exchanging surfaces 1812, and extend in a direction perpendicular to flow 1808. One or more of heat-exchanging surface 1812 is divided by capsule divider 1804 into a first portion 1806-1 and a second portion 1806-2. According to some embodiments, divider 1804 is a rubber sealing ring coupled to one or more sides of capsule 1802. In some embodiments, divider 1804 is a protruding portion of heat-exchanging surface 1812. In some embodiment divider 1804 is a rib formed at heat-exchanging surface 1812. In some embodiments, all capsules 1802 include divider 1804. In some embodiments, part of capsules 1802 have divider 1804 and some of capsules 1802 are free of divider 1804. In some embodiments, having some capsules free of dividers generate a mixture of flows.

As shown in FIG. 18A, a fluid flow in thermal-storage container 1800 is bi-directional on heat-exchanging surface 1812, flowing in a first direction on one portion of surface 1812 and in a second direction on another portion of surface 1812 Flow 1808 starts in one direction 1808-1 from inlet, over first portion 1806-1 of capsules 1802, turns at an end wall of housing 1810, and reruns in direction 1808-2 towards outlet by flowing over second portion 1806-2 of capsules 1802.

In some embodiments, a bi-directional flow causes an internal circulation of the phase-changing fluid within capsule 1802. In some embodiments, the portion of the heat-exchanging surfaces at first portion 1806-1 has different temperature than a portion of the heat-exchanging surfaces at second portion 1806-2. According to some embodiments, the temperatures of first portion 1806-1 and second portion 1806-2 are affected by the fluid flow and create a temperature gradient inside capsule 1802. In some embodiments, first portion 1806-1 will melt faster than second portion 1806-2 due to heat-exchanging with a warmer fluid (upper stream fluid is warmer than fluid cooled downstream. In some embodiments, the location of the inlet and the outlet affect the rate of melting. A potential advantage in a temperature gradient is the generation of circulation of the phase-changing material inside capsules 1802, which provides a mixing effect in the interior of capsules 1802. The mixing can break potential buildup of isolative barriers of melted phase-changing material inside capsules 1802.

According to some embodiments, when first portion 1806-1 is an upper portion of capsule 1802, the phase-changing material in upper portion will be melting faster than in a lower portion. As shown in FIG. 18B, an internal circulation within capsule 1802 floats iced material upwards while the discharge cycle by fluid flow is melting the upper portion 1806-1 of capsule 1802 first. This way, the liquid/ice mix, and the discharge rate is potentially higher than when not mixing the phase-changing material since melted liquid water barriers between the ice and the capsule walls are reduced.

Another potential advantage of dividing the capsules is a faster charging of the capsules. Freezing the capsules is faster when mixing the phase-changing material during a flow of cold fluid during a charging cycle, in which a cold fluid is inserted into the thermal-storage container through a lower portion of the capsules.

Capsules Geometry

As discussed elsewhere herein, and shown in FIGS. 2R, 7A, and 12A-14, capsules according to some embodiments are box or plate shaped capsules, having two faces with a surface area larger than the other faces. According to some embodiments, the two larger faces act as heat-exchanging surfaces.

A larger area of heat-exchanging surface, potentially allows a larger volume of fluid to flow and exchange heat in one pass. In some embodiments, the width and height of the larger faces are in the range of 20 to 60 cm. In some embodiments, the width and height of the larger faces are in the range of 25 to 50 cm. In some embodiments, the width and height of the larger faces are in the range of 30 to 45 cm.

A narrow capsule, potentially reduces thermal barriers, produced by having melted phase-changing material surrounding un-melted material inside capsule and the heat-exchanging surfaces. In some embodiments, the minimal width of the capsules at an unfrozen state is in the range of 1 to 10 cm. In some embodiments, the width of the capsules at an unfrozen state is in the range of 2 to 8 cm. In some embodiments, the width of the capsules at an unfrozen state is in the range of 2.5 to 5 cm.

According to some embodiments, when preparing thermal-storage container 1200 for installation, includes the step of placing a group of capsules 1212 inside housing 1202. In some embodiments, placing is by sliding the group inside housing 1202. In some embodiments, the group of capsules 1212 is placed inside housing 1202 during manufacturing of thermal-storage container 1200.

According to some embodiments, a group of capsules has a rectangular cross-section. In some embodiments, the cross-section fits a cross-section of housing 1202. In some embodiments, the cross-section is square. A potential advantage of a square cross-section of a group of capsules and housing is that the group of capsules can fit inside the sections of the thermal-storage container in either a vertical or horizontal orientation, without defining different groups of capsules according to the orientation of placement.

According to some embodiments, one or more of the 4 faces of the box-shaped capsule, which have smaller area that the heat-exchanging surfaces, are side surfaces, configured to support the capsule when disposed within a thermal-storage container. In some embodiments, one or more of the side surfaces are shaped to engage a wall of the container. In some embodiments, engaging side surface with the wall of the container is to eliminate a gap between the outside facing surfaces of the capsule and the wall of the thermal-storage container. In some embodiments, the capsules are shaped to direct the fluid flow within the thermal-storage container via gaps between the capsules. In some embodiments, the capsules are positioned in the container with gaps between a side surface and a wall of the container, to direct fluid flow through the gaps.

Figure 19:
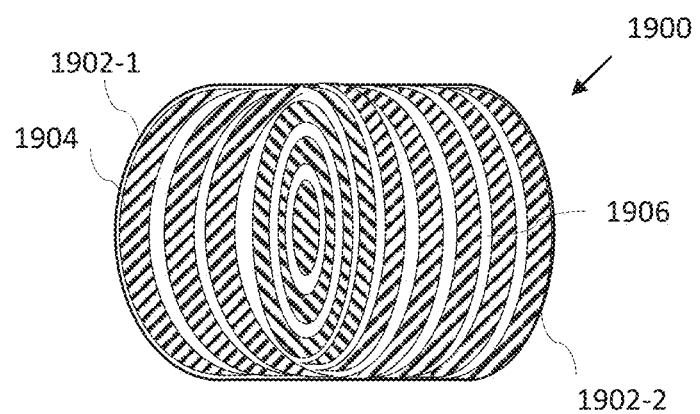
FIG. 19 is simplified schematic illustration of a cross-sectional view of a thermal-storage container, according to some embodiments of the invention.

Turning to FIG. 19, which is a cross sectional view of a thermal-storage container, according to some embodiments, of the invention.

According to some embodiments, one or more walls of thermal-storage container is curved. As shown in FIG. 19, the cross-section of thermal-storage container 1900 has two curved walls 1910-½. Thermal-storage container 1900 is filled with capsules 1904, shaped to lay inside thermal-storage container 1900 adjacent to curved walls 1902 and to neighboring capsules. Gaps 1906 between capsules 1904 define fluid path on the heat-exchanging surfaces of capsules 1904.

According to some embodiments, capsules are cylindrical. In some embodiments, capsules are cylindrical when thermal-storage container does not have curved walls.

According to some embodiments, capsules arranged within a thermal-storage container have a combination of concave and convex outlines, defining gaps between the contours of the capsules.

According to some embodiments, capsules are long and twisted along their length. In some embodiments, capsules are long and cylindrical. In some embodiments, capsules are long and having one or more long flat surfaces. In some embodiments, capsules and long and have a cross section which is shaped as a cross.

According to some embodiments, for example as shown in FIG. 12F, capsules 1210 include one or more protruding surfaces 1216, configured to guide a fluid flow in a meandering pattern.

Capsules can fit curved or other shaped containers as well. Capsules can be custom made. Capsules can have a bent shape.

Thermal Storage Containers in System

According to some embodiments, a thermal system includes a plurality of thermal-storage containers as defined above. In some embodiments, the thermal system includes a plurality of thermal-storage containers having the same internal orientation and structure. In some embodiments, the thermal-storage containers in the thermal system have uniform external dimensions. In some embodiments, the thermal-storage containers in the thermal system have uniform charging profile (e.g. charging speed, charging capacity). In some embodiments, the thermal-storage containers in the thermal system have uniform discharging profile (e.g. discharging rate, discharging temperatures).

In some embodiments, the thermal system includes a plurality of thermal-storage containers having different internal layouts. In some embodiments, differences are in the orientation of capsules. In some embodiments, the thermal-storage containers connected in the thermal system have different external dimensions. In some embodiments, the thermal-storage containers in the thermal system have different charging profile (e.g. charging speed, charging capacity). In some embodiments, the thermal-storage containers in the thermal system have different discharging profile (e.g. discharging rate, discharging temperatures).

According to some embodiments, the thermal system includes thermal storage containers of different technology types. In some embodiments, the thermal system includes one or more ice-on-coil containers together with one or more thermal-storage containers as disclosed elsewhere herein.

According to some embodiments, containers of different technology types are connected serially. According to some embodiments, containers of different technology types are connected in parallel. In some embodiments, one or more controllers are used to coordinate the operation of the containers.

Figure 20:
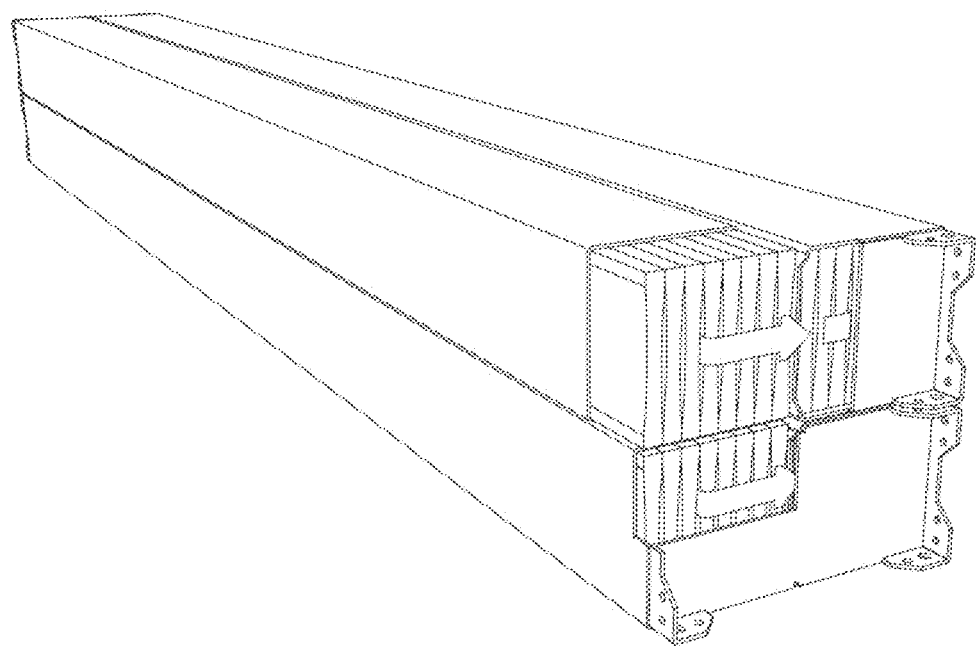
FIG. 20 is a simplified schematic illustration of a perspective view of a thermal-storage containers arrangement, according to some embodiments of the invention.
Figure 21:
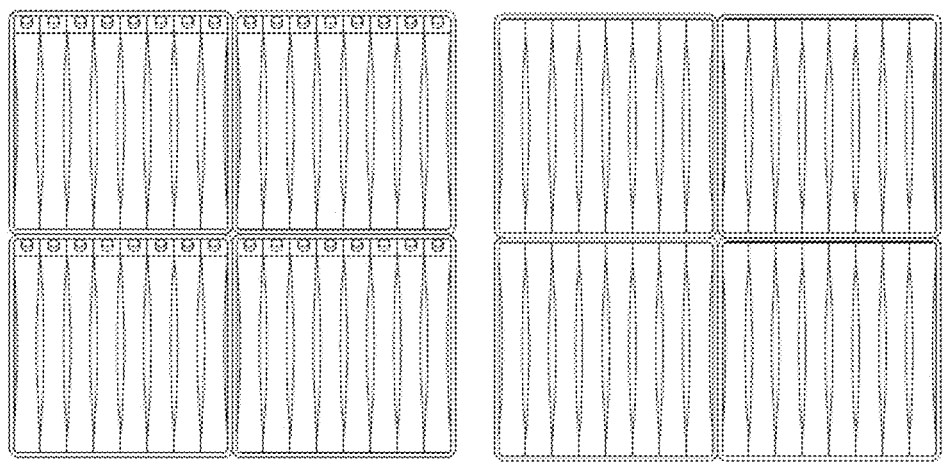
FIG. 21 is a simplified schematic illustration of a cross-sectional view of a thermal-storage container, according to some embodiments of the invention.

FIG. 20 is a simplified schematic illustration of a perspective view of a thermal-storage containers arrangement, according to some embodiments of the invention; and FIG. 21 is a simplified schematic illustration of a cross-sectional view of a thermal-storage container, according to some embodiments of the invention.

Exemplary Parameters of the System

In some embodiments of the invention, the length of the flow path (e.g., a median path length for 80% of the flow) in a container is, for example, between 1 and 100 meters, for example, between 1 and 20 meters, between 20 and 50 meters, between 50 and 100 meters and/or intermediate or longer paths, such as between 100 and 200 meters or higher. In some embodiments of the invention, the length is between 15 and 20 meters, for example, about 16 meters.

In some embodiments of the invention, the surface area of the heat exchange surfaces in a container is between 1 and 200 square meters, for example, between 1 and 30 square meters, between 30 and 80 square meters, between 80 and 200 square meters and/or intermediate or larger areas. In some embodiments of the invention, the area is between 30 and 45 square meters, for example, about 37 square meters.

According to some embodiments, the capsules are filled with phase-changing material which freezes at a temperature as high as $-8.0°$ C. to $-2.0°$ C.

The phase-changing material freezes at lower temps because of super (deep freezing) cooling requirements. This can be done by adding nucleation agents, and optionally by no agitation means (like vibration, ultrasound, etc. In some embodiments, the phase-changing material freezes in a temperature of $-7°$ C. to $-2.5°$ C. In some embodiments, the phase-changing material freezes in a temperature of $-5°$ C. to $-4°$ C.

According to some embodiments, in operation, the volume of fluid that flows within the container, which is in contact with heat-exchanging surfaces is at least 70% of the fluid inserted into the container. In some embodiments, the volume of fluid that flows within the container that is in contact with heat-exchanging surfaces is at least 90% of the fluid inserted into the container.

According to some embodiments, the ratio between the flow-cut area and an area of the heat-exchanging surfaces is in the range of 0.008 to 0.05. In some embodiments, the ratio between the flow-cut area and the area of the heat-exchanging surfaces per-brick is about $1:35,600=0.000029$ cm$^2$/cm$^2$, and/or a per-capsule ratio of about 0.000560 cm$^2$/cm$^2$.

An additional parameter describing flow in a thermal storage container is a ratio between a flow cross section area and a total heat exchange area of all the capsules in the thermal storage container. It is noted that in some of the embodiments described herein, the flow cross section area changes along the flow path. In such a case the ratio is optionally calculated as the ratio between an average flow cross section area along the flow path in the container and the total heat exchange area of all the capsules in the container. It is noted that this ratio is between areas, and thus a dimensionless number.

In some embodiments, the ratio between the flow cross section area and the total heat exchange area of all the capsules in the thermal storage container ranges between $4.5 \times 10^{-5}$-$45 \times 10^{-5}$, and a typical ratio may be $14 \times 10^{-5}$. In some embodiments the range may be between $1 \times 10^{-5}$-$100 \times 10^{-5}$. In some embodiments the range may be between $0.5 \times 10^{-5}$-$200 \times 10^{-5}$.

In some embodiments, flow cut area is between 5 to 20 (cm$^2$) in a container having a total fluid length of 16 m. In some embodiments, flow cut area is between 10 to 15 (cm$^2$). According to some embodiments, the flow is turbulent in at least 35% of the flow length.

A potential advantage of a thermal system having thermal-storage containers as disclosed elsewhere herein is a high thermal discharge rate during the discharging cycle. In some embodiments, the discharge rate is at least 70% of stored energy in 4 hours. In some embodiments, the discharge rate is at least 85% of stored energy in 4 hours. In some embodiments, the discharge rate is at least 90% of stored energy in 4 hours. In some embodiments, the discharge rate is at least 85% of stored energy in 4 hours. In some embodiments, the discharge rate is at least 85% of stored energy in 4 hours. In some embodiments, the discharge rate is at least 85% of stored energy in 2 hours. In some embodiments, the discharge rate is at least 75% of stored energy in 1 hour.

In some embodiments, the high discharge rate is maintained up until 70% of the thermal capacity stored in the thermal-storage container is used. In some embodiments, the high discharge rate is maintained up until 80% of the thermal capacity stored in the thermal-storage container is used. In some embodiments, the high discharge rate is maintained up until 90% of the thermal capacity stored in the thermal-storage container is used.

FIG. 22 is an example of a data-sheet of a thermal-storage container, according to some embodiments of the invention.

According to some embodiments, a container having a length of 4 m, and having flow guided in two internal passes (so that the total length of flow is 8 m), the flow spends 80 (sec) inside the container. The velocity of the fluid in this example will be ~0.1-0.09 (m/sec) while flowing in the spaces between the capsules on heat-exchanging surfaces.

Reference is now made to FIGS. 1A-1E which are schematic diagrams of a thermal energy storage system according to at least some embodiments of the present invention. As shown, thermal energy storage (TES) system 100 uses the HVAC chiller 102 of an air-conditioning (HVAC) system in an installation. Non-limiting examples of an installation include an office building, residential building, shopping mall, airport terminal, factory, server room or similar. When operating without the system 100 of the present invention, HVAC chiller 102 cools a third fluid 124 which is then circulated throughout the installation for cooling load 130. Third fluid 124 is optionally, water.

As described above the aim of the present invention is to "store cooling" using the TES 100. Alternatively the same system 100 may be used to store heat. The TES 100 comprises a fluid distribution system 104 which comprises those components necessary for distributing the first fluid 120, second fluid 122 and third fluid 124 throughout system 100. Therefore distribution system 104 comprises one or more pumps 106, piping 108, flow control mechanisms 107 such as valves, and monitoring components 109 for monitoring, for example, temperatures and flow rates inside system 100. Monitoring 109 optionally feeds data to a controller 105 for controlling the freezing and/or cooling process via control of chillers 102 and 150, HE 170, load 130, array 110, and the components of fluid distribution system 104 as described further below. In normal use HVAC chiller 102 cools third fluid 124 which is directed by fluid distribution system 104 from HVAC chiller 102 via pipes 108C to pipes 108L for flow through load 130.

TES 100 further comprises a thermal storage array 110. Array 110 comprises multiple ice bricks 112. Each ice brick 112 comprises multiple ice capsules 114 surrounded by first fluid 120. Embodiments of ice bricks 112 and ice capsules 114 are described further below with reference to FIGS. 2A-2U and 3. Ice capsules 114 are closed or sealed capsules containing second fluid 122. Second fluid 122 is optionally, water such that exposure of capsules 114 to a low temperature first fluid 120 surrounding capsules 114 results in capsules 114 cooling and in turn second fluid 122 cooling and changing phase into ice.

First fluid 120 optionally has a lower freezing point than second fluid 122. Non-limiting examples of a first fluid 120 include ethylene glycol, ethylene glycol mixed with water, salt water, or similar fluids. TES 100 further comprises a TES chiller 150 for cooling first fluid 120 to a temperature lower than the freezing point of second fluid 122. TES chiller 150 is one of air-cooled or water-cooled.

Second fluid 122 is optionally water mixed with an ice nucleation agent. The ice nucleation agent is optionally quartz. The type of quartz used may be any one of but is not limited to: Herkimer Diamond, Rock crystal, Amethyst, Ametrine, Rose quartz, Chalcedony, Cryptocrystalline quartz, Carnelian, chalcedony, Aventurine, Agate, Onyx, Jasper, Milky quartz, Smoky quartz, Tiger's eye, Citrine, prasiolite, Rutilated quartz, or Dumortierite quartz. Quartz is cheap and easily available and resistant to repeated freezing cycles of the second fluid. Furthermore it raises the required starting temperature of freezing the ice by several degrees. Hence, a nucleation agent improves the efficiency and responsiveness of the thermal energy storage system 100.

Optionally second fluid 122 comprises strips of a metal floating in second fluid 122 inside capsules 114 and causing even distribution of ice formation inside capsules 114. Optionally, the metal is aluminum. Optionally, the strips are up to 0.5 mm thick. Optionally, the strips are up to 30 cm long, optionally the strips are up to 1 cm wide. This optional aspect is explained in more detail with reference to FIGS. 8A-8B.

Each ice brick 112 optionally has a long and narrow form factor as shown in FIGS. 2E to 2H to enable efficient heat transfer between capsules 114 and first fluid 120. An ice brick 112 with a long form factor has optionally a length L that is at least three or four times greater than its maximum width W and/or height H. Bricks 112 can optionally be connected end to end creating long linear modules comprising multiple bricks 112. The modular structure and number of bricks 112 used enables control of the rate of energy being discharged to provide for the exact thermal energy storage needs per installation and also provides for flexible installation options as array 110 can be shaped as required. This optional aspect is explained in more detail with reference to FIGS. 8A and 8B.

Capsules 114 are optionally spaced slightly apart within bricks 112 to increase the overall ratio between surface area and volume of the second fluid 122 that is to be frozen. Optionally, brick 112 contains between 65% and 85% of second fluid 122. Optionally, brick 112 contains 75% of second fluid 122. Capsules 114 optionally comprise polymers such as polyvinyl chloride or other suitable durable and low cost materials. Capsules 114 optionally comprise protrusions or ridges on their outer surface to provide spacing between capsules 114 for flow of first fluid 120 and for increasing turbulence of first fluid 120.

In use of system 100 shown in FIG. 1A, TES chiller 150 cools first fluid 120, optionally to a temperature below the freezing point of second fluid 122. First fluid 120 is pumped from TES chiller 150 via pipes 108G and directed by fluid distribution system 104 via pipes 108T through array 110 to freeze second fluid 122 (also referred to herein as a "charging process"). First fluid 120, which has increased in temperature then exits array 110 via pipes 108T and is directed by fluid distribution system 104 back to the pipes 108G to chiller 150 to be cooled again. During the charging process the provision of first fluid 120 may be continuous or non-continuous. The charging process is optionally stopped when a desired temperature of first fluid 120 is reached within one or more bricks 112, or when a predefined time period has lapsed, or when a predefined amount of energy is stored in array 110. A (fully) charged array 110 usually comprises a plurality of capsules 114 with a second fluid 122 in a frozen state.

Once array 110 has been charged, a cooling process (also referred to herein as a discharge process), is used to cool load 130 using array 110. First fluid 120 inside array 110 is directed via piping 108T to distribution system 104 and through pipes 108S into heat exchanger 170 where first fluid 120 cools third fluid 124. Distribution system 104 then directs cooled third fluid 124 through pipes 108H into pipes 108C to flow through HVAC chiller 102 and then load 130 (via pipes 108L).

Alternatively third fluid 124 is directed through pipes 108H in parallel to HVAC chiller 102 directly to load 130 via fluid distribution system 104 to piping 108L. Since third fluid 124 has been cooled by first fluid 120 in HE 170, HVAC chiller 102 optionally does not need to be activated, thus producing energy savings. As first fluid 120 circulates between HE 170 and array 110, capsules 114 containing frozen second fluid 122 cool first fluid 120 which then directly or indirectly cools third fluid 124 and load 130. Optionally, the temperature of first fluid 120 entering heat exchanger 170 is between 5 degrees Celsius at the inlet and 10 degrees Celsius at the outlet. As capsules 114 cool first fluid 120, frozen second fluid 122 gradually undergoes a phase change and melts until a point where array 110 is no longer sufficiently cooling first fluid 120 and array 110 is said to be discharged. A (fully) discharged array 110 usually comprises capsules 114 with a second fluid 122 in a liquid state.

The charging process optionally takes place during off-peak hours (hours in which the load on the electrical grid is low) while the discharge process optionally occurs according to the demands of load 130—even during peak hours. The discharge process is optionally stopped when a cutoff temperature of first fluid 120 is reached, or when a predefined time period has elapsed, or when a predefined amount of energy is output from array 110, or under control of load 130 or when the demand for cooling at load 130 has lowered to a desired level. The direction of flow of first fluid 120 within array 110 during the charging process may be the same, or may differ from the direction of flow of first fluid 120 during the discharge process.

Alternatively, system 100 is used for heating. For heating TES chiller 150 optionally operates as a heat pump. TES Chiller 150 heats first fluid 120, optionally in off peak hours. First fluid 120 is pumped from TES chiller 150 via pipes 108G and directed by fluid distribution system 104 via piping 108T and through array 110 to warm second fluid 122 (also referred to herein as a charging process). First fluid 120, which has decreased in temperature then exits array 110 and is directed by fluid distribution system 104 through pipes 108T and piping 108G to TES chiller 150 to be warmed again. During the warming process the provision of first fluid 120 may be continuous or non-continuous. The warming process is optionally stopped when a desired temperature of first fluid 120 is reached within one or more of bricks 112, or when a predefined time period has lapsed, or when a predefined amount of energy is stored in array 110, and the like. No phase change takes place in the array.

Once array 110 has been charged, a warming process (also referred to herein as a discharge process), is used to warm load 130 using array 110. First fluid 120 inside array 110 is directed via distribution system 104 through pipes 108T and 108S into heat exchanger 170 where first fluid 120 warms third fluid 124. Distribution system 104 then directs warmed third fluid 124 from pipes 108H through pipes 108C to flow through HVAC chiller 102 and then load 130 (via pipes 108L). Alternatively third fluid 124 is directed through pipes 108H in parallel to HVAC chiller 102 directly to load 130 via fluid distribution system 104 to piping 108L. Since third fluid 124 has been warmed by first fluid 120 in HE 170, HVAC chiller 102 (functioning as a heat pump) optionally does not need to be activated as third fluid 124 has been warmed thus producing energy savings. As first fluid 120 circulates between heat exchanger 170 and array 110, capsules 114 containing warmed second fluid 122 warm first fluid 120 which then directly or indirectly warms third fluid 124 and load 130.

The charging process optionally takes place during off-peak hours (hours in which the load on the electrical grid is low) while the discharge process optionally occurs according to the demands of load 130—even during peak hours.

Monitoring 109 of fluid distribution system 104 optionally comprises one or more temperature monitors for monitoring at least one of: The temperature of first fluid 120 before entering array 110; The temperature of first fluid 120 in any location within array 110; The temperature of first fluid 120 after exiting array 110; The temperature of second fluid 122 within one or more capsules 114; The temperature of one or more ice bricks 112; The temperature of first fluid 120 before entering HE 170; and the temperature of first fluid 120 when leaving HE 170. Additionally or alternatively, monitoring 109 comprises one or more flow monitors (not shown) for monitoring at least one of: The flow of the first fluid 120 before, inside and after array 110; and the flow of first fluid 120 before, inside and after HE 170.

While FIGS. 1A-1E show single instances of chillers 102 and 150, HE 170, load 130, array 110, and the components of fluid distribution system 104 it should be understood that TES 100 may comprise any suitable number of these components.

Figure 1B:
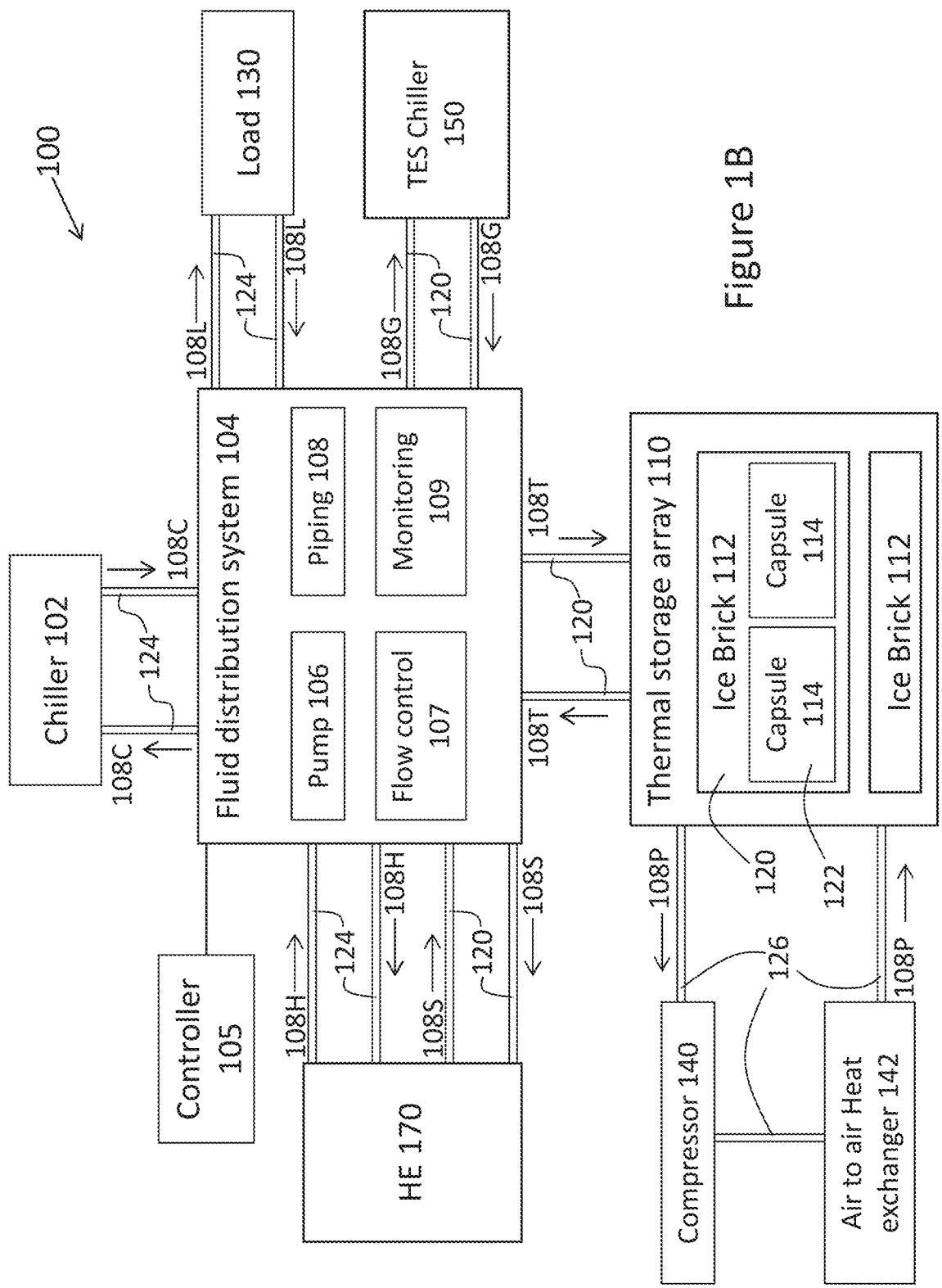

The system 100 of FIG. 1B functions in the same manner as that of FIG. 1A, but the illustrated embodiment comprises an air compressor 140. Compressor 140 draws air 126 from the top of the each of bricks 112. This air 126 is optionally compressed to between 10 and 20 bar resulting in the air 126 heating up as a result of compression. This compressed air 126 is then pumped into the bottom of each of bricks 112 through an air to air heat exchanger 142 and/or an expansion valve (not shown)—dropping to a temperature of between −20 to −30 degrees Celsius. This air 126 is bubbled through each of bricks 112 to further cool the contents before exiting through the top of the bricks 112 at between −5 to +5 degrees Celsius. This cold air 126 is then fed once again into the compressor 140 creating a cooling closed loop 108P. Cooling loop 108P is shown for simplicity as connected directly to thermal storage array 110 but cooling loop 108P is optionally part of fluid distribution system 104 and is controlled as are other piping systems as described herein. In this embodiment second fluid 122 is optionally combined with salt or other suitable material to lower the freezing point of second fluid 122.

Figure 1C:
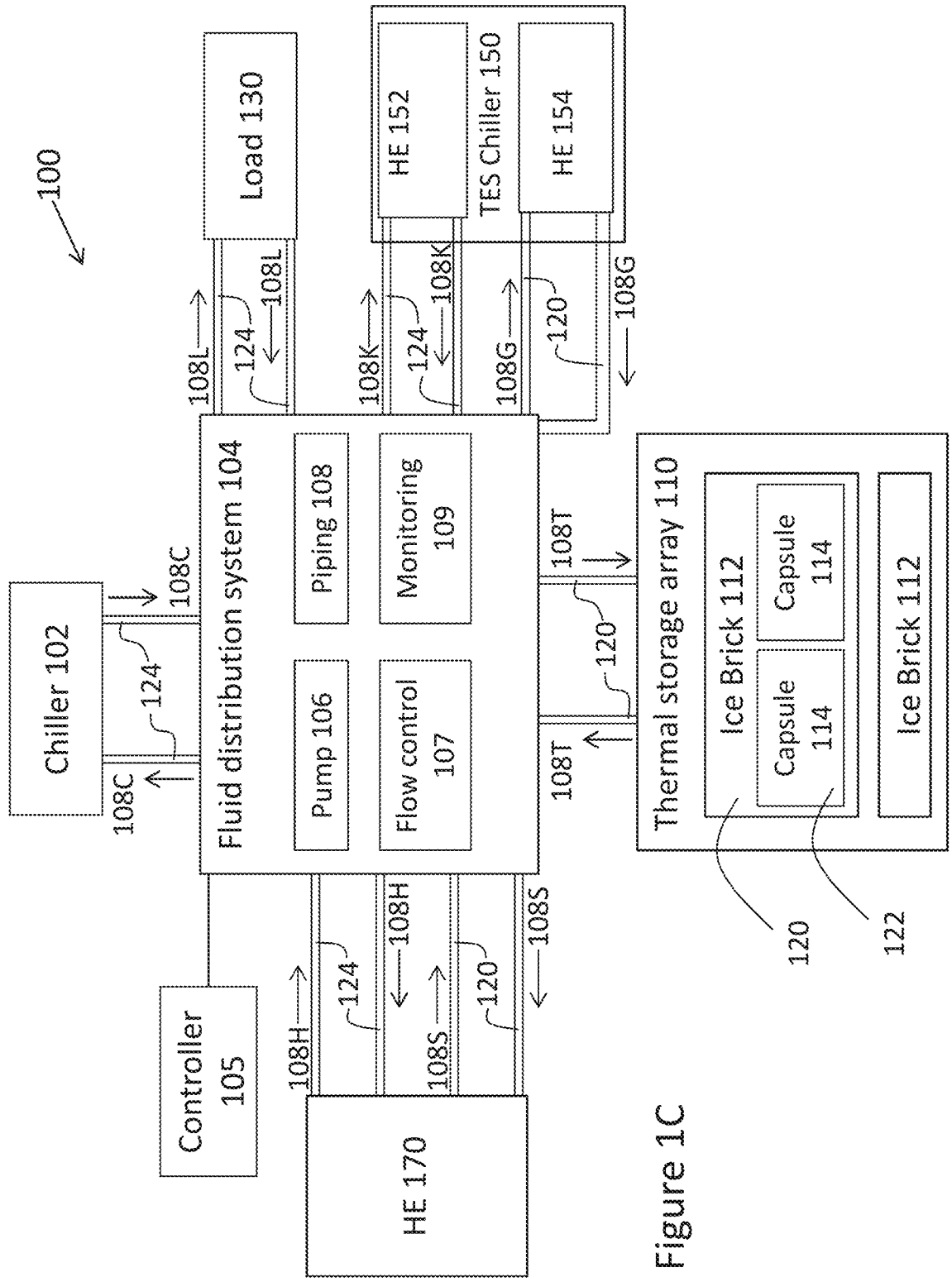

The system of FIG. 1C functions in the same manner as that of FIG. 1A, but where the condensation cycle of TES chiller 150 is water cooled comprises a heat exchanger 152 fed from third fluid 124. In this embodiment load piping 108K is adapted to connect to HE 152 in TES chiller 150. Load piping 108K carries third fluid 124 which has been chilled by HVAC chiller 102—typically to a temperature between but not limited to 7 to 12° C.

TES chiller 150 then cools first fluid 120 via HE 154 to a temperature below the freezing point of second fluid 122 such that first fluid 120 may be pumped through array 110 to freeze second fluid 122 inside capsules 114. The discharging process then takes place in HE 170 as for other embodiments. This arrangement increases the energy efficiency of TES chiller 150 which can utilize the abundant supply of cooled third fluid 124 available when load 130 is partially or entirely not being used for example but not limited to nighttime usage in an office complex. HVAC chiller 102 optionally, cools third fluid 124 at night when the outside temperature is lower and electricity costs are lower for more effective and cheaper energy usage. Since water cooled TES chiller 150 is more efficient it can also be smaller than in other embodiments where an air-cooled chiller is used.

Figure 1D:
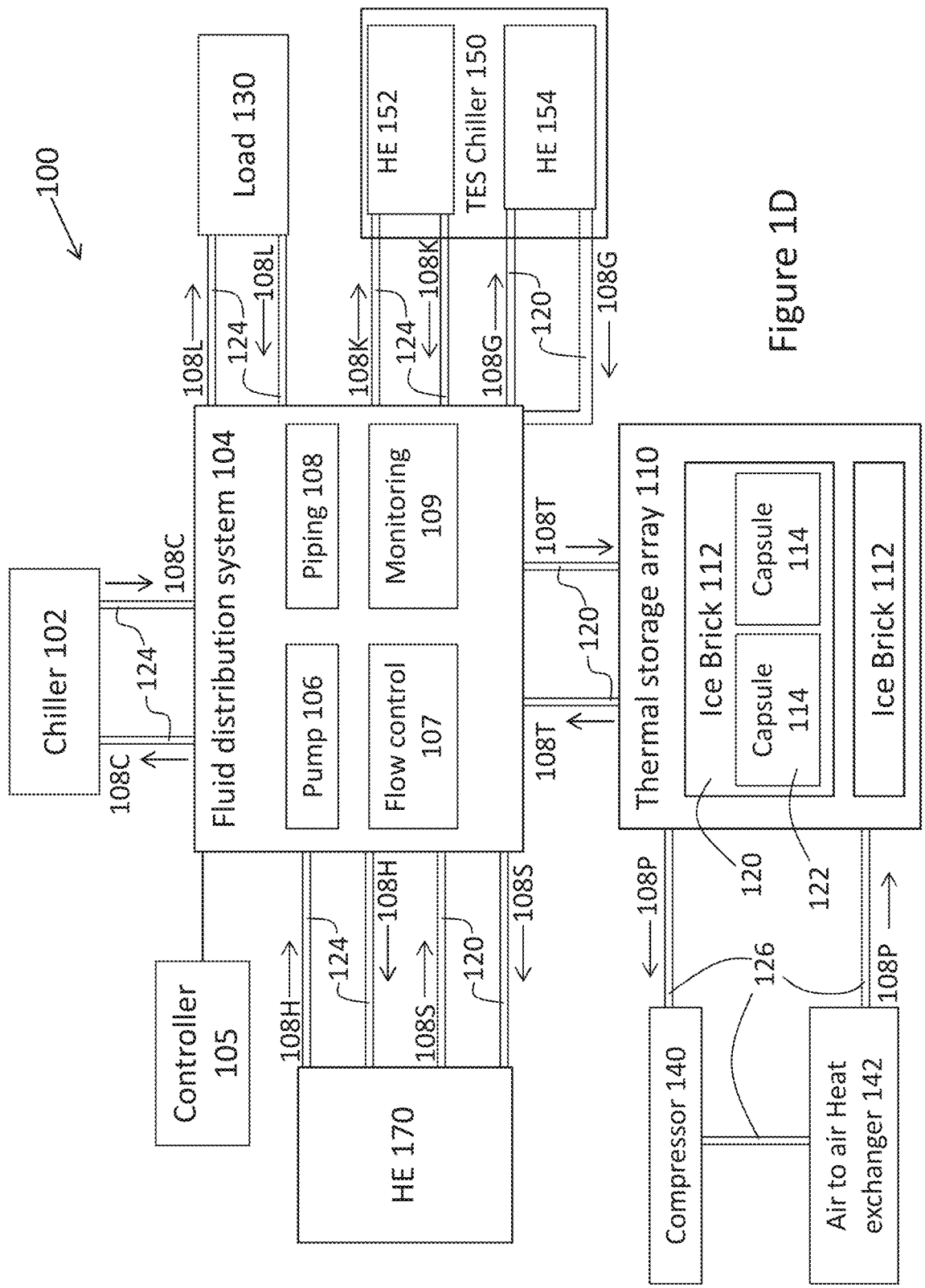

The system of FIG. 1D combines the functionality of FIGS. 1B and 1C to provide for a TES chiller 150 connected to third fluid via HE 152 that is supplemented by compressive cooling from air compressor 140.

Figure 1E:
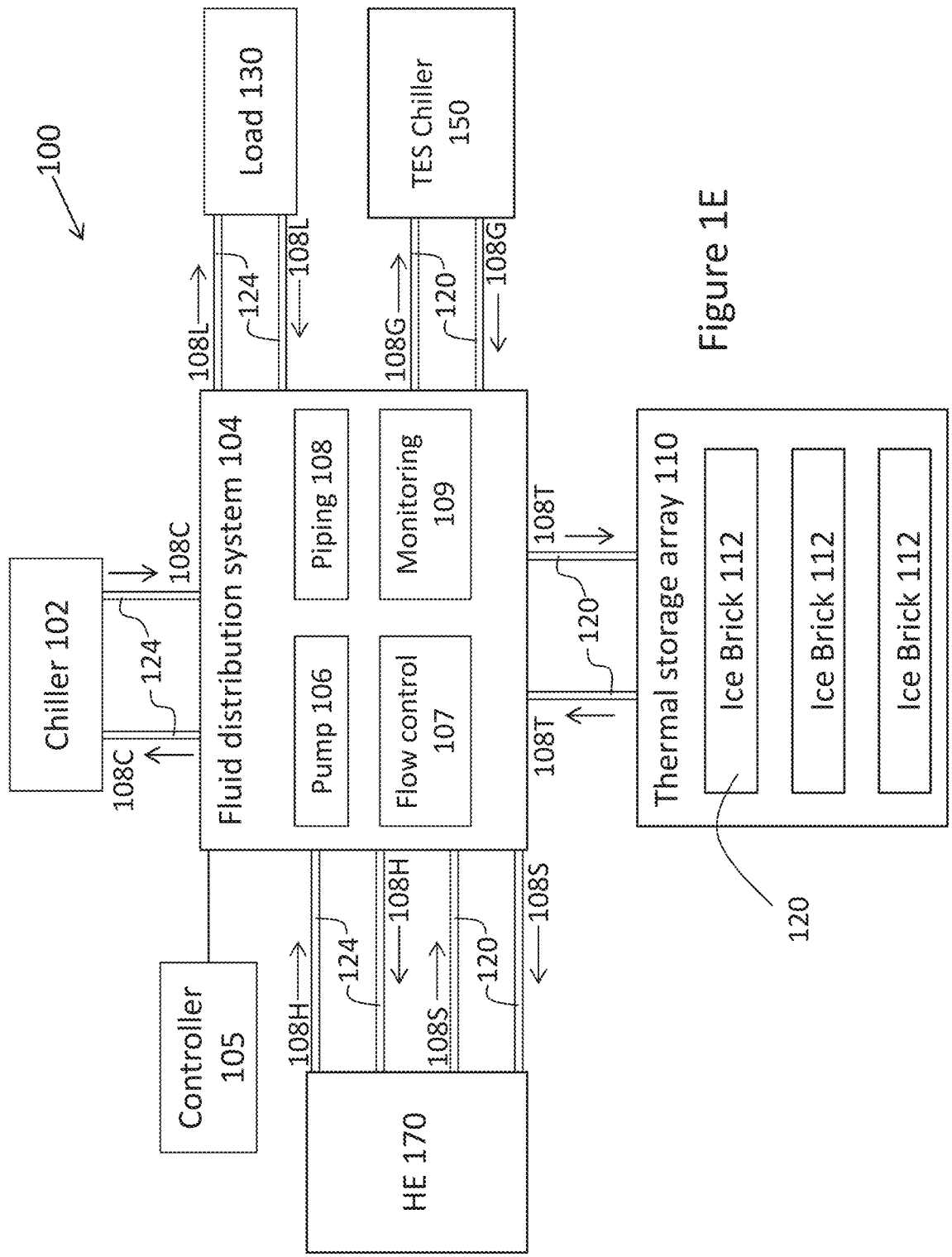

The system of FIG. 1E functions in the same manner as that of FIG. 1A, but in the illustrated embodiment some or all of ice bricks 112 do not comprise capsules 114. In the embodiment of FIG. 1E TES 100 is used to store first fluid 120 in ice bricks 112. Thus first fluid 120 is cooled by chiller 150 and this cooled first fluid 120 is then pumped into ice bricks 112 for storage and use for cooling third fluid (via HE 170) at other times. As above, non-limiting examples of a first fluid 120 include ethylene glycol, ethylene glycol mixed with water, salt mixed with water, or other combinations of these or other fluid to form "slushes" or similar fluids.

Reference is now made to FIGS. 2A-2U which are illustrations of ice bricks, ice capsules and thermal storage arrays according to at least some embodiments of the present invention. FIGS. 2A-2D show preferred embodiments of capsules 114. Capsule 114 comprises a filling nozzle 202 placed on an upper corner of capsule 114 to enable filling of capsule 114 to a maximum with second fluid 122 while still enabling efficient packing of capsules 114. Capsules 114 optionally comprise narrow-side spacers 204 and broad-side spacers 206. When provided, spacers 204 and 206 create a gap between capsules 114 when these are packed together inside brick 112. This gap is required to allow flow of first fluid 120 between capsules 114 for freezing of second fluid 122 inside capsules 114. Capsules 114 comprise a high ratio of depth D vs. length L and height H to create a greater surface area around a thinner piece of ice for a more efficient heat transfer of second fluid 122).

FIGS. 2E-2H show preferred embodiments of ice bricks 112 comprising capsule 114. Ice brick 112 comprises a rectangular enclosure 220 for enclosing multiple capsules 114. Capsules 114 are packed together to maximize the amount of second fluid 122 that is contained inside brick 112. Brick is equipped on each end with alignment or support panels 227 for aligning capsules 114 and sealing brick end panels 226 such that brick 112 is watertight when sealed. Brick 112 is connected to array 110 via inlet/outlet pipes 224. Mounting brackets 222 are provided for mounting brick 112 in a fixed position in the array 110 as further described below. Aside from inlet/outlet pipes 224 and interconnecting piping 228 used to connect bricks, brick 112 is completely sealed to fully contain first fluid 120 that flows through brick 112.

Optionally, brick 112 has a size of 50×50×400 cm. Optionally, brick 112 has a volume of 1000 L comprising 75% (750 L) of second fluid 122. Optionally, brick 112 has an energy storage capacity of 19.8 trhl69 kWh. Alternatively, brick 112 has a size of 25×25×400 cm. The size of brick 112 is selected to provide a balance between sufficient energy storage and construction modularity of the array.

FIGS. 2I-2N show preferred embodiments of bricks 112 in flexible configurations of thermal storage arrays 110. Brick 112 is used as a building block for configuration of an array 110 that is of any desired layout and also capacity. As shown in FIGS. 2I and 2J, bricks 112 are stacked on top of one another, laid end to end and also laid next to one another. Inlet/outlet pipes 224 and interconnecting piping 228 are then used to provide fluid connection between the bricks 112 in the array for first fluid 120. Bricks 112 are fluidly connected in parallel or alternatively in series or alternatively a combination of parallel and series connections.

As shown in FIGS. 2K-2N, once the array 110 has been built with a desired capacity (number of bricks 112), and form (arrangement of bricks 112), insulation panels 230 are attached to the outer surface of the array 110 to fully insulate the array and preserve the thermal storage within the bricks 112. This configuration saves on the total insulation needed as only the outer surface of the complete array 110 needs to be insulated, and not every surface of every brick 112. Array 110 is optionally assembled on top of base frame 232 which is optionally insulated on its underside.

Figure 2M:
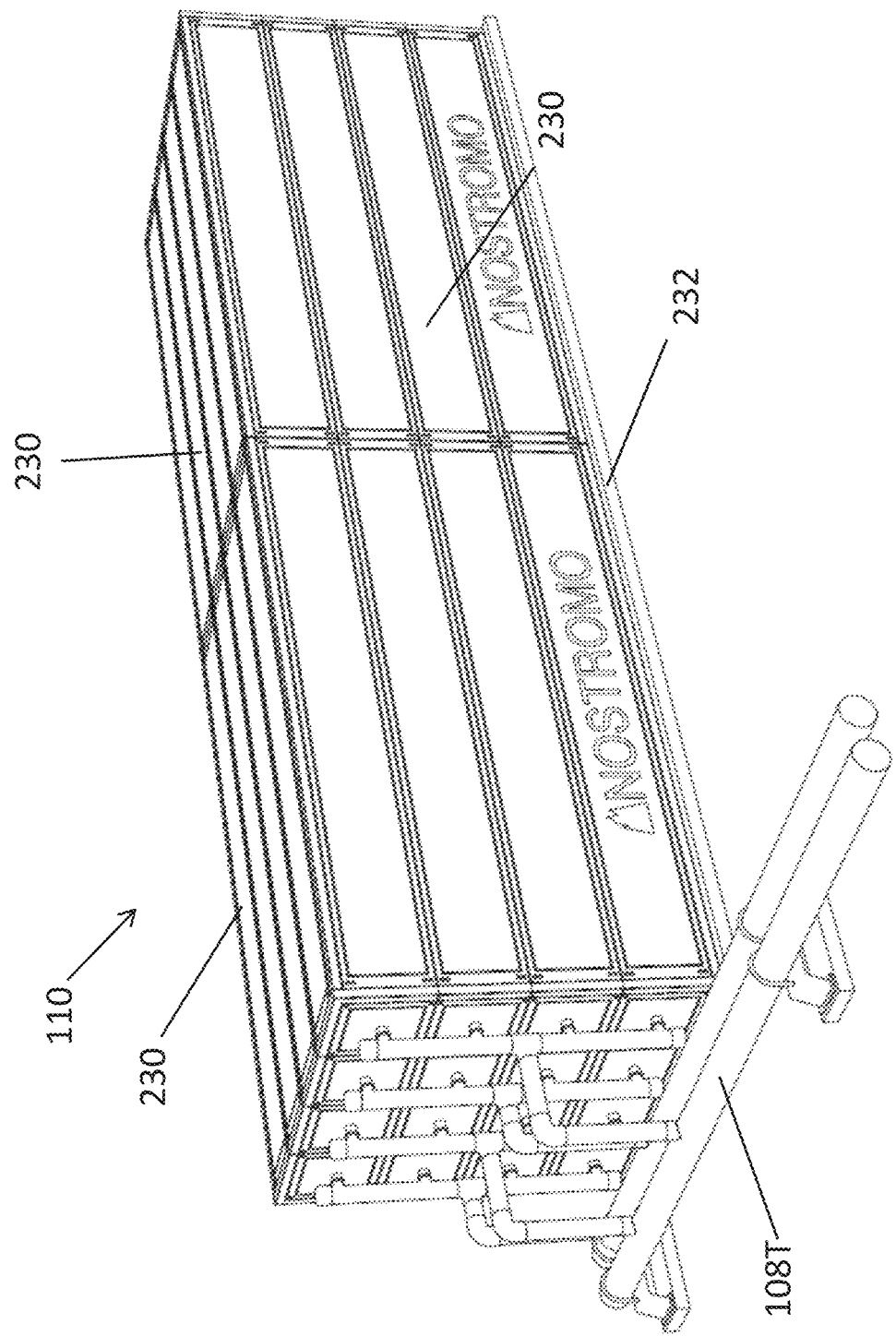
Figure 2N:
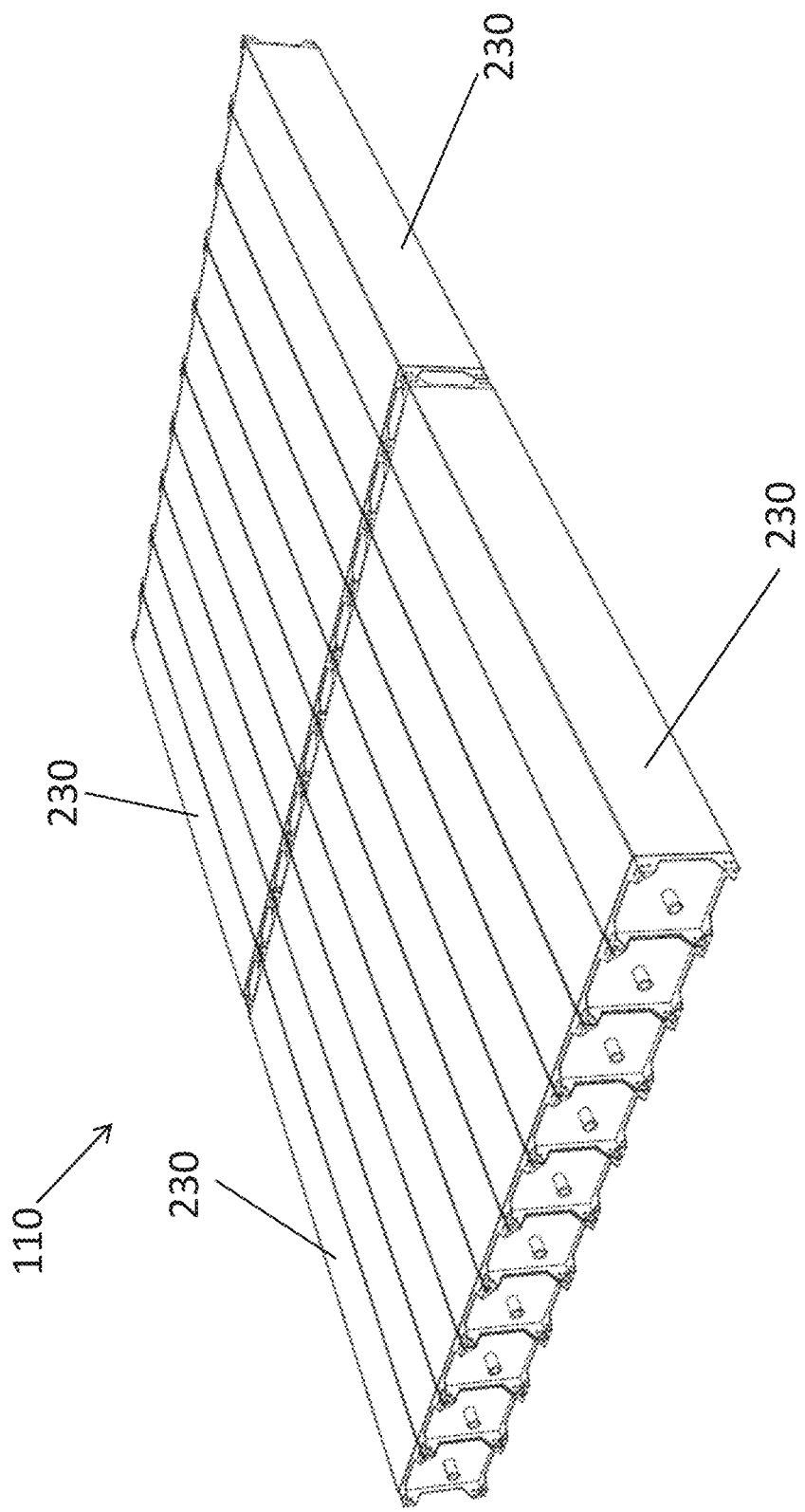
Figure 2P:
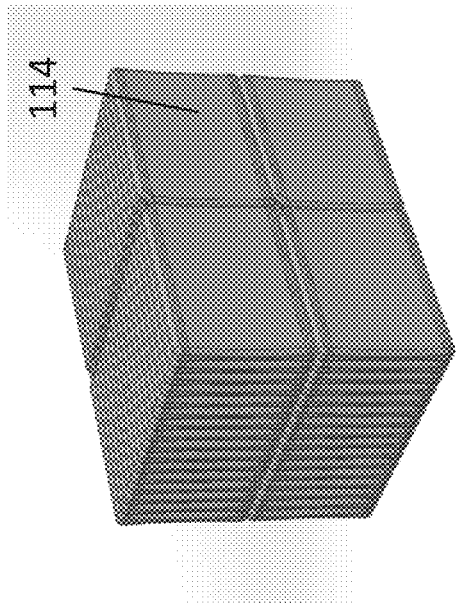
Figure 2R:
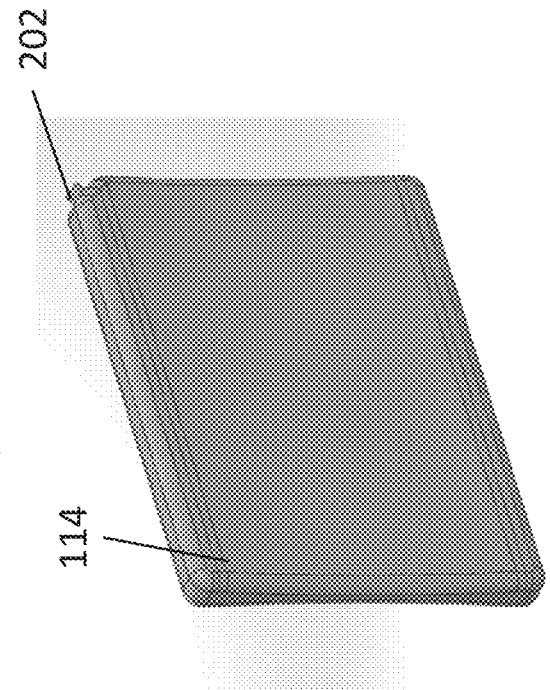
Figure 2O:
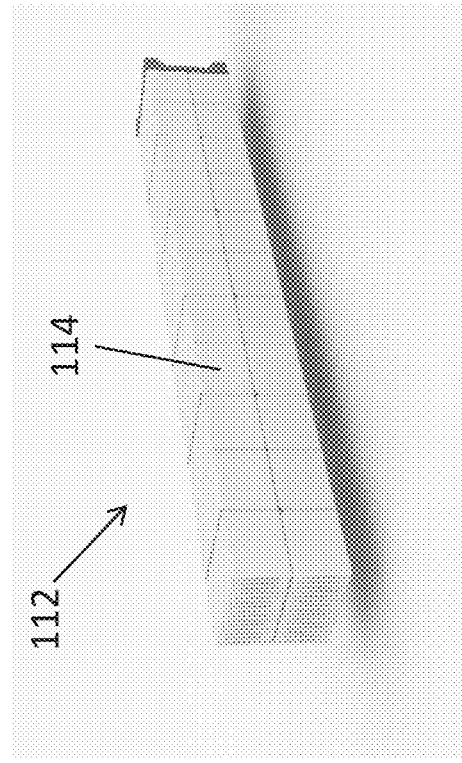
Figure 2Q:
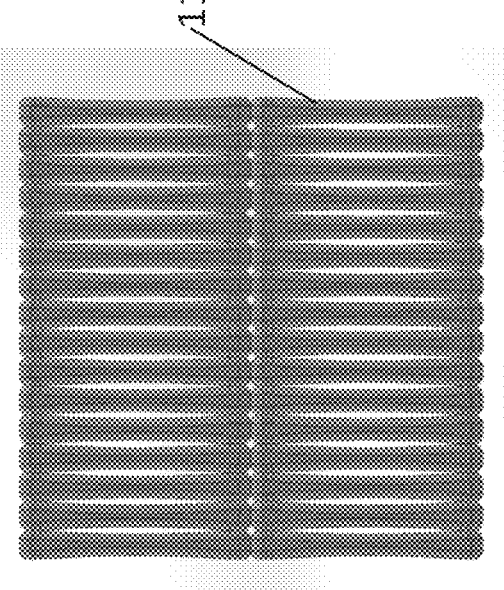

Once array 110 has been arranged into the desired form such as the rectangular box of FIG. 2M or the planar platform of FIG. 2N or any combination of these to create any structural arrangement required for the specific installation, this form can be integrated into the structure served by the thermal storage system 100. As a non-limiting example, the platform of FIG. 2N could function as a floor or could be erected vertically to function as a wall or could function as both floor and wall or could function as a raised platform inside, next to, or on the building/structure serviced by the TES system 100.

FIGS. 2O-2R show additional preferred embodiments of ice bricks 112 comprising capsules 114, wherein capsules 114 are narrower in a middle section thus creating gaps between capsules 114 for flow of first fluid 120.

FIGS. 2S-2U show additional preferred embodiments of capsules 114, wherein capsules 114 comprise a widened middle with a supporting ridge 250 so that upper part 256 and lower part 254 do not collapse when ice forms inside capsule 114. Ridge 250 and ridges 252 create a gap between capsules 114 when these are packed together inside brick 112. This gap is required to allow flow of first fluid 120 between capsules 114 for freezing of second fluid 122 inside capsules 114. Capsules 114 also comprise protrusions 260. Protrusions 260 increase the Reynolds number for first fluid 120 outside capsules 114 thus resulting in a more turbulent flow of first fluid 120 and therefore better distribution of ice formation inside capsule 114.

Figure 2Y:
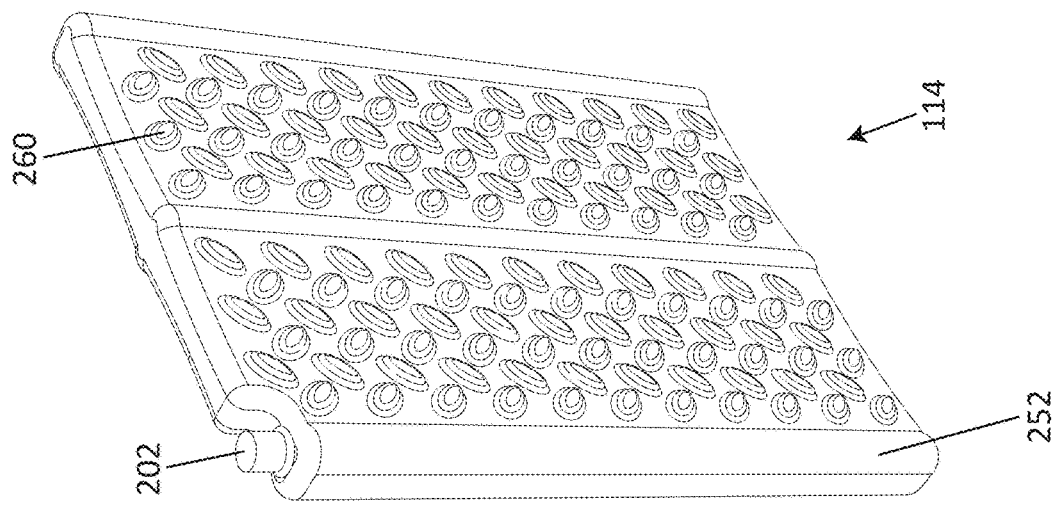
Figure 2X:
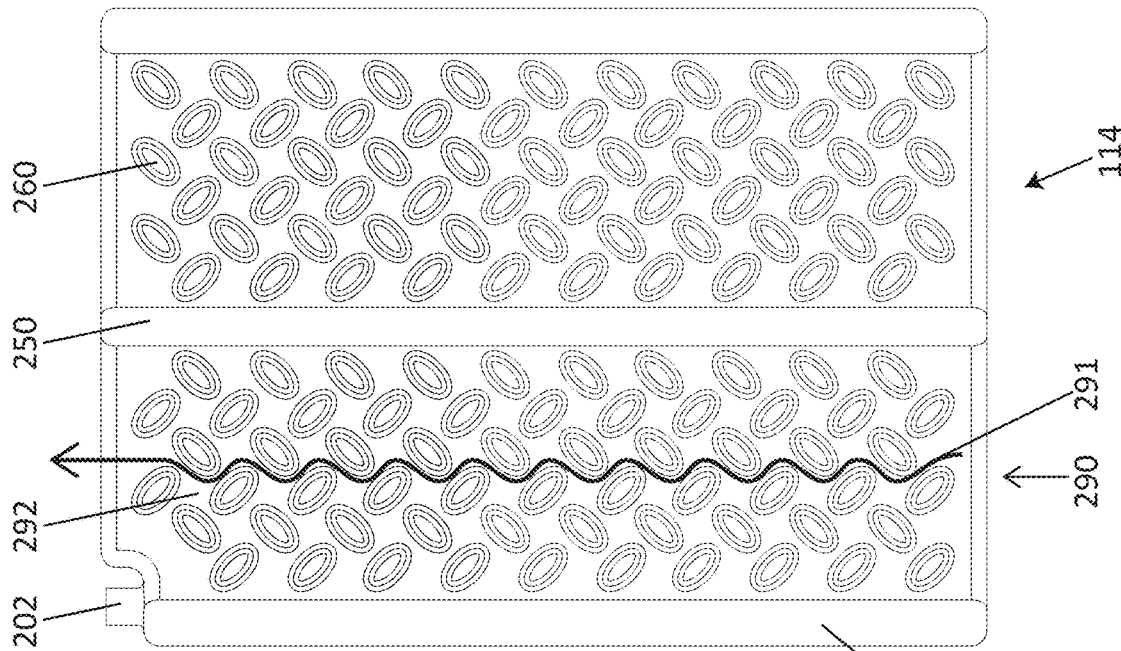
Figures 2V, 2W:
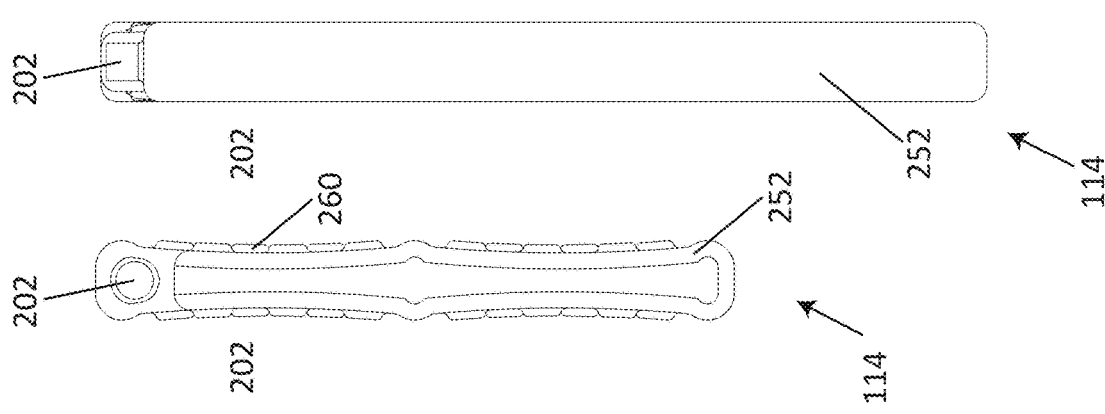

FIG. 2V shows a side view of a capsule 114 with protrusions 260, a ridge 252 and a filing nozzle 202. The filling nozzle is placed such that it does not increase beyond the general outer shape of the rectangular shaped capsule 114. FIG. 2W shows the capsule of FIG. 2V in another side view, perpendicular to the view of FIG. 2V. FIG. 2X shows the capsule of FIGS. 2V and 2W in a front view, wherein the broad-side of the capsule 114 and the general flow direction 290 of the first fluid 120 is shown. The capsule 114 has protrusions 260 that are arranged such that the flow path of the first fluid 260, which passes by the capsule 114, is provided in a meander pattern 291 (or a serpentine pattern). A meander pattern 291 in the sense of the invention is characterized in that the direction of the flow is repeatedly changed. Optionally, the meander pattern 291 is characterized in that the direction of the flow is regularly changed. Even more preferred is that the meander pattern is approximately symmetrical around a center line at least in a part of the meander pattern. The reference numeral 292 refer to flat areas of the capsules 114 between the protrusions 260. FIG. 2Y shows a perspective view of the capsule 114, which is shown in FIGS. 2v, 2W and 2X.

Figure 3:
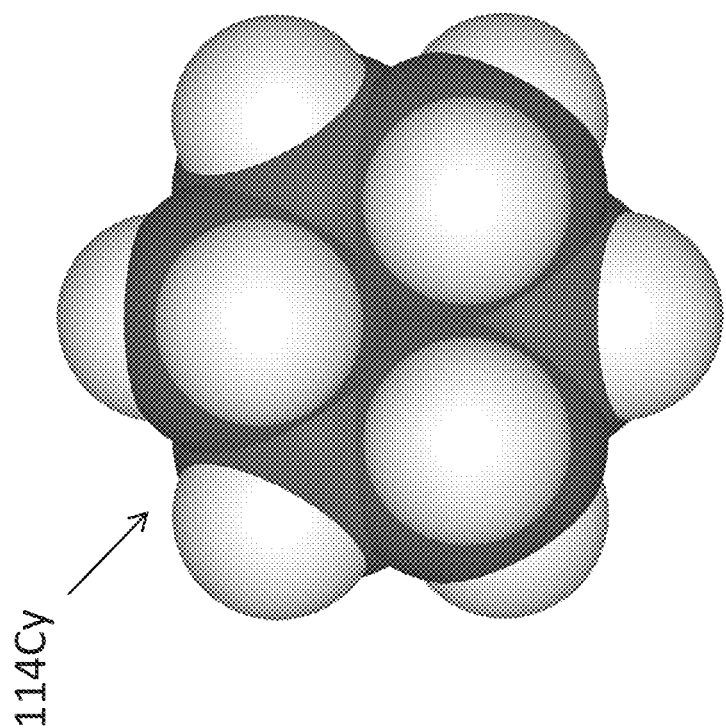
FIG. 3 shows an ice capsule according to at least some embodiments of the present invention.

Reference is now made to FIG. 3 which shows an ice capsule according to at least some embodiments of the present invention. As shown in FIG. 3, capsule 114Cy is optionally provided in a cyclohexane shape. In use, multiple cyclohexane shaped capsules 114Cy are placed inside brick 112 to freely settle inside brick 112. Thus capsules 114Cy are not fixed inside brick 112. The irregular shape of cyclohexane shaped capsules 114Cy enables a high packing factor within brick 112 while allowing gaps for flow of first fluid 120 around capsules 114Cy for freezing the second fluid 122 inside them. Moreover, also a plurality of cyclohexane-shaped capsules 114Cy provides defined flow paths inside the brick 112C, since such defined cyclohexane-shaped capsules 114C will create a defined geometric pattern of these capsules 114c when placing a plurality of them inside an enclosed volume.

Figure 4:
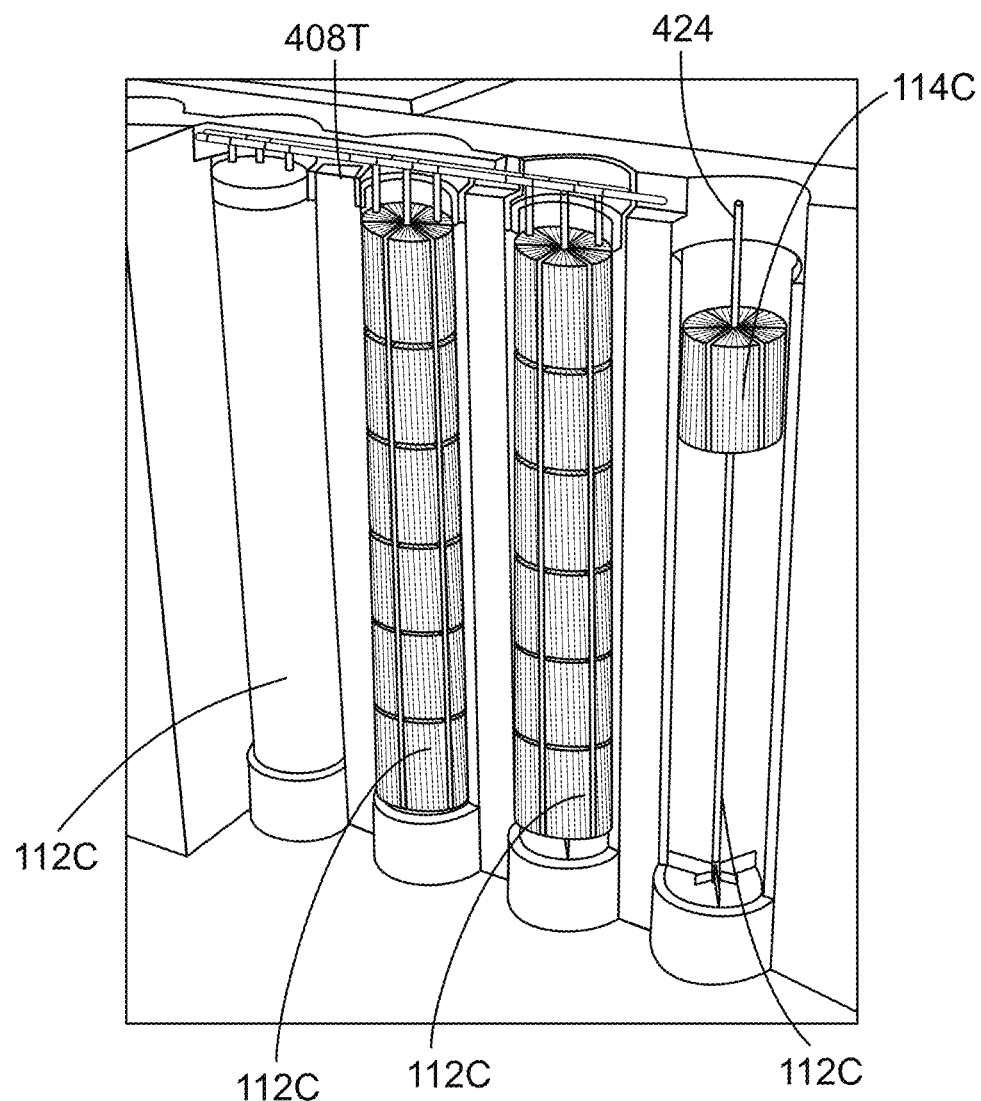
FIG. 4 shows a cylindrical ice brick according to at least some embodiments of the present invention.

Reference is now made to FIG. 4 which shows a cylindrical Ice brick according to at least some embodiments of the present invention. In the optional embodiment as shown in FIG. 4, ice brick 112C is cylindrical and comprises capsules 114C arranged in one or more arrays. Optionally there are multiple arrays placed at different heights within brick 112C. Optionally, the cylindrical brick 112C is adapted to be positioned underground. Brick 112C is manufactured from a pipe comprising a spiral metal reinforcement (not shown) than runs along the outside of brick 112C to enable placement of brick 112C underground. The volume of ice brick 112C is optionally between 100-10,000 cubic meters.

Figure 5A:
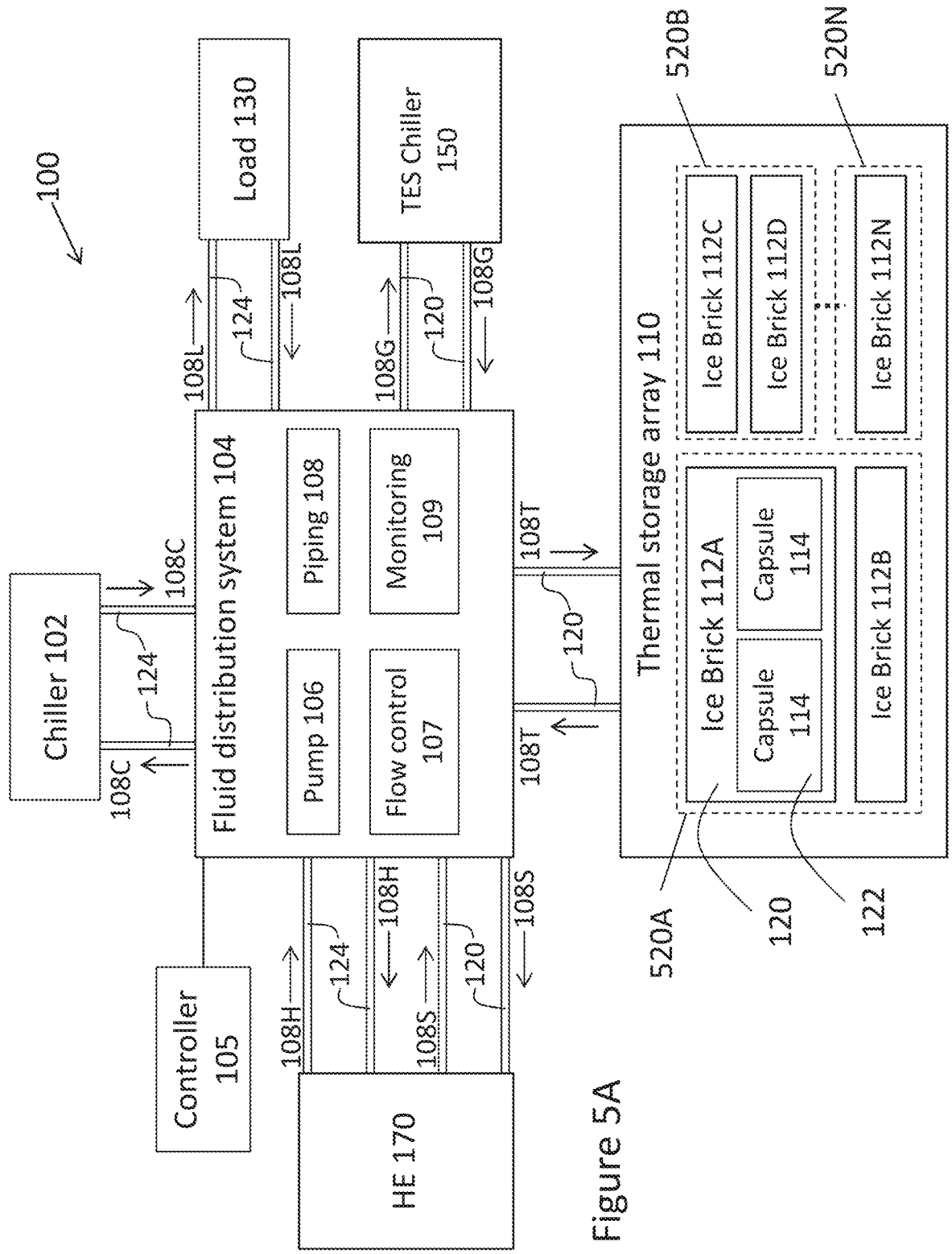
FIG. 5A shows a TES system capable of activating separate subsets of ice bricks by a controller.
Figure 5B:
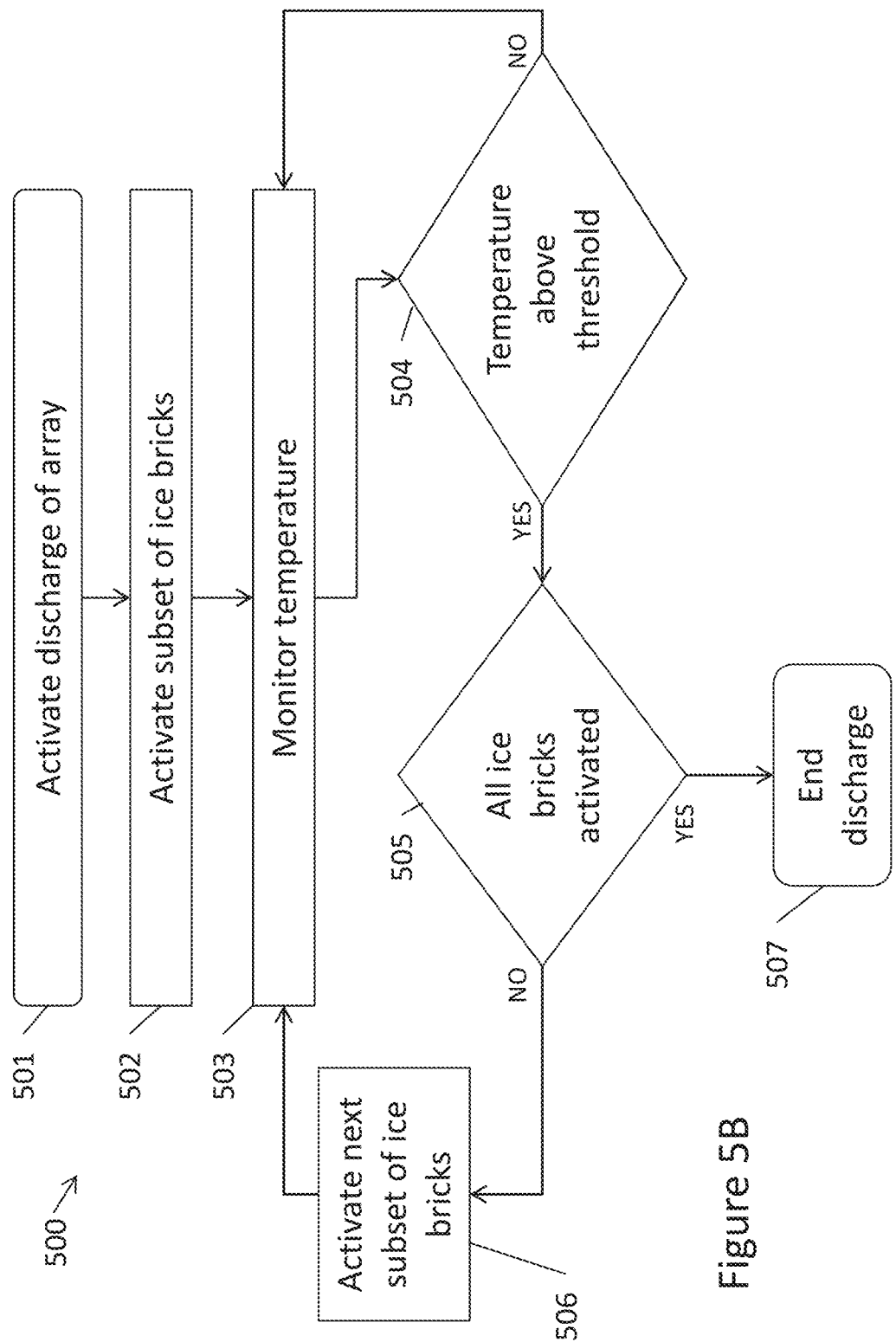
FIG. 5B shows a flow diagram for operation of a TES system.
Figure 5C:
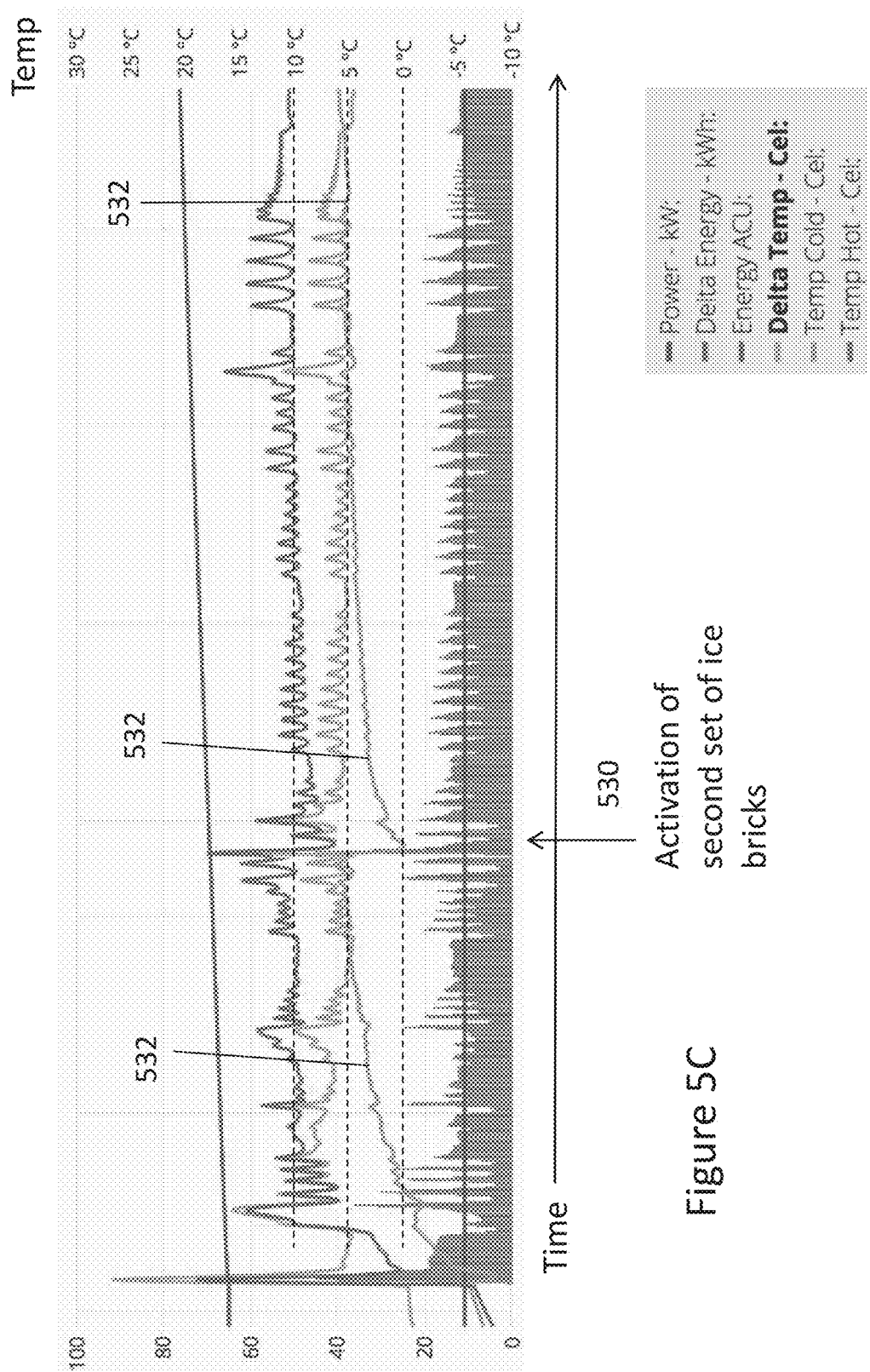
FIG. 5C shows experimental data from operation of a TES system according to at least some embodiments of the present invention.

Reference is now made to FIG. 5A which shows a TES system capable of activating separate subsets of ice bricks by a controller, FIG. 5B which shows a flow diagram for operation of a TES system, and FIG. 5C which shows experimental data from operation of a TES system according to at least some embodiments of the present invention. As shown in FIG. 5A, TES system 100 is structured and operates as per TES system 100 of FIG. 1A. Optionally any of the embodiments of FIGS. 1A-1E may be used as described with reference to FIG. 5B. In the embodiment of FIG. 5A, system 100 comprises N ice bricks 112 where N is an integer greater than 2. It should be appreciated that, as described above, array 110 optionally comprises as many ice bricks 112 as are needed to provide sufficient thermal energy storage. Ice bricks 112 are interconnected using inlet/outlet pipes 224 and interconnecting piping 228 and further are interconnected using components of fluid distribution system 104. Flow control 107 of fluid distribution system 104 enables segmentation of array 110 into subsets 520 of ice bricks 112 that can be activated individually as described below.

As above first fluid 120 flows through ice bricks 112 for charging and discharging. In the discharging process 500 of FIG. 5B, in step 501, the discharging process is initiated. The steps of process 500 are optionally controlled by controller 105 that controls the components of system 100 as described above. Activation of the discharging process may involve several steps such as but not limited to activating pumps 106, opening or closing valves in flow control 107, and monitoring temperatures and flow rates of fluids 120, 122, and 124 using monitoring 109.

In step 502 as part of the activation process, controller 105 activates a first subset 520A of ice bricks 112 and first fluid 120 is pumped only through this first subset 520A and not through any other ice bricks 112. As shown in FIG. 5A first subset 520A includes ice bricks 112A and 112B, however any number of ice bricks 112, and even a single ice brick 112, may be included in a subset and the example of two ice bricks 112 in a subset 520 should not be considered limiting. Optionally more than one subset 520 is activated in step 502. As first fluid 120 passes through first subset 520A, first fluid 120 is cooled while second fluid 122 is warmed. In step 503, the temperature of first fluid 120 is monitored such as by monitoring 109 as it exits array 110. Optionally temperatures of other fluids in system 100 are also measured in step 503.

In decision step 504, monitoring 109 indicates whether the monitored temperature has risen above a defined threshold. If the monitored temperature does not exceed the threshold then no action is taken by controller 105 and step 503 of monitoring is continued. When monitoring 109 indicates that the temperature has risen above the defined threshold (which is optionally defined in controller 105) the implication is that second fluid 122 passing through subset 520A is no longer being sufficiently cooled by subset 520A since second fluid 122 of subset 520A has risen in temperature. In a non-limiting example, where the temperature of first fluid 120 has risen above 5 degrees Celsius at the outlet of array 110, subset 520A is no longer sufficiently cooling first fluid 120.

In decision step 505 controller 105 checks whether all subsets of ice bricks 112 have been activated. When it is determined that not all subsets of ice bricks 112 have been activated, controller 105 activates a next subset 520B of ice bricks 112 in step 506. As above while FIG. 5A shows subset 520B including only ice bricks 112C and 112D, this should not be considered limiting and subset 520B could comprise any number of ice bricks 112. Subset 520B is optionally activated in addition to subset 520. Alternatively subset 520 is deactivated when subset 520B is activated. Optionally more than one subset is activated in step 506. The activation of subset 520B results in a decreased temperature as monitored by monitoring 109 in step 503.

Steps 503, 504 and 505 are repeated as shown in FIG. 5B until it is determined in step 505 that all available subsets, up to subset 520N, of ice bricks 112 have been utilized and in step 507 the discharge process 500 is stopped.

FIG. 5C shows experimental data from operation of a TES system. As shown in the graph of FIG. 5C, the temperature of first fluid 120 is monitored at the outlet of array 110 and plotted as line 532 as a function of time elapsed since activation of a discharging process. In the experimental system, three ice bricks 112 were activated at time=0 and as shown, the temperature increased from −5 degrees Celsius to around 5 degrees Celsius at the time indicated at point 530. At time 530, another ice brick was activated in addition to the initial three ice bricks and this immediately lowered the outlet temperature as in graph 532 to around 0 degrees Celsius. The temperature then gradually rose once more to around 5 degrees Celsius as the fourth ice brick also discharged. As can be seen from the experimental graph 532, the gradual activation of ice bricks 112 or subsets of ice bricks 520 results in more balanced discharging of TES system 100, longer discharging time resulting in longer periods of TES cooling of a load 130, and better utilization of each ice brick 112 which is more fully discharged.

Reference is now made to FIGS. 6A-6G which show spacers for use in an ice brick according to at least some embodiments of the present invention. Spacers 600 and 620 are inserted between capsules 114 inside ice bricks 112. An ice brick 112 optionally comprises multiple spacers 600 or alternatively spacers 620.

Alternatively an ice brick 112 comprise a combination of spacers 600 and 620.

Figure 6A:
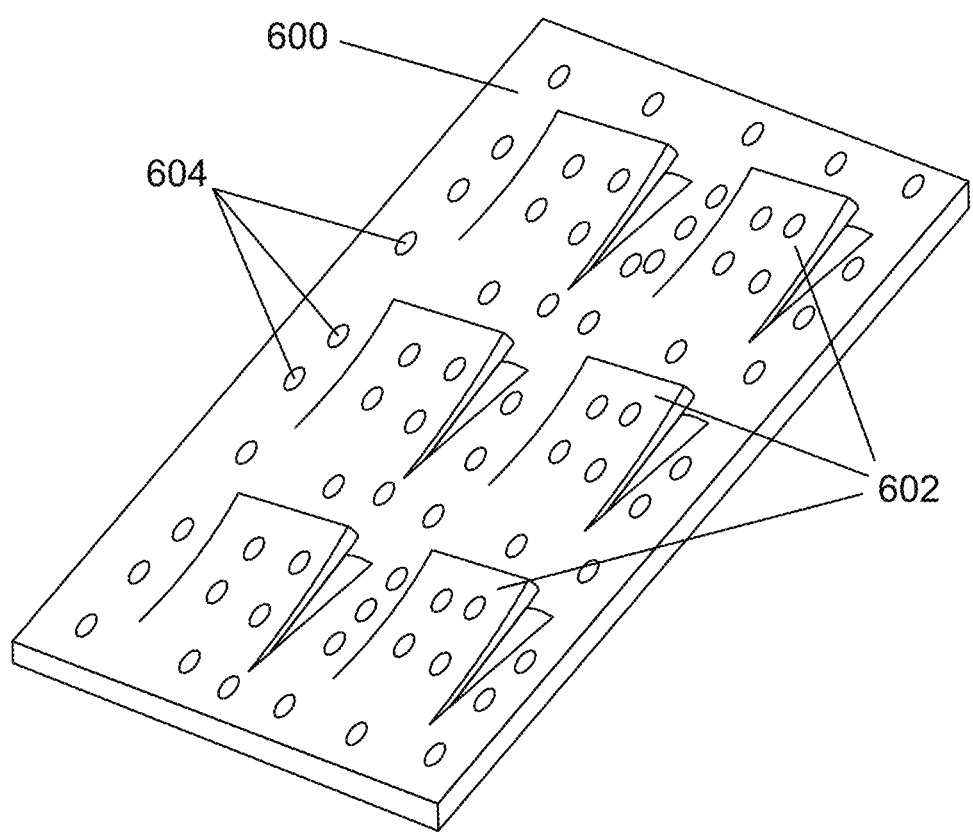
Figure 6E:
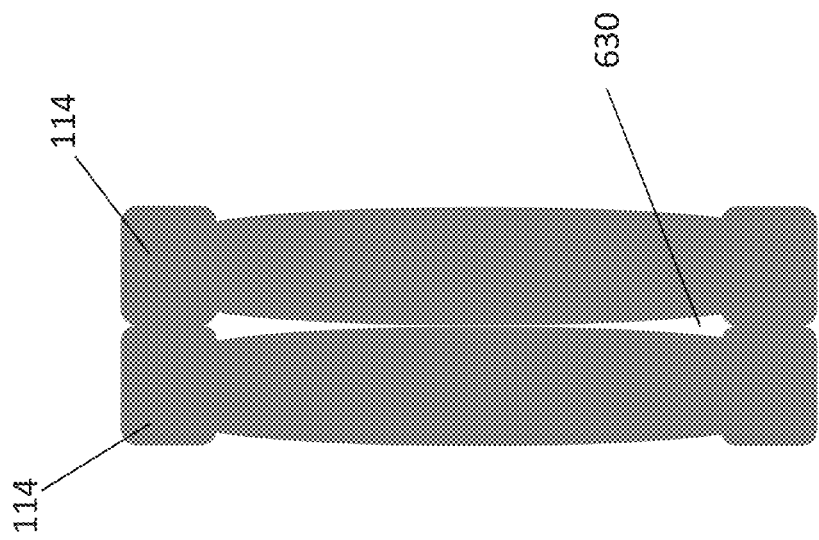
Figure 6D:
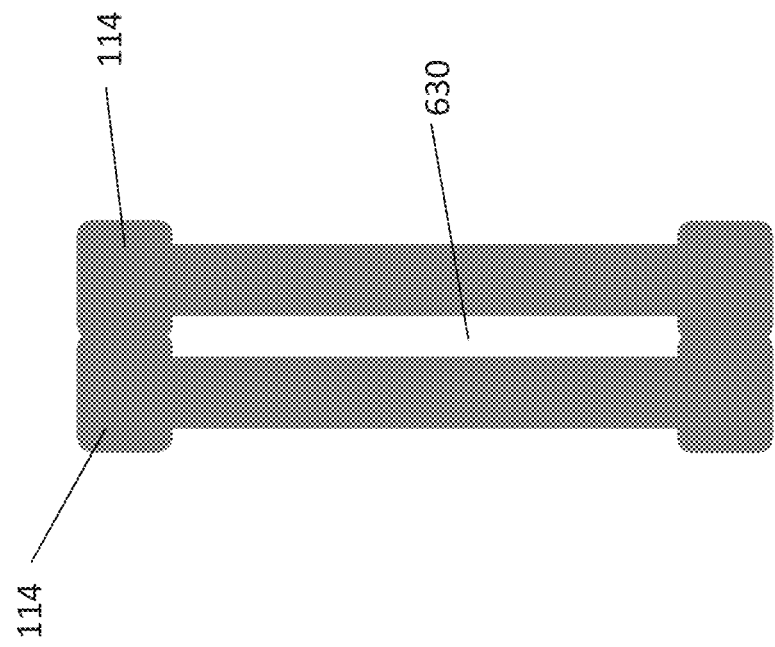

FIGS. 6D and 6E show two capsules 114 without any spacer 600 or 620 in a discharged (FIG. 6D) and charged (FIG. 6E) state. FIGS. 6F and 6G show two capsules 114 with spacer 620 in a discharged (FIG. 6F) and charged (FIG. 6G) state. Two capsules 114 are shown for purposes of simplicity and it should be apparent that any number of capsules and spacers may be provided as required inside brick 112. The purpose of spacers 600 and 620 is to maintain a minimum flow area 630 around capsules 114. Flow area 630 is required since capsules 114 expand (FIG. 6E) when capsules 114 are fully charged (second fluid 122 such as water has changed into ice). This expansion by capsules 114 can block the flow of first fluid 120 by constricting flow area 630 (FIG. 6E) preventing first fluid 120 from passing through ice brick and 112 and thereby preventing efficiently cooling of first fluid 120. Further, when second fluid 122 (such as water) is in a discharged state (FIG. 6D) capsules 114 shrink and the flow area 630 between capsules 114 grows causing a significant decrease in first fluid flow velocity which effects heat transfer for both charging and discharging.

In the embodiment of FIG. 6A spacer 600 ensures a sufficient flow area 630 by fitting between capsules 114 such that capsules 114 cannot expand to fill the flow area. Holes 604 in spacer 600 allow for flow of first fluid 120. When capsules 114 discharge, flexible flaps 602 open away from spacer 600 in order to occupy flow area 630 and thereby increase first fluid flow velocity.

In the embodiment of FIGS. 6B, 6C, 6F and 6G, spacer 620 ensures a sufficient flow area 630 by fitting between capsules 114 such that capsules 114 cannot expand while freezing to fill flow area 630. FIG. 6C shows cross section A'-A' of spacer 620. Gaps 624 between the vertical bars 621 and horizontal bars 622 in spacer 620 allow for flow of first fluid 120. As shown in FIG. 6F spacer 620 fits between capsules 114 and vertical bars 621 and horizontal bars 622 increase the flow velocity of first fluid through flow area 630. As shown in FIG. 6G, when capsules 114 are charged and expand, spacer 620 prevent capsule 114 from blocking flow area 630 thus ensuring continued flow of first fluid 120 around capsules 114.

Reference is now made to FIGS. 7A to 7D, which show an ice brick 112, i.e., a thermal energy storage unit 711.

The thermal energy storage unit 711 of FIG. 7A comprises a tube 712, which has the shape of an elongated, hollow body. The tube 712 is optionally made of metal, e.g., carbon steel or stainless steel. A front end element 713A and a back end element 713B are arranged to close the tube at both ends such that a rectangular-shaped enclosure is provided. Both elements 713A and 713B are also optionally made of metal, e.g., stainless steel or carbon steel and provide means for mounting the thermal energy storage unit 711 e.g. to supporting means (not shown). The front end element 713A and the back end element 713B have an inlet 714A and an outlet 714B, respectively. The inlet 714A and the outlet 714B can be connected to further thermal energy storage units 112, the piping 10 and/or to the fluid distribution system 104. Inside the tube 712, a plurality of capsules 715 is arranged. The capsules 715 have the shape of plates or bricks. Furthermore, the capsules 715 have a concave or recessed shape of their main surfaces (i.e. of their broad-sides). The arrangement of the capsules 715 inside the tube is optionally configured by a plurality of horizontally arranged stacks 717 of capsules 715 (i.e., the stacks are stacked in a width direction of the tube 712). For example, 16 or 8 capsules 715 can form one stack 717 of capsules 715. A plurality of stacks 717 is arranged one after another along the length of the tube 712. The capsules contain a phase-change material as second fluid 122 such as water, and preferable a nucleation agent, such as quartz. Between the capsules 715, as well as between the capsules and the tube 712, a space 716 is provided, in which the first fluid 120, e.g., a water/glycol mixture, can flow inside the tube 712 from inlet 714A to outlet 714B.

This arrangement allows an efficient exchange of heat between the first fluid 120 and the second fluid 122 via the wall of the capsule 715. The actual heat exchange rate between the capsule 715 and the first fluid 120 is dependent on several factors including the speed of the flow, the effective area of the contact surface between the flow of the first fluid 120 and the capsule 715, and the type of the flow (e.g., turbulent or laminar). The embodiment of FIG. 7A improves all of these factors. This is explained in more detail below:

The elongated shape of the tube in combination with the stacked arrangement of the capsules 715 defines residual free spaces inside the space 716, which result in a plurality of predefined flow paths 718 of the first fluid next to the capsules. The overall flow of the first fluid 120 at the inlet 714A is divided into the plurality of predefined flow paths 718, wherein each of the flow paths 718 passes by a plurality of capsules along the length of the tube 712. Moreover, the capsules 715 are configured such that the flow paths 718 are defined in a frozen (expanded) state of the capsules 715 as well as in a non-frozen (non-expanded) state of the capsules 715. In other words, a plurality of predefined or fixed flow channels for the first fluid 120 is provided between the capsules 715 while considering the changing volume of the capsules due to the volume change of the second fluid, especially while changing phase. Consequently and in contrast to conventional tank-based thermal energy storage units, a predefined system of a plurality of flow paths 718 for the first fluid 120 for exchanging heat is provided. The flow of the heat transfer fluid in conventional tank based thermal energy storage units has a high degree of randomness, wherein for example it is hard for the first fluid to reach edges of the tank.

Moreover, the plate shape of the capsules 715 geometrically increases the surface of the capsules 715 (i.e., its surface-to-volume ratio), wherein the largest surfaces (i.e. the broad-sides) of the capsules 715 advantageously define its main surfaces for exchanging heat.

Correspondingly, each flow path 718 of FIG. 7A has a narrow shape that is aligned parallel to said main surfaces of the capsules 715. The narrow shape of defined flow paths 718 utilizes the main surfaces of the capsules 715 such that the heat transfer rate is increased. In other words, the above explained arrangement of the thermal energy storage unit 711 significantly increases the effective area of the contact surface for exchanging heat while keeping the pressure drop at an acceptable level (e.g., below 1 bar).

The elongated shape of the tube 712 provides defined flow paths of the first fluid 120 that are significantly longer than with conventional systems. Hence, the exchange of heat of the first fluid 120 with the plurality of stacks 717 is optimized, since a gradual activation of the stacks 717 while frosting or defrosting the capsules 715 takes place.

Additionally, the average length of the flow paths is increased to be longer than the length L of the tube 712. This additionally increases the heat transfer rate.

FIG. 7B shows a cross-section of an empty tube 712. FIG. 7C shows a cross-section of a tube 712 including a stack 717 of capsules 715 with water in a liquid (non-frozen) state.

Hence, the thermal energy storage unit 711 of FIG. 7C is fully discharged. FIG. 7D shows a cross-section of a tube 712 including a stack 717 of capsules 715 with water in a frozen/solid state. Hence, the thermal energy storage unit 711 of FIG. 7D is fully charged. The tube 712 of FIG. 7B has ideally an overall cross-section (i.e. cross-sectional area) of the tube 712A for the first fluid 120, if considered without any capsule 715. If a stack 717 of capsules 715 is placed inside the tube 712, narrow-shaped flow paths are provided between capsules 715; in FIG. 7C one of these narrow flow paths 718 is indicated by a plurality of circles, which indicate the flow direction of the first fluid 120. The flow paths 718 are provided in a cross-sectional area between each of two capsules 120 (one of these free-flow cross-sectional areas for the flow paths is indicated with the reference numeral 718A in FIG. 7C) for the first fluid 120 and, at the left and right side of FIG. 7C, between the wall of the tube 120 and the outmost left and right capsule 715, respectively. One of these cross-sectional areas that define the flow paths 718 is indicated with the reference numeral 718A in FIG. 7C. FIG. 7D shows almost the same configuration as FIG. 7C with the key difference that the residual cross-sectional areas for the flow of the first fluid 120 between the capsules 715 are smaller, since the capsules 715 are expanded by the frozen second fluid 122 inside them. One of these free-flow cross-sectional areas that define the flow paths 718 for the first fluid 120 is indicated in FIG. 7D by the reference numeral 718B. The plurality of stacks 717 is arranged such that continuous flow paths 718 are provided along the length of the tube in general from the front end to the back end to the tube. The average length of these flow paths 718 is longer than the length of the tube 712 itself. Optionally, the stacks 717 of the capsules 715 have the same number of capsules 715. Optionally, the stacks 717 are consecutively arranged next to each other such that the flow paths 718 are provided by the plurality of stacks 717 itself.

Since water expands its volume while charging/freezing, the capsules 715 of FIG. 7C require more space than the capsules of FIG. 7B. This effect is also called "breathing-effect" of the capsules 715. Due to this breathing effect, the residual space for the first fluid 120 changes according to the state of the second fluid 122 inside the capsules 715. The breathing-effect of the capsules 715 has to be considered while defining the flow paths 718. First, the stacks 717 have to be adapted such that the flow paths 718 are not blocked in the charged and in the discharged state. Second, the stacks 717 have to be adapted such that the flow paths 718 provide an acceptable pressure drop in the case of frozen capsules 715 as well as in the case of non-frozen capsules 715. Third, the overall thermodynamic configuration of the thermal energy storage unit 711 has to be optimized. This includes especially the flow dynamics of the first fluid 120 in the flow path 718 that should be configured such that an efficient heat transfer between the capsules 715 and the first fluid 120 can take place.

The first item mentioned above is for ensuring that a flow of the first fluid 120 can be provided at all times.

The second item mentioned above is explained more in detail as follows. The longer the flow path and smaller the flow path's cross-sectional area, the greater is the increase of the pressure drop. An increased pressure drop has the disadvantage of a higher pumping power consumption (i.e., higher system losses and less total efficiency of the system) and the disadvantage of increasing mechanical requirements for the whole system. Consequently, the pressure drop from inlet 714A to outlet 714B of the thermal storage unit has to be below 1 bar (atmosphere). Optionally, thermal energy storage unit is configured such that the pressure drop is less than 0.5 bar in its fully-charged as well as in its fully-discharged state.

With respect to the third item mentioned above, a ratio of a combined length of a plurality of tubes (or one very long tube) to a flow-cut-area is in a range of about 40 to 200 (cm/cm$^2$), optionally of about 60 and 150 (cm/cm$^2$). These ratios of a flow-cut-area to a combined length of a plurality of tubes (i.e., the total length of several tubes 712 connected together in series) provide an efficient heat transfer rate with an acceptable pressure drop.

This allows on one hand more time for the capsules placed closest to the inlet (which suffer from reduced heat transfer rate due to ice melting inside the capsules) to continue their heat transfer into the first fluid 120 at a lower heat transfer rate and a lower exchange temperature, while the capsules 715 located more downstream of the flow of the first fluid 120 continue their heat transfer at a higher heat transfer rate.

The term "flow-cut-area" is a number which is calculated as follows:

$$AFFCAp = (TCSA - (CCSA\text{-}LS + CCSA\text{-}FS)/2 \times CPS)/CPS$$

wherein the above stated variables are defined as follows:
AFFCAp=Average free flow-cut-area per capsule
TCSA=overall available cross-sectional area 712A of the tube (see FIG. 7B);
CCSA-LS=capsule cross-sectional area 715 in the liquid state of the second fluid (i.e. in a discharged state, see FIG. 7C);
CCSA-FS=capsule cross-sectional area 715 in the frozen state of the second fluid (i.e. in a charged state, see FIG. 7D);
CPS=number of capsules 715 installed in parallel.

With the above stated formula, an average free flow cross-sectional area (i.e., (AFFCAp) per capsule 715 is used to calculate the available total flow area in a tube's cross-section. The result is then used to calculate the average cross-sectional flow area per capsule, i.e., the flow-cut-area.

The calculated flow-cut-area can be used to calculate a gamma ratio that is a good indicator for the efficiency of the heat transfer between capsule and first fluid as follows:

Gamma Ratio=combined length of the plurality of tubes/flow-cut-area, using, for example, centimeters as units of length and square centimeters as units of area, [cm/cm$^2$].

The Gamma Ratio depends on several factors, some of which include capsule properties and flow path properties.

The Gamma Ratio [GR], (ratio between linear length (in cm) of heat transfer fluid flow path and free flow cross area per capsule (cm$^2$) as explained above) depends on the thermal performance of capsules installed within a brick and additional other parameters.

A high gamma ratio potentially enables enough heat exchange interaction between the capsules and the heat transfer fluid, to melt a large portion of the stored energy in the ice, at a desired rate. On the other hand a high gamma ratio typically translates to a longer travel and a narrow passage, which potentially produces a high pressure drop, which may cause high pumping losses and/or a high mechanical load on the brick envelope.

In general a dependence of GR on capsule performance [CP] and Heat Transfer Coefficient of the heat transfer fluid [HTC] is:

$$GR = K*(1/CP*HTC)$$

where K is an empirical factor.

Typical factors which improve (increase) CP:
ratio of capsule area to capsule volume ($cm^2/cm^3$);
an inverse of capsule wall thickness (1/cm);
capsule wall material (thermal conductivity) (W/(m*K)). By way of some non-limiting examples: thermal conductivity of HDPE is ~0.5 (W/(m*K)), thermal conductivity of Aluminum is ~200 (M/(m*K)); and
using internal heat transfer strips Typical factors which improve (increase) HTC:
a flow path length configured to have a meandering configuration;
a higher average Reynolds number for the flow, which typically depends on fluid velocity and hydraulic diameter of the "flow-cut-area";
a Local Reynolds number, which depends on, by way of some non-limiting examples, a change in capsules' orientation along a flow path, protrusions on capsule walls, and including turbulators in the flow path. A turbulator is a device that turns a laminar boundary layer into a turbulent boundary layer. Turbulators may include baffles, angular metal strips, spiral blades, or coiled wire, are inserted into the flow path.

A gamma ratio of the combined length of the plurality of tubes to the said flow-cut-area of approximately 150 $cm/cm^2$ is an example of a useful value. A system which has been configured according to the above explained requirement demonstrated a yield value (a percentage of second fluid melted during a 4 hours period discharge rate) higher than 80% with an acceptable exit temperature of the first fluid below 5 degrees Celsius and an acceptable pressure drop (~0.5 bar). Increasing the ratio to 200 $cm/cm^2$ (with a shape of the capsule according to the above explained embodiments) will increase the pressure drop beyond the desired limit. Decreasing the ratio below 40 $cm/cm^2$ will decrease the yield percentage while discharging to 50%. A ratio in the range of 60 to 90 $cm/cm^2$ will also result in a reasonable efficiency of the unit 711. Moreover, the embodiment provides, in contrast to conventional "encapsulated ice" systems, a flat and stable discharge curve (behavior).

In some embodiments, for example as described below in a section titled "Connecting bricks in series and/or in parallel", the first bricks potentially enable a higher "Gamma Ratio" in the order of 200-500 (cm/cm2) yet still avoiding a pressure drop problem.

It is to be noted that the above stated rages and values for the gamma ratio are the result of theoretical and practical experiments with the above embodiments.

Figure 8A:
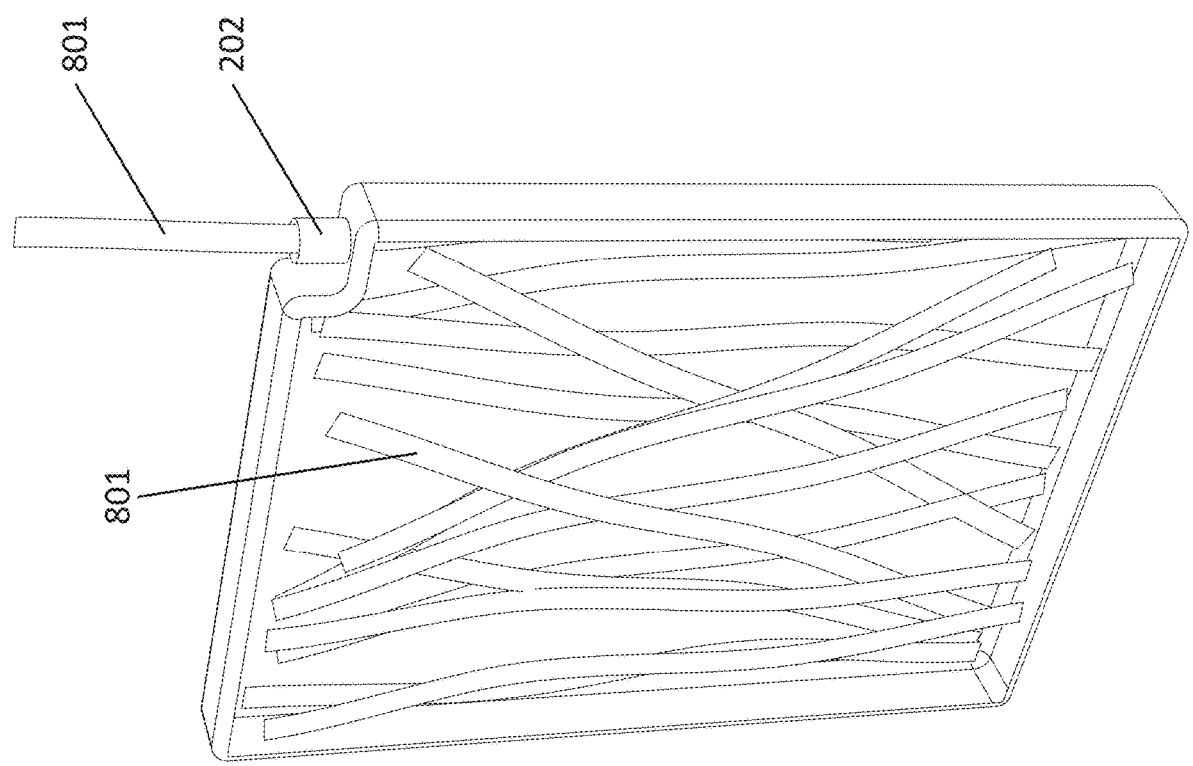
FIGS. 8A and 8B show capsules containing metal strip.

FIG. 8A shows a capsule 114 with a filling nozzle 202 that has a predefined diameter. Flat metal strips 801 are provided such that they are arranged inside the capsule 114. The width of the strips is adapted to the diameter of the filling nozzle 202 such that the strips can be inserted into the capsule 114. It is to be noted that the strip 801 that is placed in the filling nozzle 202 in FIG. 8A is only shown for demonstration purposes. The capsule 114 as finally used for the heat storage unit is only provided with strips 801 that are completely located in the interior of the capsule 114. The length of the strips 801 is preferable dimensioned such that they fit well inside the length of the capsule 114. In this way, the strips 801 will stay in place in the interior of the capsule 114 and will effect a large part of the internal volume of the capsule 114. Optionally, a plurality of metal strips is used in order to increase the overall heat transfer efficiency of the capsule 114. These strips 801 act as heat transfer elements, which improve the transfer of heat inside the capsule 114 and improve the total heat transfer efficiency of the individual capsule.

Figure 8B:
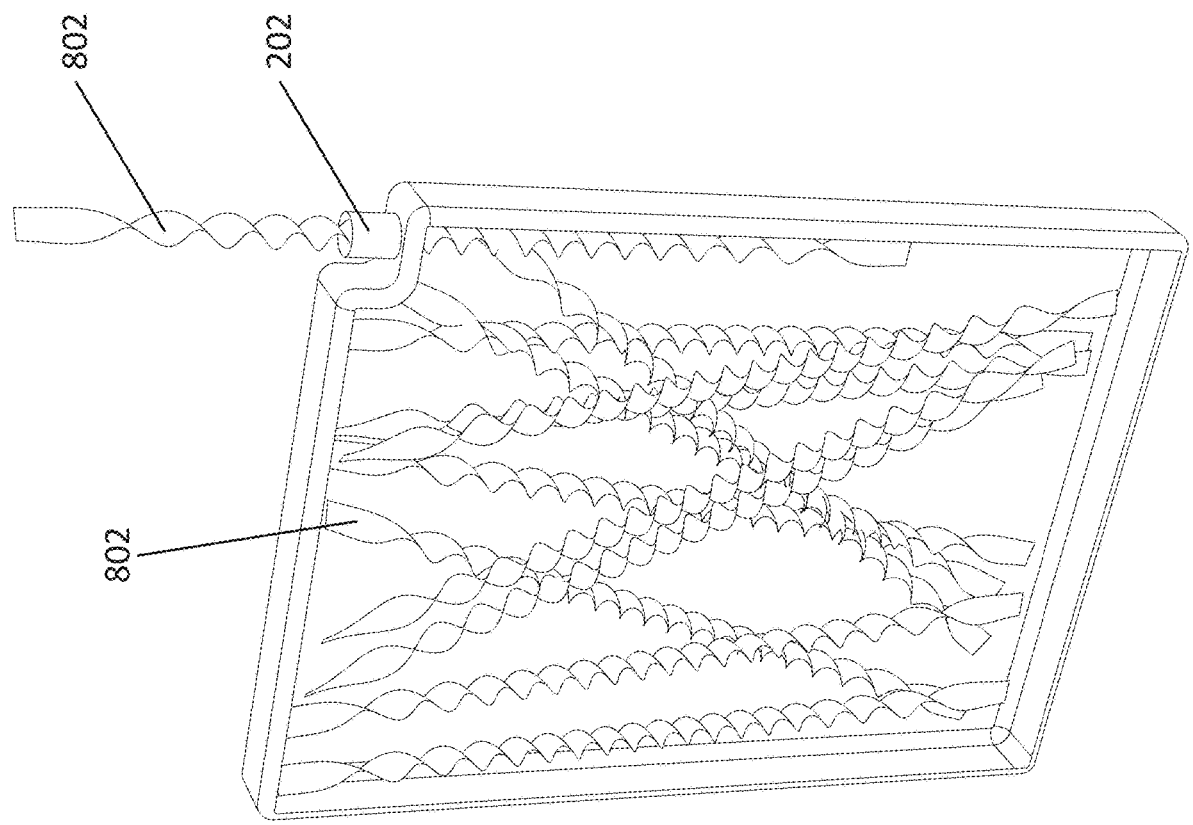

FIG. 8B shows a capsule 114 with a filling nozzle 202 that has a predefined diameter. Helical flat metal strips 802 are provided such that they are arranged inside the capsule 114. The width of strips is adapted to the diameter of the filling nozzle 202 such that the strips can be inserted into the capsule 114. It is to be noted that the strip 802 that is placed in the filling nozzle 202 in FIG. 8A is only shown for demonstration purposes. Helical flat metal strips 802 provide an even better distribution of heat in the interior of the capsule 114.

Figure 9A:
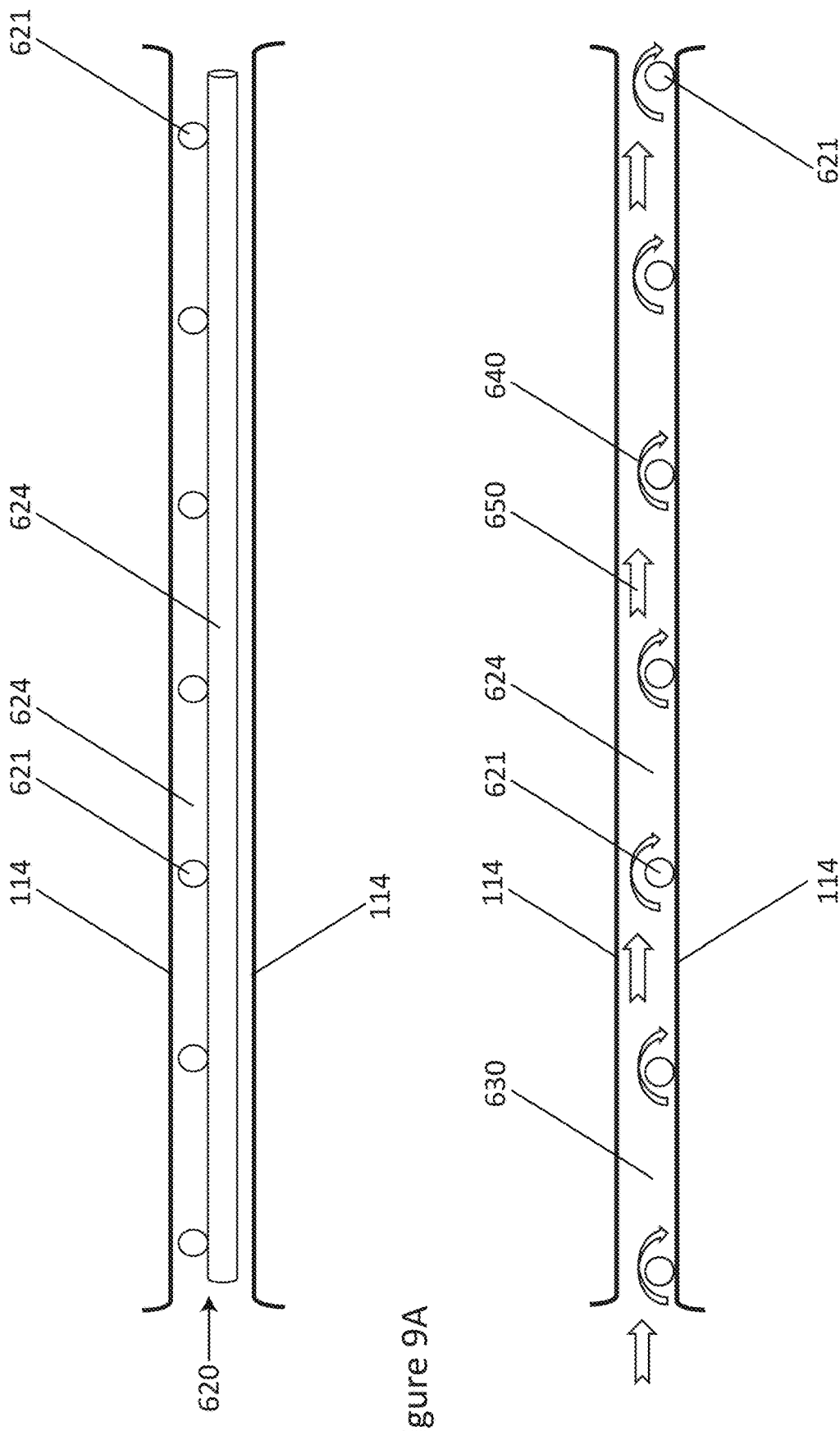
FIGS. 9A and 9B show spacers between capsules.

FIG. 9A shows a rigid spacer 620 having vertical bars 621, horizontal bars 622 and gaps 624 between the bars. The rigid spacer 600 is provided between two neighboring capsules 114. Reference is made to FIGS. 6B and 6C and the corresponding explanation. This rigid spacer could, for example, be used in combination with the embodiment described in context with FIGS. 7A-7D.

When the capsule's wall deflects towards the neighboring capsule wall while charging (i.e., while freezing of the second fluid 122), the horizontal bars 622 maintain a free flow path near them, which will allow parallel flows 650 of the first fluid 120, which will cause melting of the ice across the whole capsule width. The perpendicular vertical bars will create turbulent flow which will improve the heat transfer coefficient between the wall of the capsule and the flow of the first fluid 120, as depicted by the curved arrows 640.

Figure 9B:
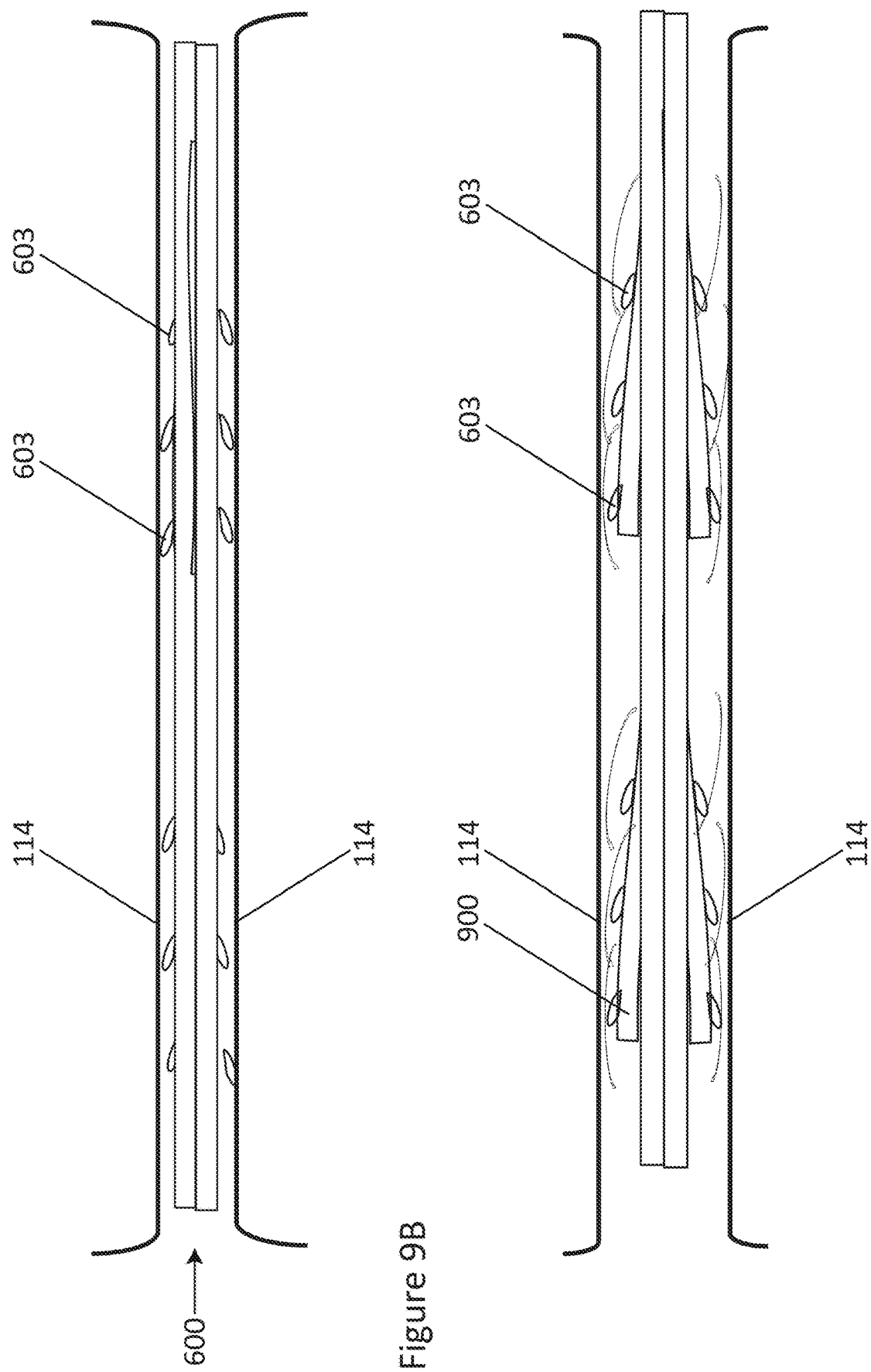

FIG. 9B shows a flexible spacer 600 having flaps 602. The flexible spacer 600 is provided between two neighboring capsules 114. Reference is made to FIG. 6A and the corresponding explanations. Furthermore, protrusions 603 are provided in order to create a more turbulent flow. This flexible spacer 600 could, for example, be used in combination with the embodiment described in context with FIGS. 7A-7D.

The placement of flexible spacers 600 equipped with flaps 602, which are preloaded to press against the neighboring capsule's 114 flat walls, will force the first fluid to flow through the narrow gap between the capsules' 114 walls. This increases the heat transfer rate of the first fluid 120 with the capsule 114. Additionally the turbulence of the flow is increased. This is depicted by the lines 900 in FIG. 9B. The minimum clearance in the charged stage (i.e., the minimal size of the gap) should be approximately 1 mm on each side.

Furthermore, the flexible spacer 600 can be configured such that the gap will grow (due to ice melting) to approximately 3 to 5 mm on each side. This which will advantageously cause a reduction of the velocity of the fluid flow of the first fluid 120 to one fourth (¼) of its maximum velocity in the tube.

The flaps (wings) which are pre-set to expand away from the straight sheet and to move toward the capsule wall and to maintain narrow flow gap for the first fluid 120 near the capsule 114 and will prevent the degradation of performance as described above.

Connecting Bricks in Series and/or in Parallel

In order to increase discharge percentage of stored capacity for a given configuration of capsules (shape and material) a possible configuration is to connect bricks in series.

Downstream capsules, which may still be fully charged or only have a small portion of their capacity discharged, potentially continue to cool heat transfer fluid to desired temperature (for example lower than 5 deg. Celsius) and the arrangement of the bricks in series potentially continues to extract cooling capacity from the highly discharged capsules located up-stream.

An additional potential advantage of having bricks connected in series is having less connections to main headers.

Such an arrangement potentially has a disadvantage of developing a higher pressure drop than connecting bricks not in series, or in a shorter series, potentially especially during first stages of discharge, possibly due to:
- a required flow optionally determined by a required discharge rate and temperature differential (between inlet and outlet of a heat exchanger);
- the discharge rate potentially influenced by a stored cooling capacity of the bricks set and a target period, so that if a larger number of bricks is connected in series, a higher discharge rate is potentially required in order to maintain a desired dis-charge period; and
- a pressure drop increase proportional to a power of three (3) of an increase in brick number, since pressure drop is proportional to a length of travel multiplied by a power of two of flow velocity.

By way of a non-limiting example:

Two (2) bricks in a series configuration increased to three (3) bricks in a series configuration:

A) Example reference values for two bricks:
Capacity 2×10=20 RTH
Desired discharge period 4 hours
Calculated discharge rate 5 RT
Calculated discharge flow (based on 5 deg. C. temperature differential) 5×0.6=3 m²/hr
Pressure drop during the first stage of discharge 0.3 Bar (typical test results)

B) Using the above example values for three bricks:
Capacity 3×10=30 RTH
Desired discharge period 4 hours
Calculated discharge rate 7.5 RT
Calculated discharge flow (based on 5 deg. C. temperature differential) 7.5×0.6=4.5 m²/hr
Pressure drop during the first stage of discharge 0.3× 1.53=0.3×3.375=1.0125 Bar It is noted that the pressure drop for three bricks appears to be higher than a typical desired limit.

In some embodiments, during initial stages of a discharge period a temperature of heat transfer fluid leaving a second brick and entering a third brick, by way of a non-limiting example, is very close to 0 deg. Celsius. As a result, an available temperature differential for transferring heat in the intermediate heat exchanger is higher than 5 deg. Celsius, and can be as high as 7-8 deg. Celsius, so the flow rate can be reduced to keep the inlet pressure under a required limit.

In some embodiments, a bypass device is optionally installed, such as an on/off valve or a pressure relief valve connected to a discharge header (see descriptions of FIGS. 23A-23C and FIG. 24 below) the last frozen brick can optionally be bypassed in order to further reduce the pressure drop.

In some embodiments a combination of the above-mentioned phenomena and thermal storage containers as described herein potentially enable a discharge rate as required while keeping pressure drop below a required limit.

In some embodiments a bypass configuration is optionally applied for any number of bricks in series, in a range between 3 and 5 bricks configured in series, or even in a range between 2 and 10 bricks configured in series.

Figure 23A:
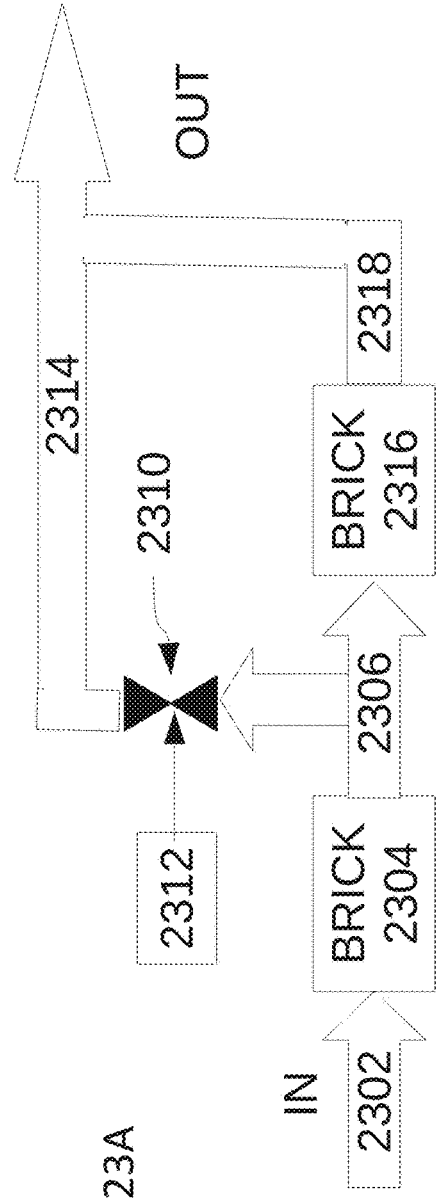
FIG. 23A is a simplified illustration of bricks and a bypass mechanism according to an example embodiment of the invention.

Reference is now made to FIG. 23A, which is a simplified illustration of bricks and a bypass mechanism according to an example embodiment of the invention.

FIG. 23A shows a minimal configuration—two bricks 2304 2316, connected in series, and a valve 2310.

In some embodiments the valve 2312 may be a pressure relief valve.

In some embodiments, the valve 2312 may be a valve controlled by a controller 2312, optionally an electrical controller, optionally under control of controlling software or controlled over a network by a controlling computer.

Incoming fluid 2302 passes through a first brick 2304, and continues to flow through a second brick 2316 in series with the first brick 2304, and out 2318 of the configuration shown in FIG. 23A.

In some embodiments, the valve 2312 enables flow of heat transfer fluid out 2314 of the configuration shown in FIG. 23A, bypassing the second brick 2316. It is noted that when the valve 2312 enables flow of heat transfer through the valve 2312, most or all of the heat transfer fluid will typically flow though the valve 2312, since this path for the fluid provides less resistance than flowing through the second brick 2316.

Figure 23B:
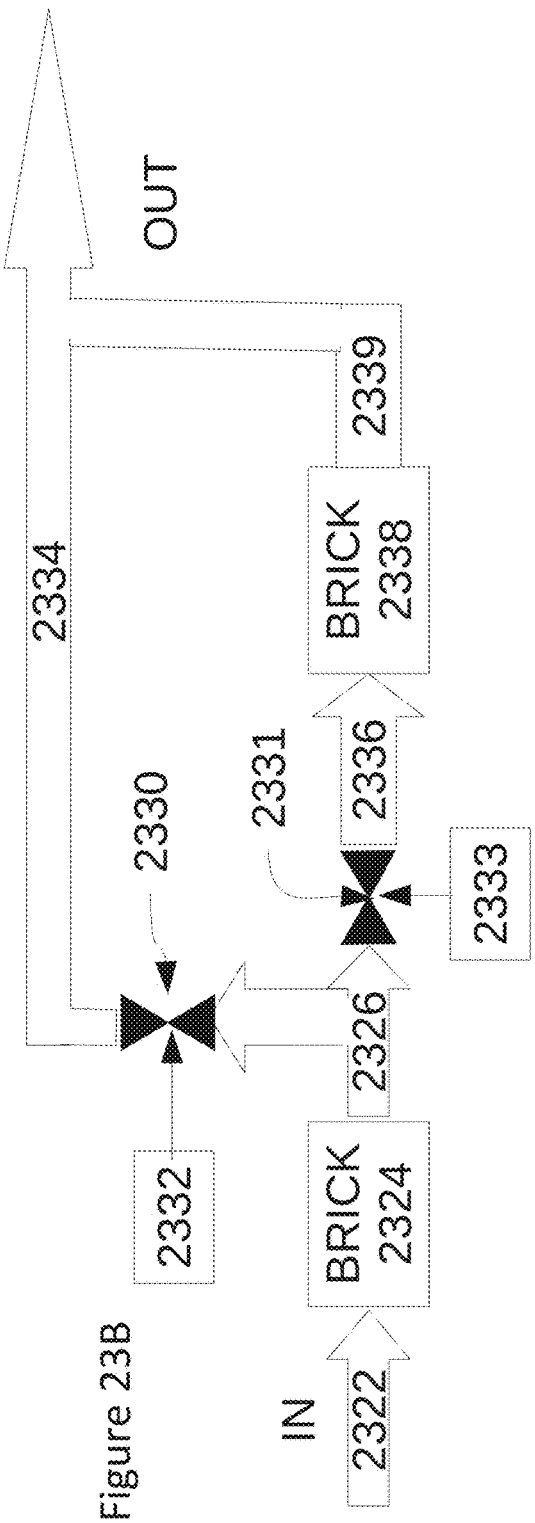
FIG. 23B is a simplified illustration of bricks and two valves according to an example embodiment of the invention.

Reference is now made to FIG. 23B, which is a simplified illustration of bricks and two valves according to an example embodiment of the invention.

FIG. 23B shows a more elaborate configuration—two bricks 2324 2338, connected in series, and two valves 2330 2331.

In some embodiments, a first valve 2331 may be a valve controlled by a controller 2333, optionally an electrical controller, optionally under control of controlling software or controlled over a network by a controlling computer. The first valve 2331 may optionally be controlled to open or close.

In some embodiments a second valve 2330 may be a pressure relief valve, since closing the first valve 2331 potentially produces back-pressure against flow of heat transfer liquid.

In some embodiments, the second valve 2330 may be a valve controlled by a controller 2332, optionally controlled to be open when the first valve 2331 is controlled to be closed.

Incoming fluid 2322 passes through a first brick 2324, and continues to flow through the first valve 2331 and through a second brick 2336 in series with the first brick 2324, and out 2339 of the configuration shown in FIG. 23B. When the first valve 2331 is closed, and the second valve 2330 is open, then the heat transfer fluid flows out 2334 of the configuration shown in FIG. 23B, bypassing the second brick 2338.

FIGS. 23A and 23B above show two possible configurations of enabling heat transfer fluid to bypass a brick. One of the above-described configurations can optionally be placed between any upstream brick and a downstream brick.

One more bypass configuration is described below, for a configuration with three bricks. Additional configuration can be put together by a person skilled in the art based on the descriptions provided herein.

Reference is now made to FIG. 23C, which is a simplified illustration of three bricks and a valve according to an example embodiment of the invention.

FIG. 23C shows a configuration with three bricks 2342 2344 2354 connected in series, and a valve 2348.

In some embodiments the valve 2348 may be a pressure relief valve.

In some embodiments, the valve 2348 is a valve controlled by a controller 2350, optionally an electrical controller, optionally under control of controlling software or controlled over a network by a controlling computer. The valve 2350 may optionally be controlled to open or close.

Incoming heat transfer fluid 2322 passes through a first brick 2324, flows 2343 into a second brick 2344 in series with the first brick 2342, continues to flow 2345 into a third brick 2354 in series with the second brick 2344, and out 2356 of the configuration shown in FIG. 23C.

When the valve 2348 is opened the heat transfer fluid flows out 2351 of the configuration shown in FIG. 23C, bypassing the third brick 2354.

Figure 24:
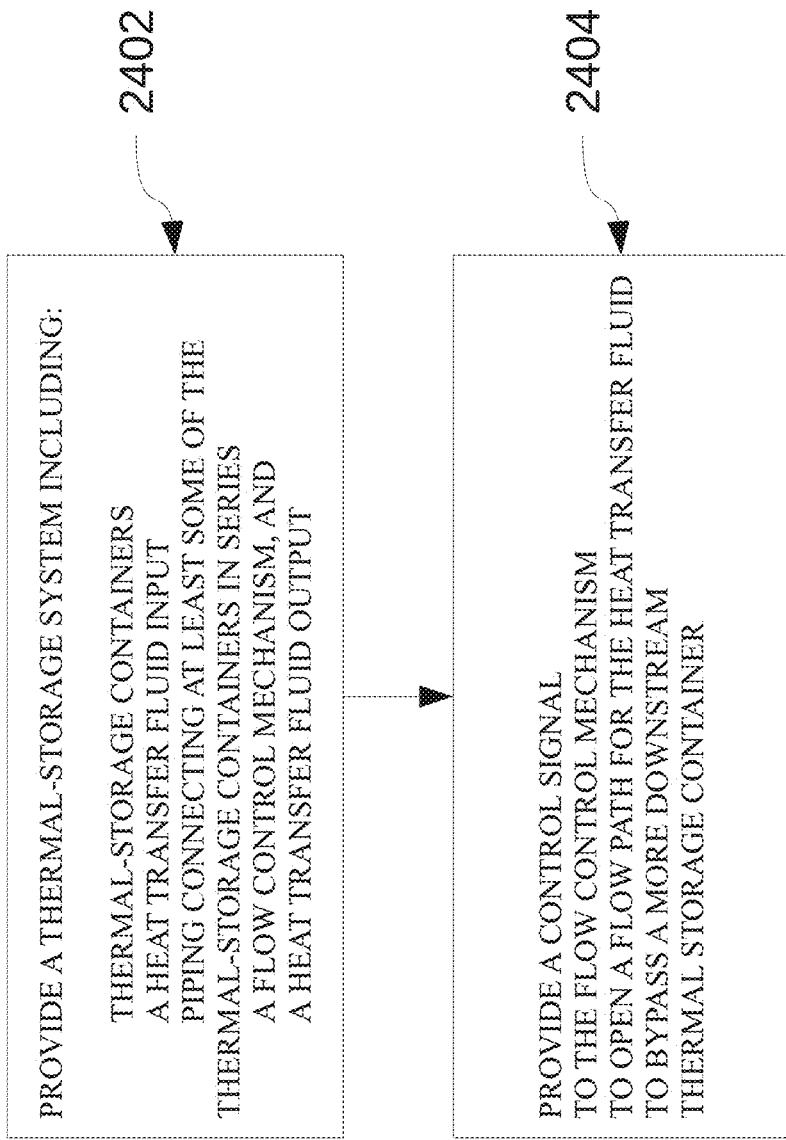
FIG. 24 is a simplified flow chart illustration of a method for exchanging heat by heat transfer fluid flowing through thermal-storage containers according to an example embodiment of the invention.

Reference is now made to FIG. 24, which is a simplified flow chart illustration of a method for exchanging heat by heat transfer fluid flowing through thermal-storage containers according to an example embodiment of the invention.

The method of FIG. 24 includes:
providing a thermal-storage system (2402) including thermal-storage containers; a heat transfer fluid input; piping connecting at least some of the thermal-storage containers in series; a flow control mechanism; and a heat transfer fluid output; and
providing a control signal to the flow control mechanism to open a flow path for the heat transfer fluid to bypass a more downstream thermal storage container 2404.

Flow Control in a Thermal Storage System

When thermal-storage containers frozen to a large percentage of their capacity, the temperature of the heat transfer fluid (HTF) coming out may be colder than required. The energy transferred from the thermal storage system depends upon the flow rate of the HTF exiting the system and on the temperature of the HTF.

In some embodiments, when the temperature of the HTF coming out of a system having several containers connected in series is colder than required, one or more of the containers in the series is optionally bypassed, providing HTF at a temperature closer to the required temperature.

In some embodiments, when the temperature of the HTF coming out of a system is colder than required, the flow rate the flow rate of the HTF exiting the system is reduced, using one or more of the following methods:
using a flow control valve to reduce the flow; and
using a Variable Frequency Drive (VFD) to providing variable speed pump operation.

For example, when temperature of HTF out is 2 degrees C. instead of 5 deg. C., the flow can be reduced by the ratio of $5/8$ (=0.6).

Reducing the flow rate potentially has a beneficial effect of reducing the pressure drop in the system, potentially by the ratio of $5^2/8^2$ (=0.4).

Figure 25:
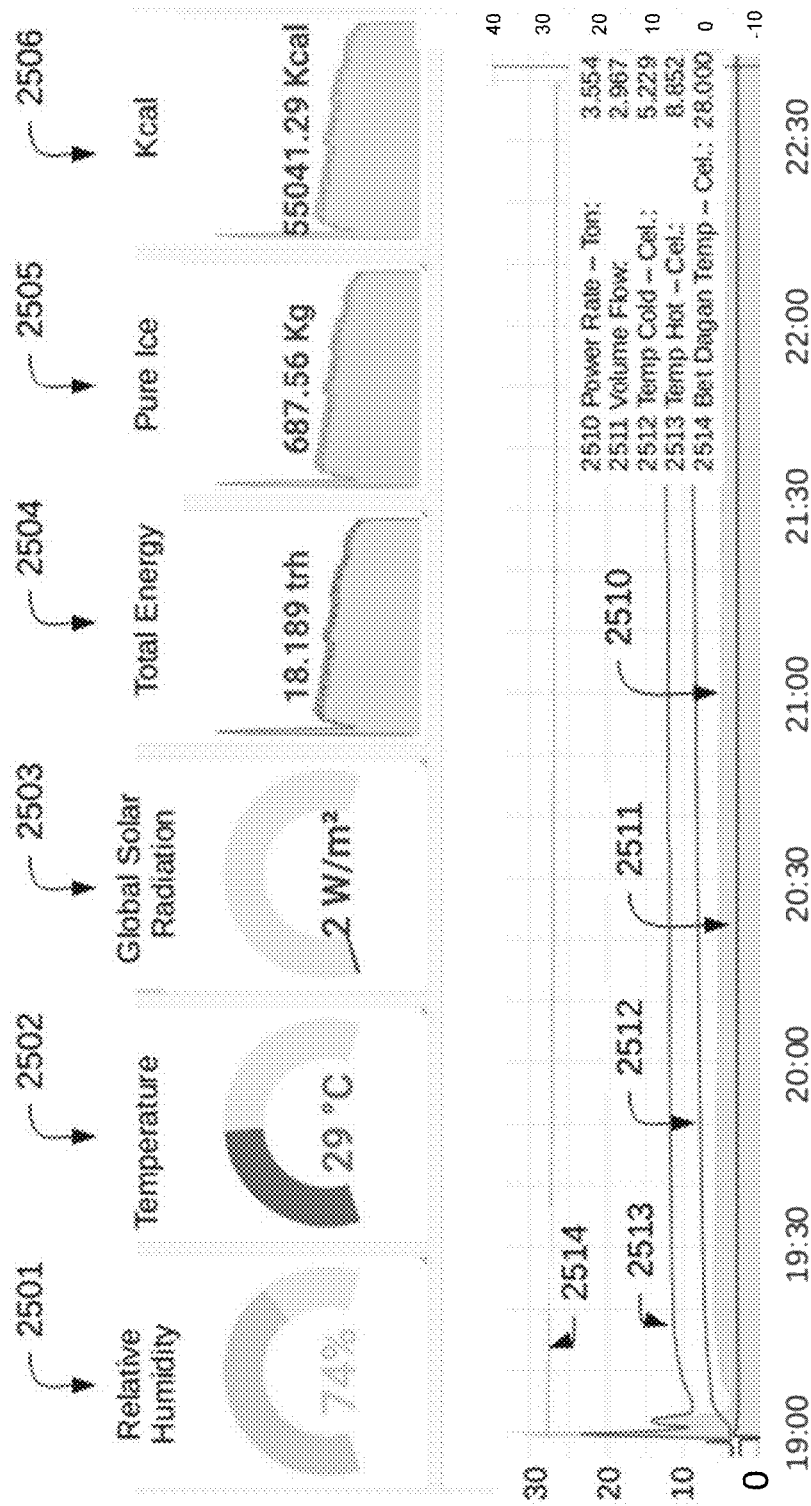
FIG. 25 is a collection of graphs showing results of an experiment performed with an example embodiment of the invention.

Reference is now made to FIG. 25, which is a collection of graphs showing results of an experiment performed with an example embodiment of the invention.

FIG. 25 shows, in a top row:
a first graph 2501 showing relative humidity at the time of the experiment;
a second graph 2502 showing temperature at the time of the experiment;
a third graph 2503 showing global solar radiation at the time of the experiment;
a fourth graph 2504 showing total energy delivered during the experiment, being 18.189 trh (ton refrigerant hours);
a fifth graph 2505 showing an equivalent amount of ice to the total energy delivered, being 687.56 Kg; and
a sixth graph 2506 showing an equivalent amount of energy expressed as 55041.29 Kcal.

FIG. 25 shows, in a bottom row, a seventh graph 2510, showing some parameters of the experiment as over the duration of the experiment.

The seventh graph 2509 shows an X-axis of time, from 19:00 to after 22:30, a left Y-Axis of temperature in degrees Celsius, which is relevant for some of the lines in the seventh graph, and a right Y-Axis of temperature in degrees Celsius.

The seventh graph 2509 shows:
a first line 2510 showing power rate in ton-refrigerant. The value of the power rate was 3.554 at the end of the discharge cycle;
a second line 2511 showing flow, based on the right Y-axis. The value of the flow was 2.967 m$^3$/hr at the end of the discharge cycle;
a third line 2512 showing temperature of the cold water exiting. The value of the temperature of the cold water exiting was 5.229 degrees Celsius at the end of the discharge cycle;
a fourth line 2513 showing temperature of the relatively hotter water entering the system. The value of the temperature of the relatively hotter water entering the system was 8.852 degrees Celsius at the end of the discharge cycle; and
a fifth line 2514 showing ambient temperature at the location of the experiment. The value of the ambient temperature at the end of the discharge cycle was 28 degrees Celsius.

It is expected that during the life of a patent maturing from this application many relevant thermal-storage containers will be developed and the scope of the term thermal-storage containers is intended to include all such new technologies a priori.

As used herein the term "about" refers to −60% and +200%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

LIST OF REFERENCE SIGNS

| | |
|---|---|
| energy storage (TES) system | 100 |
| chiller | 102/150 |
| fluid distribution system | 104 |
| controller | 105 |
| pumps | 106 |
| flow control mechanisms | 107 |
| piping | 108 to 108T |
| monitoring components | 109 |
| array | 110 |
| ice bricks | 112, 112B, 112C, 112D |
| ice capsules | 114, 114C, 114Cy |
| first fluid | 120 |
| second fluid | 122 |
| third fluid | 124 |
| air | 126 |
| cooling load | 130 |
| air compressor | 140 |
| Heat exchanger (HE) | 142, 152, 170 |
| filling nozzle | 202 |
| narrow-side spacers | 204 |
| broad-side spacers | 206 |
| rectangular enclosure | 220 |
| Mounting brackets | 222 |
| inlet/outlet pipes | 224 |
| end panels | 226 |
| support panels | 227 |
| interconnecting piping | 228 |
| base frame | 232 |
| ridge | 250, 252 |
| lower part | 254 |
| upper part | 256 |
| protrusions | 260 |
| general flow direction | 290 |
| meander pattern | 291 |
| discharging process | 500 |

-continued

| | |
|---|---|
| subsets 520, 520A, 520B | 520, 520A, 520B |
| spacers | 600, 620 |
| flaps | 602 |
| protrusions | 603 |
| vertical bars | 621 |
| horizontal bars | 622 |
| gaps | 624 |
| flow area | 630 |
| curved arrows | 640 |
| flows | 650 |
| tube | 712 |
| overall cross-section of the tube | 712A |
| front end element | 713A |
| back end element | 713B |
| inlet | 714A |
| outlet | 714B |
| capsule | 715 |
| spaces | 716 |
| stacks of capsules | 717 |
| flow paths | 718 |
| free flow cross-sectional area in the liquid state of the second fluid | 718A |
| free flow cross-sectional area in the frozen state of the second fluid | 718B |

What is claimed is:

1. A thermal-storage container used in thermal systems to exchange heat by fluid flow though phase-changing material disposed inside the thermal-storage container, comprising:
   a thermal-storage container housing;
   a fluid inlet and a fluid outlet, to allow fluid flow in a general direction of a longitudinal axis of the thermal-storage container, the container having, along the longitudinal axis, an upstream portion followed by a downstream portion; and
   capsules containing the phase-change material, each capsule having two heat exchanging surfaces with a surface area larger than all other faces of the capsule, the capsules defining a plurality of passages between the capsules, the passages configured to direct the flow of the fluid at different portions inside the housing,
   wherein one or more of the capsules in the upstream portion of the thermal storage container are oriented such that the two heat-exchanging surfaces are vertical and in parallel to the longitudinal axis of the container and one or more capsules in an adjacent downstream portion of the thermal storage container are oriented such that the two heat-exchanging surfaces are horizontal and in parallel to the longitudinal axis of the container.

2. The thermal-storage container according to claim 1, wherein an actual fluid flow length through the thermal-storage container is longer than twice a straight line length measured between the fluid inlet and the fluid outlet through all sections through which the fluid flows.

3. The thermal-storage container of claim 1, wherein the thermal-storage container comprises one or more turbulators.

4. The thermal-storage container of claim 1, wherein said capsule comprises a quartz nucleating agent.

5. The thermal-storage container of claim 1, wherein the capsules arranged within the thermal-storage container have a combination of concave and convex outlines, defining gaps between contours of the capsules.

6. The thermal-storage container of claim 1, wherein the capsules contain metal strips, and wherein a length of a metal strip is longer than a width of the capsule.

7. The thermal-storage container according to claim 1, having a ratio between an average flow cross section area along a flow path in the thermal-storage container and a total heat exchange area of all the capsules in the thermal-storage container between $4.5\times10^{-5}$-$45\times10^{-5}$.

8. The thermal-storage container according to claim 1, having a ratio between an average flow cross section area along a flow path in the thermal-storage container and a total heat exchange area of all the capsules in the thermal-storage container between $1\times10^{-5}$-$100\times10^{-5}$.

9. The thermal-storage container according to claim 1, having a gamma ratio greater than 150 cm/cm$^2$, wherein the gamma ratio is defined as a ratio between a linear length in centimeters (cm) of a heat transfer fluid flow path and a free flow cross area per capsule in cm$^2$.

10. The thermal-storage container of claim 1, wherein said capsules comprise at least one surface having protrusions adapted to increase a turbulence of flow of the fluid.

11. The thermal-storage container of claim 1, wherein:
the thermal-storage container is rectangular, wherein
a ratio of length to width of the thermal-storage container is in a range of 4 to 50; or
a ratio of a width to height of the thermal-storage container is in a range of 0.5 to 4.

12. The thermal-storage container of claim 1, wherein one or more capsules in the upstream portion are positioned within the thermal-storage container transversely to one or more capsules in the downstream portion.

13. The thermal-storage container of claim 1 wherein:
said thermal-storage container further comprises a plurality of spacers inserted between said capsules;
said spacers to ensure fluid flow of said fluid through said thermal-storage container; and
said spacers to cause turbulent flow when a gap between said capsules increases when said phase-change material melts.

14. A structure comprising a thermal energy storage system comprising at least one thermal-storage container according to claim 1, built into said structure, wherein:
the structure is selected from a group consisting of:
a wall;
a floor; and
a roof.

15. A method for exchanging heat by fluid flowing through thermal-storage container, the container having, along a longitudinal axis, an upstream portion followed by a downstream portion, the method comprising:
inserting the fluid into the thermal-storage container, via a fluid inlet;
allowing the fluid to flow in a general direction of the longitudinal axis of the thermal-storage container;
allowing heat exchange between the fluid and phase-changing material inside capsules, each capsule having two heat-exchanging surfaces with a surface area larger than all other faces of the capsule, in the thermal-storage container;
and
outputting the fluid from the thermal-storage container, via a fluid outlet;
wherein the method further comprises orienting one or more of the capsules in the upstream portion of the thermal storage container such that the two heat-exchanging surfaces are vertical and in parallel to the longitudinal axis of the container and orienting one or more capsules in an adjacent downstream portion of the thermal storage container such that the two heat-exchanging surfaces are horizontal and in parallel to the longitudinal axis of the container.

16. The method according to claim 15, wherein the actual fluid flow length from the fluid inlet to the fluid outlet through the thermal storage container is more than two times longer than a direct length measured between the fluid inlet and the fluid outlet.

17. The method according to claim 15, wherein a flow direction of the fluid is modified by at least 30° to a longitudinal axis of the thermal-storage container by changing the orientation of one or more capsules relative to the longitudinal axis of the thermal-storage container.

18. The method according to claim 15 and further comprising generating a turbulent flow on a heat-exchanging surface of a capsule.

19. The method according to claim 15, wherein a flow of the fluid is modified, alternating flow between turbulent flow and meandering flow within the thermal-storage container.

* * * * *